United States Patent
Chan et al.

(10) Patent No.: US 10,173,149 B2
(45) Date of Patent: Jan. 8, 2019

(54) METHODS FOR SEPARATING CARBON NANOTUBES

(71) Applicant: NANYANG TECHNOLOGICAL UNIVERSITY, Singapore (SG)

(72) Inventors: Bee Eng Mary Chan, Singapore (SG); Jing Wang, Singapore (SG); Tuan Dat Nguyen, Singapore (SG); Ya Xuan Thong, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 15/121,353

(22) PCT Filed: Feb. 27, 2015

(86) PCT No.: PCT/SG2015/000060
§ 371 (c)(1),
(2) Date: Aug. 24, 2016

(87) PCT Pub. No.: WO2015/130229
PCT Pub. Date: Sep. 3, 2015

(65) Prior Publication Data
US 2017/0137291 A1    May 18, 2017

Related U.S. Application Data

(60) Provisional application No. 62/041,835, filed on Aug. 26, 2014, provisional application No. 61/945,414, filed on Feb. 27, 2014.

(51) Int. Cl.
*D01F 9/12* (2006.01)
*B01D 15/36* (2006.01)
(Continued)

(52) U.S. Cl.
CPC ........... *B01D 15/426* (2013.01); *B01D 15/36* (2013.01); *C01B 32/172* (2017.08); *B82Y 30/00* (2013.01);
(Continued)

(58) Field of Classification Search
CPC ............ C01B 31/0266; C01B 2202/22; C01B 32/172; C01B 31/022; C01B 31/0226;
(Continued)

(56) References Cited

U.S. PATENT DOCUMENTS

2004/0038251 A1* 2/2004 Smalley ............... B82Y 15/00
                                                               435/6.11
2010/0256307 A1* 10/2010 Diner .................... B82Y 30/00
                                                               525/330.1
(Continued)

OTHER PUBLICATIONS

No Author, Anionic, Nonionic, Cationic What do these surfactant names really mean? accessed online at: http://www.cleanfax.com/carpet-care/anionic-nonionic-cationic-what-do-they-all-mean/ on Sep. 21, 2017.*
(Continued)

*Primary Examiner* — Daniel McCracken
(74) *Attorney, Agent, or Firm* — Seed IP Law Group LLP; John Morgan

(57) ABSTRACT

In various embodiments, a method for separating semiconducting single-walled carbon nanotubes from metallic single-walled carbon nanotubes may be provided. The method may include the steps of (a) passing a carbon nanotube dispersion over a charged material. The dispersion may include a mixture of the semiconducting carbon nanotubes and the metallic single-walled carbon nanotubes. The method may further include (b) passing an eluent solution through the charged material after (a). The method may also include (c) collecting an eluate including semiconducting carbon nanotubes or a mixture of semiconducting carbon nanotubes and metallic carbon nanotubes.

17 Claims, 51 Drawing Sheets

(51) Int. Cl.
  B01D 15/42    (2006.01)
  C01B 32/172   (2017.01)
  B82Y 40/00    (2011.01)
  B82Y 30/00    (2011.01)
(52) U.S. Cl.
  CPC .......... B82Y 40/00 (2013.01); C01B 2202/22
    (2013.01); Y10S 977/742 (2013.01); Y10S
    977/845 (2013.01); Y10S 977/932 (2013.01)
(58) Field of Classification Search
  CPC .............. C01B 31/0233; C01B 31/024; C01B
    31/0246; C01B 31/0253; C01B 31/026;
    C01B 31/0273; C01B 31/028; C01B
    31/0286; C01B 31/0293; C01B 2202/02;
    C01B 2202/04; C01B 2202/06; C01B
    2202/08; C01B 2202/10; C01B 2202/20;
    C01B 2202/24; C01B 2202/26; C01B
    2202/28; C01B 2202/30; C01B 2202/32;
    C01B 2202/34; C01B 2202/36; C01B
    2202/00; B01D 15/36; B01D 15/426;
    B82Y 30/00; B82Y 40/00; B82Y 5/00;
    B82Y 10/00; B82Y 15/00; B82Y 20/00;
    B82Y 25/00; B82Y 35/00; B82Y 99/00;
    Y10S 977/845; Y10S 977/932; Y10S
    977/742; D01F 9/10; D01F 9/127; D01F
    9/1271; D01F 9/1272; D01F 9/1273;
    D01F 9/1274; D01F 9/1275; D01F 9/12
  See application file for complete search history.

(56) References Cited

U.S. PATENT DOCUMENTS

2011/0280791 A1   11/2011   Tanaka et al.
2014/0308194 A1*  10/2014   Chan ..................... B82Y 40/00
                                                    423/447.1

OTHER PUBLICATIONS

No Author, Sodium Deoxycholate Detergent, accessed online at https://www.thermofisher.com/order/catalog/product/89904 on Sep. 21, 2017.*
Antaris et al., "Sorting Single-Walled Carbon Nanotubes by Electronic Type Using Nonionic, Biocompatible Block Copolymers," ACS Nano 4(8):4725-4732, 2010.
Arnold et al., "Sorting carbon nanotubes by electronic structure using density differentiation," Nature Nanotechnology 1(1):60-65, 2006.
Blanch et al., "Optimizing Surfactant Concentrations for Dispersion of Single-Walled Carbon Nanotubes in Aqueous Solution," Journal of Physical Chemistry B 114(30):9805-9811, 2010.
Blanch et al., "The role of sodium dodecyl sulfate concentration in the separation of carbon nanotubes using gel chromatography," Carbon 60:471-480, 2013.
Campidelli et al., "Separation of Metallic and Semiconducting Single-Walled Carbon Nanotubes via Covalent Functionalization," Small 3(10):1672-1676, 2007.
Cao et al., "Arrays of single-walled carbon nanotubes with full surface coverage for high-performance electronics," Nature Nanotechnology 8(3):180-186, 2013.
Cao et al., "Gate capacitance coupling of singled-walled carbon nanotube thin-film transistors," Applied Physics Letters 90(2):023516, 2007. (3 pages).
Cao et al., "Single-walled carbon nanotubes for high-performance electronics," Nanoscale 5(19):8852-8863, 2013.
Cao et al., "Ultrathin Films of Single-Walled Carbon Nanotubes for Electronics and Sensors: A Review of Fundamental and Applied Aspects," Advanced Materials 21(1):29-53, 2009.
Chattopadhyay et al., "A Route for Bulk Separation of Semiconducting from Metallic Single-Wall Carbon Nanotubes," Journal of the American Chemical Society 125(11):3370-3375, 2003.
Chen et al., "The Role of Metal-Nanotube Contact in the Performance of Carbon Nanotube Field-Effect Transistors," Nano Letters 5(7):1497-1502, 2005. (7 pages).
Franklin et al., "Sub-10 nm Carbon Nanotube Transistor," Nano Letters 12(2):758-762, 2012.
Franklin, "The road to carbon nanotube transistors," Nature 498(7455):443-444, 2013.
Ghosh et al., "Advanced sorting of single-walled carbon nanotubes by nonlinear density-gradient ultracentrifugation," Nature Nanotechnology 5(6):443-450, 2010.
Global Agenda Council on Emerging Technologies, "Top 10 Emerging Technologies 2014," World Economic Forum Annual Meeting, World Economic Forum, Davos-Klosters, Switzerland, Jan. 22-25, 2014. (12 pages).
Green et al., "Colored Semitransparent Conductive Coatings Consisting of Monodisperse Metallic Single-Walled Carbon Nanotubes," Nano Letters 8(5):1417-1422, 2008.
Hassanien et al., "Selective etching of metallic single-wall carbon nanotubes with hydrogen plasma," Nanotechnology 16(2):278-281, 2005.
Hirano et al., "pH- and Solute-Dependent Adsorption of Single-Wall Carbon Nanotubes onto Hydrogels: Mechanistic Insights into the Metal/Semiconductor Separation," ACS Nano 7(11):10285-10295, 2013.
Inori et al., "One-pass separation of single-wall carbon nanotubes by gel chromatography with a gradient of surfactant concentration," Nanotechnology 23(23):235708, 2012. (7 pages).
Jin et al., "Using nanoscale thermocapillary flows to create arrays of purely semiconducting single-walled carbon nanotubes," Nature Nanotechnology 8(5):347-355, 2013.
Khripin et al., "Spontaneous Partition of Carbon Nanotubes in Polymer-Modified Aqueous Phases," Journal of the American Chemical Society 135(18):6822-6825, 2013.
Kim et al., "Raman and IR Spectroscopy of Chemically Processed Single-Walled Carbon Nanotubes," Journal of the American Chemical Society 127(44):15437-15445, 2005.
Krupke et al., "Separation of Metallic from Semiconducting Single-Walled Carbon Nanotubes," Science 301(5631):344-347, 2003. (5 pages).
Lee et al., "High-Performance Inkjet Printed Carbon Nanotube Thin Film Transistors with High-k $HfO_2$ Dielectric on Plastic Substrate," Small 8(19):2941-2947, 2012.
Lee et al., "Selective dispersion of high purity semiconducting single-walled carbon nanotubes with regioregular poly(3-alkylthiophene)s," Nature Communications 2:541, 2011. (8 pages).
LeMieux et al., "Self-Sorted, Aligned Nanotube Networks for Thin-Film Transistors," Science 321(5885):101-104, 2008. (5 pages).
Li et al., "In Situ Charge-Transfer-Induced Transition from Metallic to Semiconducting Single-Walled Carbon Nanotubes," Chemistry of Materials 25(22):4464-4470, 2013.
Li et al., "On-chip diameter-dependent conversion of metallic to semiconducting single-walled carbon nanotubes by immersion in 2-ethylanthraquinone," RSC Advances 2(4):1275-1281, 2012.
Liu et al., "Diameter-Selective Metal/Semiconductor Separation of Single-wall Carbon Nanotubes by Agarose Gel," The Journal of Physical Chemistry C 114(20):9270-9276, 2010.
Lu et al., "Metallic single-walled carbon nanotubes for transparent conductive films," Chemical Physics Letters 497(1-3):57-61, 2010.
Martel et al., "Single- and multi-wall carbon nanotube field-effect transistors," Applied Physics Letters 73(17):2447-2449, 1998.
Matsuhiro et al., "Agars from Chilean Gelidiaceae," Hydrobiologia 221(1):149-156, 1991.
Mesgari et al., "High Selectivity cum Yield Gel Electrophoresis Separation of Single-Walled Carbon Nanotubes Using a Chemically Selective Polymer Dispersant," Journal of Physical Chemistry C 116(18):10266-10273, 2012.
Mistry et al., "High-Yield Dispersions of Large-Diameter Semiconducting Single-Walled Carbon Nanotubes with Tunable Narrow Chirality Distributions," ACS Nano 7(3):2231-2239, 2013.

(56) References Cited

OTHER PUBLICATIONS

Moniruzzaman et al., "Polymer Nanocomposites Containing Carbon Nanotubes," *Macromolecules* 39(16):5194-5205, 2006.
Moshammer et al., "Selective Suspension in Aqueous Sodium Dodecyl Sulfate According to Electronic Structure Type Allows Simple Separation of Metallic from Semiconducting Single-Walled Carbon Nanotubes," *Nano Research* 2(8):599-606, 2009.
Nish et al., "Highly selective dispersion of single-walled carbon nanotubes using aromatic polymers," *Nature Nanotechnology* 2(10):640-646, 2007.
Strano et al., "Electronic Structure Control of Single-Walled Carbon Nanotube Functionalization," *Science* 301(5639):1519-1522, 2003. (5 pages).
Strano et al., "Reversible, Band-Gap-Selective Protonation of Single-Walled Carbon Nanotubes in Solution," *The Journal of Physical Chemistry B* 107(29):6979-6985, 2003.
Suksrichavalit et al., ""Clickable" affinity ligands for effective separation of glycoproteins," *Journal of Chromatography A* 1217(23):3635-3641, 2010.
Sundramoorthy et al., "Scalable and Effective Enrichment of Semiconducting Single-Walled Carbon Nanotubes by a Dual Selective Naphthalene-Based Azo Dispersant," *Journal of the American Chemical Society* 135(15):5569-5581, 2013.
Tanaka et al., "Discovery of Surfactants for Metal/Semiconductor Separation of Single-Wall Carbon Nanotubes via High-Throughput Screening," *Journal of the American Chemical Society* 133(44):17610-17613, 2011.
Tanaka et al., "High-Yield Separation of Metallic and Semiconducting Single-Wall Carbon Nanotubes by Agarose Gel Electrophoresis," *Applied Physics Express* 1(11):114001, 2008. (3 pages).
Tanaka et al., "Mass separation of metallic and semiconducting single-wall carbon nanotubes using agarose gel," *Physica Status Solidi B* 246(11-12):2490-2493, 2009.
Tans et al., "Room-temperature transistor based on a single carbon nanotube," *Nature* 393(6680):49-52, 1998.
Tulevski et al., "High Purity Isolation and Quantification of Semiconducting Carbon Nanotubes via Column Chromatography," *ACS Nano* 7(4):2971-2976, 2013.
Tyler et al., "Narrow Diameter Distributions of Metallic Arc Discharge Single-Walled Carbon Nanotubes via Dual-Iteration Density Gradient Ultracentrifugation," *Advanced Materials* 24(35):4765-4768, 2012.

Wang et al., "High-Performance Partially Aligned Semiconductive Single-Walled Carbon Nanotube Transistors Achieved with a Parallel Technique," *Small* 9(17):2960-2969, 2013.
Wang et al., "Mild Bromination-Assisted Density-Gradient Ultracentrifugation to Sort Single-Walled Carbon Nanotubes by Metallicity," *Journal of Physical Chemistry C* 116(43):23027-23035, 2012.
Wang et al., "Scalable and Selective Dispersion of Semiconducting Arc-Discharged Carbon Nanotubes by Dithiafulvalene/Thiophene Copolymers for Thin Film Transistors," *ACS Nano* 7(3):2659-2668, 2013.
Wang et al., "Wafer-Scale Fabrication of Separated Carbon Nanotube Thin-Film Transistors for Display Applications," *Nano Letters* 9(12):4285-4291, 2009.
Weisman et al., "Dependence of Optical Transition Energies on Structure for Single-Walled Carbon Nanotubes in Aqueous Suspension: An Empirical Kataura Plot," *Nano Letters* 3(9):1235-1238, 2003.
Yuan et al., "Use of Polyimide-graft-Bisphenol A Diglyceryl Acrylate as a Reactive Noncovalent Dispersant of Single-Walled Carbon Nanotubes for Reinforcement of Cyanate Ester/Epoxy Composite," *Chemistry of Materials* 22(24):6542-6554, 2010.
Zhang et al., "Comparative study of gel-based separated arc-discharge, HiPCO, and CoMoCAT carbon nanotubes for macroelectronic applications," *Nano Research* 6(12):906-920, 2013. (19 pages).
Zhang et al., "Selective Etching of Metallic Carbon Nanotubes by Gas-Phase Reaction," *Science* 314(5801):974-977, 2006. (5 pages).
Zhang et al., "Separation and/or selective enrichment of single-walled carbon nanotubes based on their electronic properties," *Chemical Society Reviews* 40(3):1324-1336, 2011.
Zhang et al., "Transparent, Conductive, and Flexible Carbon Nanotube Films and Their Application in Organic Light-Emitting Diodes," *Nano Letters* 6(9):1880-1886, 2006.
Zheng et al., "DNA-assisted dispersion and separation of carbon nanotubes," *Nature Materials* 2(5):338-342, 2003.
Zheng et al., "Solution Redox Chemistry of Carbon Nanotubes," *Journal of the American Chemical Society* 126(47):15490-15494, 2004.
Zheng et al., "Structure-Based Carbon Nanotube Sorting by Sequence-Dependent DNA Assembly," *Science* 302(5650):1545-1548, 2003. (5 pages).

\* cited by examiner

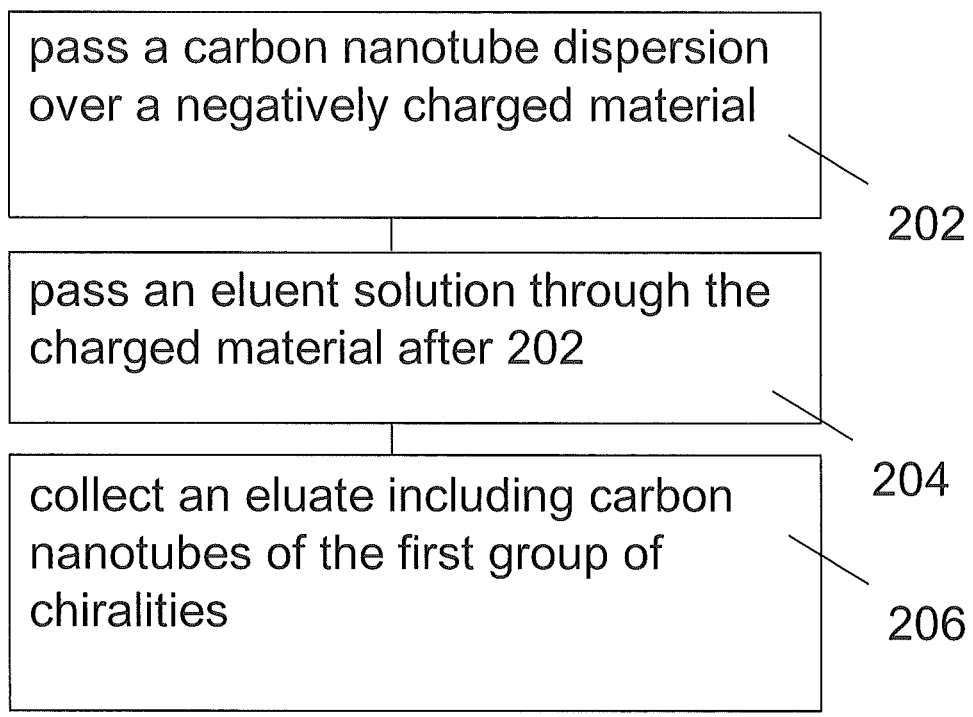

FIG. 3A
<u>300a</u>
a     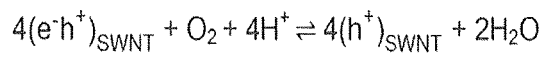
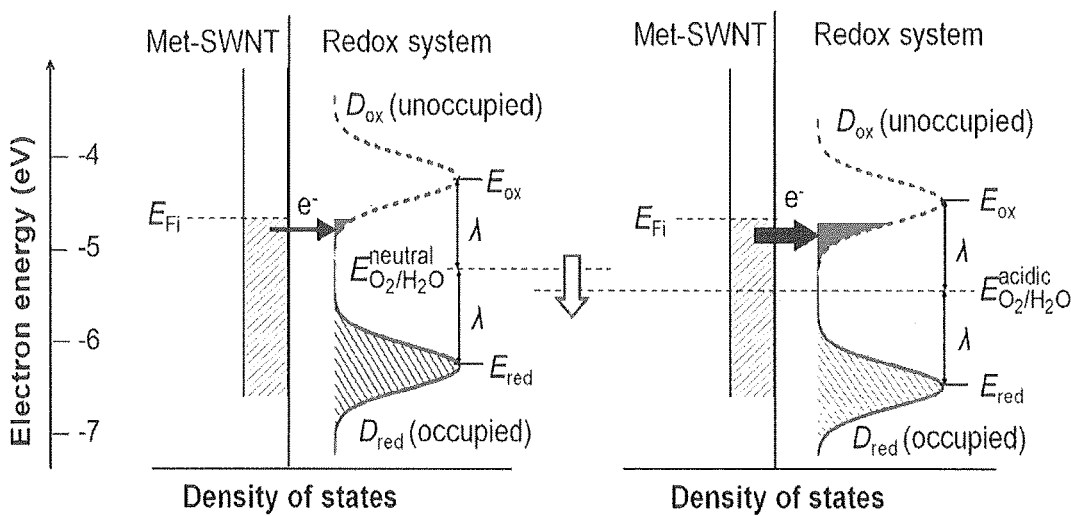
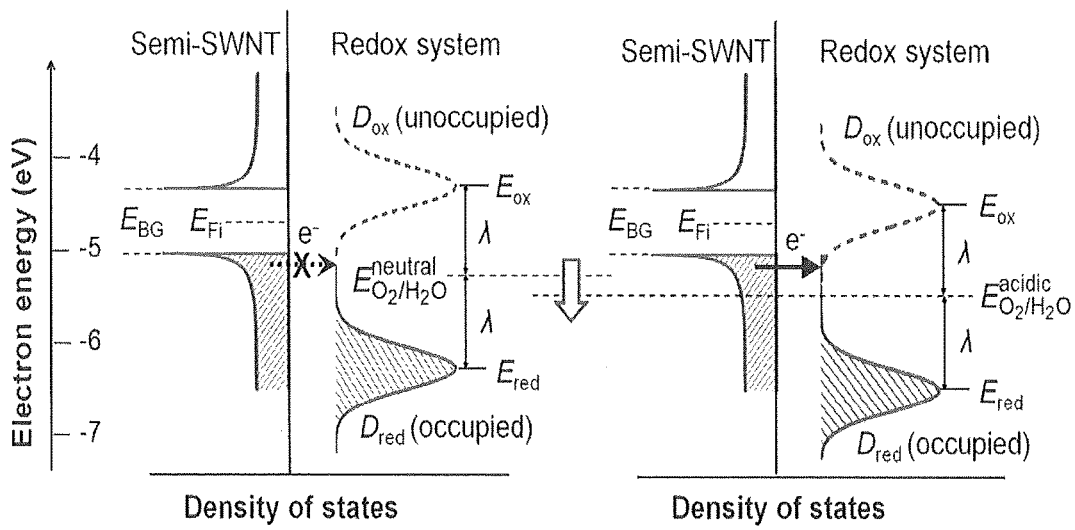

FIG. 3B
300b
Neutral
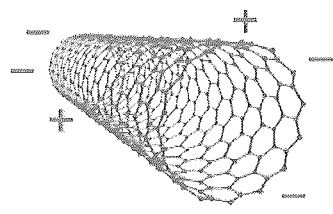
Met-SWNT
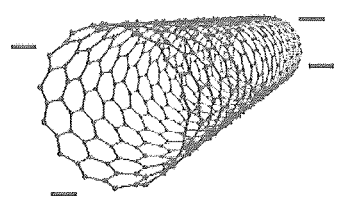
Semi-SWNT
Acidic
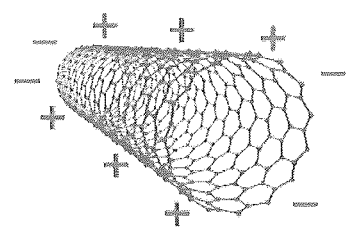
Met-SWNT
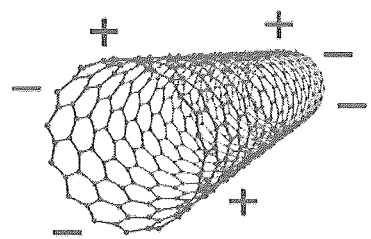
Semi-SWNT

METHODS FOR SEPARATING CARBON NANOTUBES

CROSS-REFERENCE TO RELATED APPLICATION

This application claims the benefit of priority of U.S. patent application No. 61/945,414, filed 27 Feb. 2014, as well as U.S. patent application No. 62/041,835, filed 26 Aug. 2014, the content of them being hereby incorporated by reference in their entirety for all purposes.

TECHNICAL FIELD

Various aspects of this disclosure relate to methods for sorting or separating carbon nanotubes.

BACKGROUND

Single-walled carbon nanotubes are thought to be the ideal candidate materials for next-generation nanoelectronics, sensing devices and optoelectronics. A key stumbling block is the contamination from metallic (met-) SWNTs, which significantly affect device performance and yield by shorting the source and drain electrodes. It is a daunting challenge to effectively remove those met-SWNTs since all known nanotube synthesis methods produce mixtures of semiconducting (semi-) and met-SWNTs and the differences in most of their physical and chemical properties are subtle. In the past decade, numerous sorting methods have been explored. Some methods exploit the significant different electronic properties. The metallic-selective electrical breakdown methods exploit the vastly different intrinsic electronic transport properties between species but these techniques require complex transistor gating structure which is difficult to implement realistically. Various chirality-selective charge transfer chemical reactions have been shown to be highly sensitive to differences in the chirality-dependent nanotube electronic density of states but have not demonstrated high sorting purity. Some possible causes are other competing tube-tube interactions such as strong tube-tube interaction that cause bundling, solvent-tube interaction, and insensitivity of chosen physical technique (e.g. electrophoresis or centrifugation) which probe the indirect properties (e.g. mobility or mass) of the reaction product.

Another class of techniques exploits the selective binding of certain surfactants/polymers/DNA on semiconducting nanotubes and these utilize the indirect subtle structural differences between the nanotube species. Various recently demonstrated sorting techniques in this class such as Density Gradient Ultracentrifugation (DGU) and column chromatography (CC) are based on the same anionic co-surfactant system of sodium dodecyl sulphate (SDS) and sodium cholate (SC). The surfactants have been thought to aggregate differentially around met-SWNTs versus semi-SWNTs due to their different polarizabilities. These biomolecules also function as dispersing agents to suspend the nanotubes as individual species that otherwise bundle to prevent sorting. Although these bulk methods involving dispersing agents are convenient, the sorting selectivity (of around 95%) may still be insufficient. Multiple DGU cycles or multiple may be required to pass through the column to achieve around 99% purity, which may lower the throughput and increase cost. All these existing bulk sorting methods are based on subtle and indirect differences between the metallic and semiconducting nanotubes and such small indirect differences between nanotube species may make it difficult to achieve high throughput and high purity needed. A purity of around 99.99% may be required for nanoelectronics.

SUMMARY

In a first aspect, a method for separating semiconducting carbon nanotubes from metallic carbon nanotubes may be provided. The method may include the steps of (a) passing a carbon nanotube dispersion over a charged material. The dispersion may include a mixture of the semiconducting carbon nanotubes and the metallic carbon nanotubes. The method may further include (b) passing an eluent solution through the charged material after (a). The eluent solution may include a first dispersing agent without a net charge. The method may also include (c) collecting an eluate including semiconducting carbon nanotubes or a mixture of semiconducting carbon nanotubes and metallic carbon nanotubes.

In a second aspect, a method for separating carbon nanotubes of a first group of chiralities from carbon nanotubes of a second group of chiralities may be provided. The method may include the steps of (a) passing a carbon nanotube dispersion over a negatively charged material. The dispersion may include the carbon nanotubes of a first group of chiralities and the carbon nanotubes of a second group of chiralities. The method may further include (b) passing an eluent solution through the charged material after (a). The eluent solution may include a first non-ionic dispersing agent. The method may also include (c) collecting an eluate including carbon nanotubes of the first group of chiralities.

BRIEF DESCRIPTION OF THE DRAWINGS

The invention will be better understood with reference to the detailed description when considered in conjunction with the non-limiting examples and the accompanying drawings, in which:

FIG. 2 is a schematic illustrating a method for separating semiconducting carbon nanotubes from metallic carbon nanotubes according to one embodiment.

FIG. 3A is a plot of Fermi level (or electron energy, in electron volts or eV) against density of states of the carbon nanotubes in different conditions.

FIG. 3B is a schematic of the carbon nanotubes in different conditions.

spectra of unsorted SWNTs dispersed in 2% sodium dodecyl sulphate (SDS) before and after passing through Sepharose 4B column.

Figure 22:
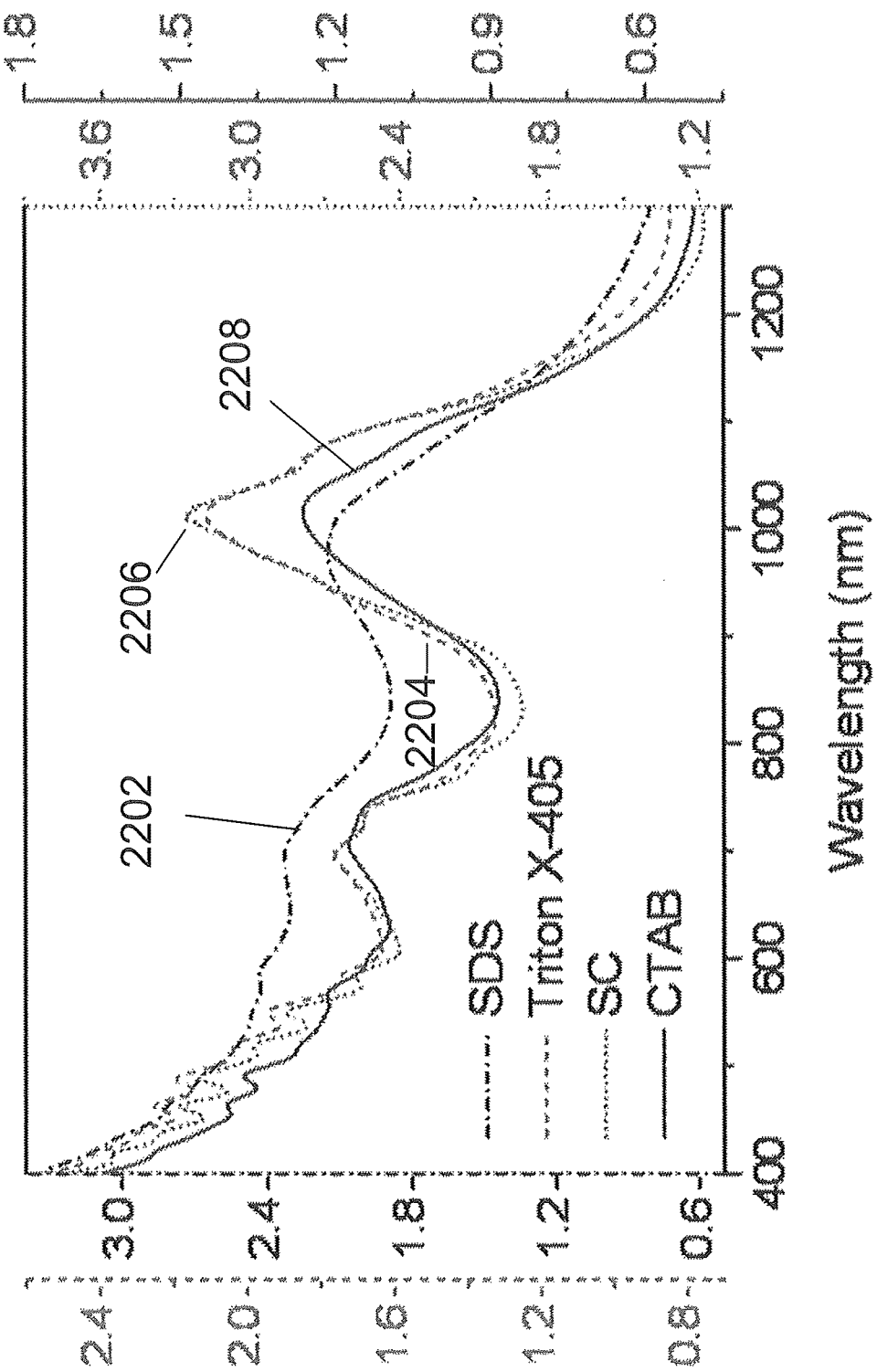

FIG. 22 is a graph of normalized absorbance (in arbitrary units or a.u.) as a function of wavelength (nanometers or nm) showing the ultraviolet-visible-near infrared (UV-vis-NIR) spectra of unsorted SWNTs dispersed in 2% sodium dodecyl sulphate SDS, 2.8% Triton X-405, 1% sodium cholate and 1% cetyltrimethylammonium bromide CTAB.

Figure 23A:
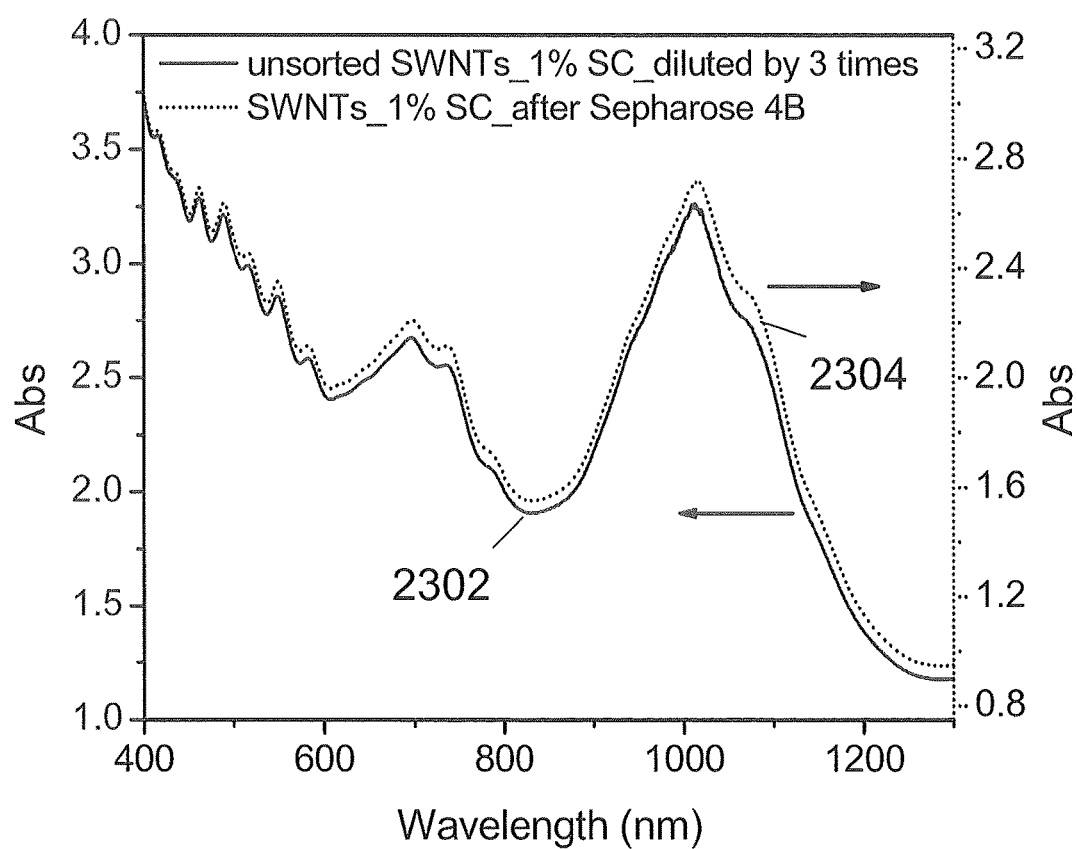

FIG. 23A is a graph of normalized absorbance (in arbitrary units or a.u.) as a function of wavelength (nanometers or nm) showing the ultraviolet-visible-near infrared (UV-vis-NIR) spectra of unsorted single-walled nanotubes (SWNTs) dispersed in 1% sodium cholate SC before and after passing through Sepharose 4B column.

Figure 23B:
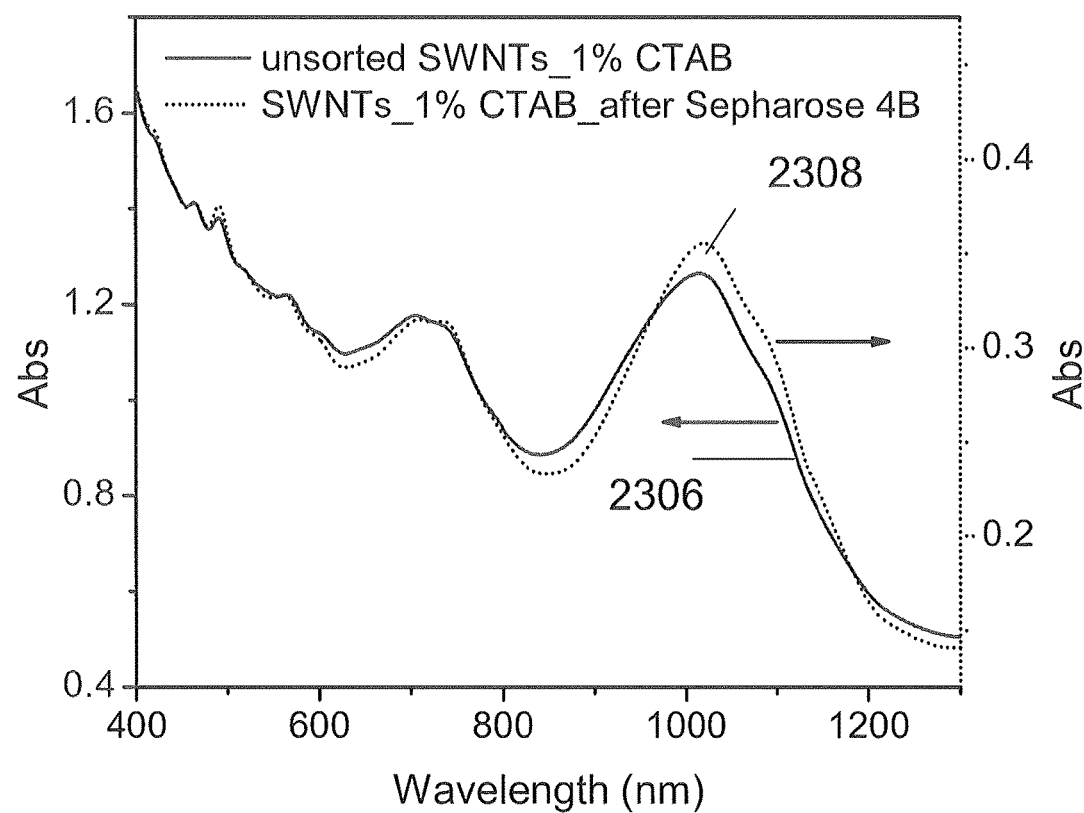

FIG. 23B is a graph of normalized absorbance (in arbitrary units or a.u.) as a function of wavelength (nanometers or nm) showing the ultraviolet-visible-near infrared (UV-vis-NIR) spectra of unsorted single-walled nanotubes (SWNTs) dispersed in 1% CTAB before and after passing through Sepharose 4B column.

Figure 24:
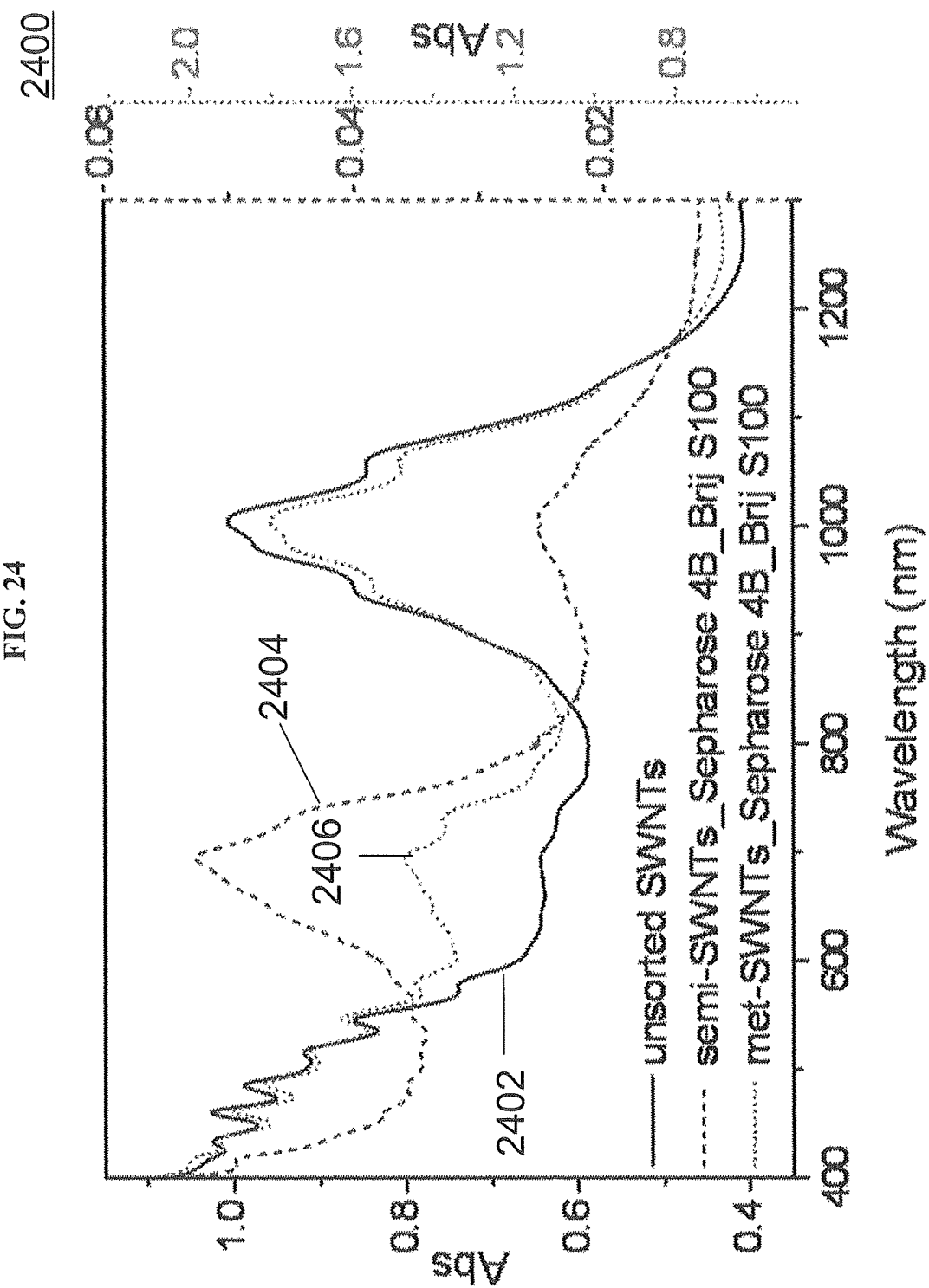

FIG. 24 is a graph of absorbance (in arbitrary units or a.u.) as a function of wavelength (nanometers or nm) showing the ultraviolet-visible-near infrared (UV-vis-NIR) spectra of unsorted, sorted semiconducting, and metallic SWNTs with 5% Brij S100 as surfactant (Sepharose 4B column).

Figure 25A:
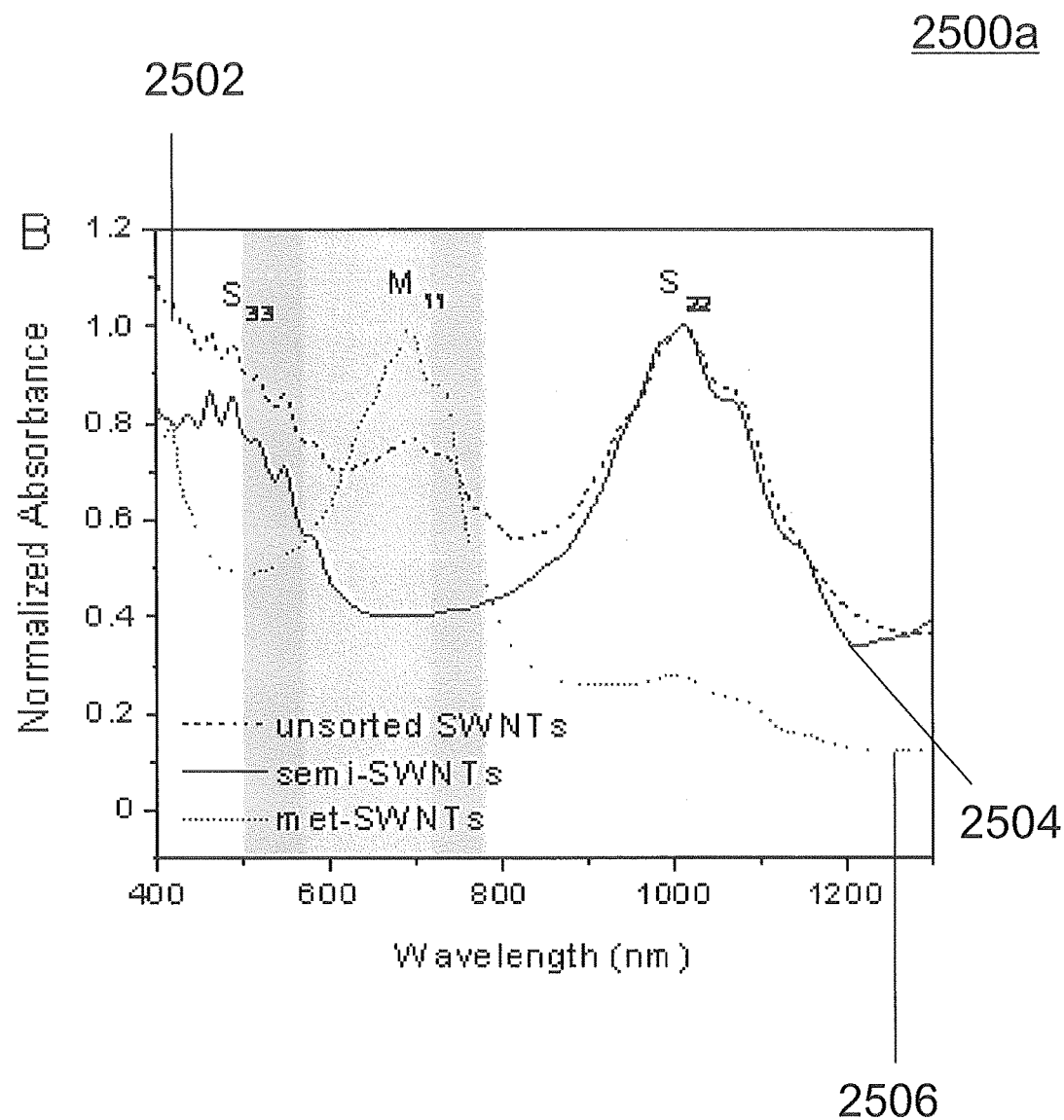

FIG. 25A is a graph of normalized absorbance (in arbitrary units or a.u.) as a function of wavelength (nanometers or nm) illustrating the ultraviolet-visible-near infrared (UV-vis-NIR) spectra of unsorted SWNTs, semiconducting SWNTs, and metallic SWNTs sorted by Sepharose-CR beads.

Figure 25B:
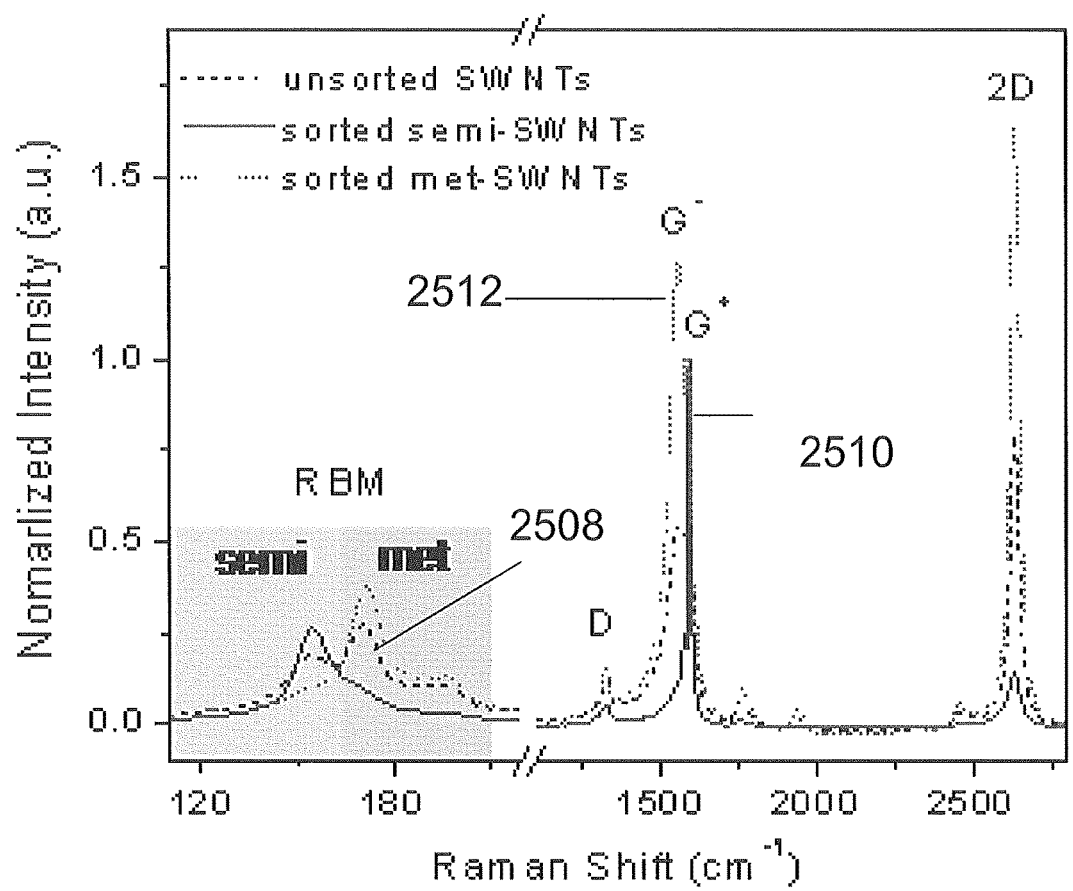

FIG. 25B is a graph of normalized absorbance (in arbitrary units or a.u.) as a function of raman shift ($cm^{-1}$) illustrating the Raman spectra (633 nm, red laser) of unsorted arc-discharge SWNTs, semiconducting and metallic SWNTs sorted by Sepharose-CR beads.

Figure 26A:
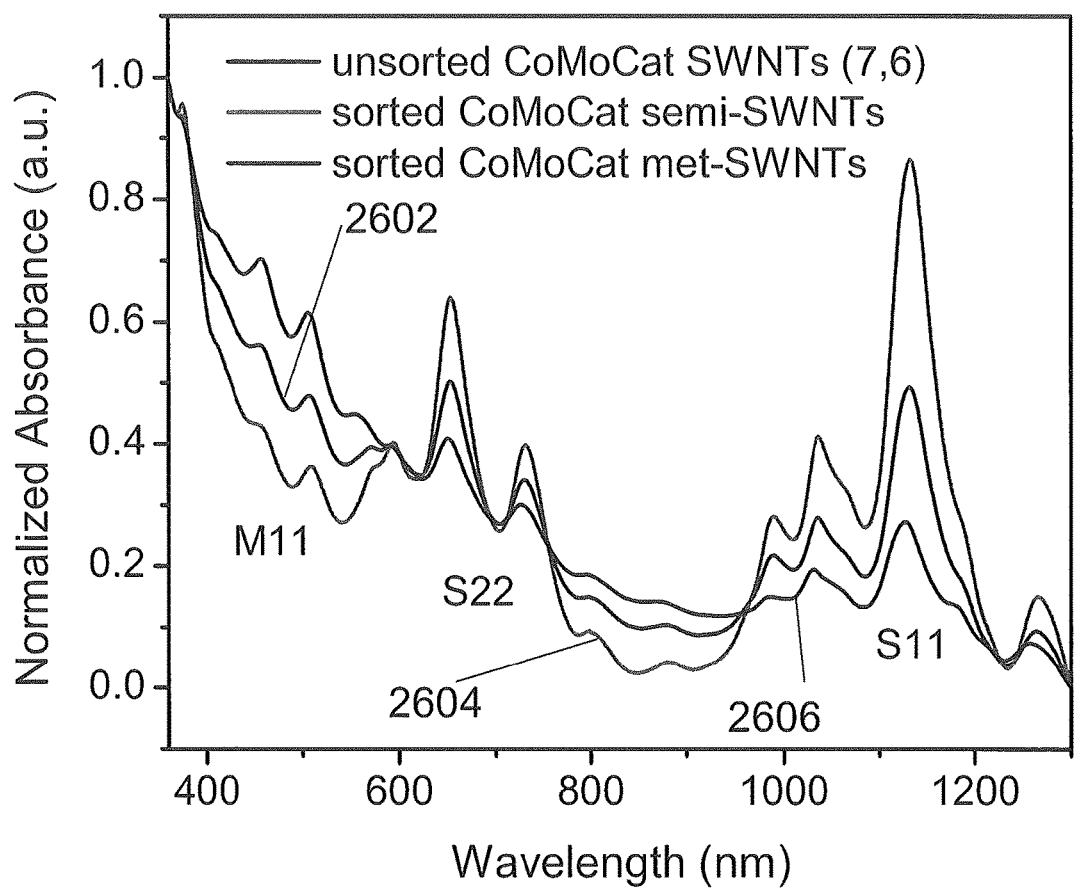

FIG. 26A is a graph of normalized absorbance (in arbitrary units or a.u.) as a function of wavelength (nanometers or nm) illustrating the ultraviolet-visible-near infrared (UV-vis-NIR) spectra of unsorted CoMoCat® SWNTs, sorted CoMoCat® semiconducting SWNTs, and sorted CoMoCat® metallic SWNTs.

Figure 26B:
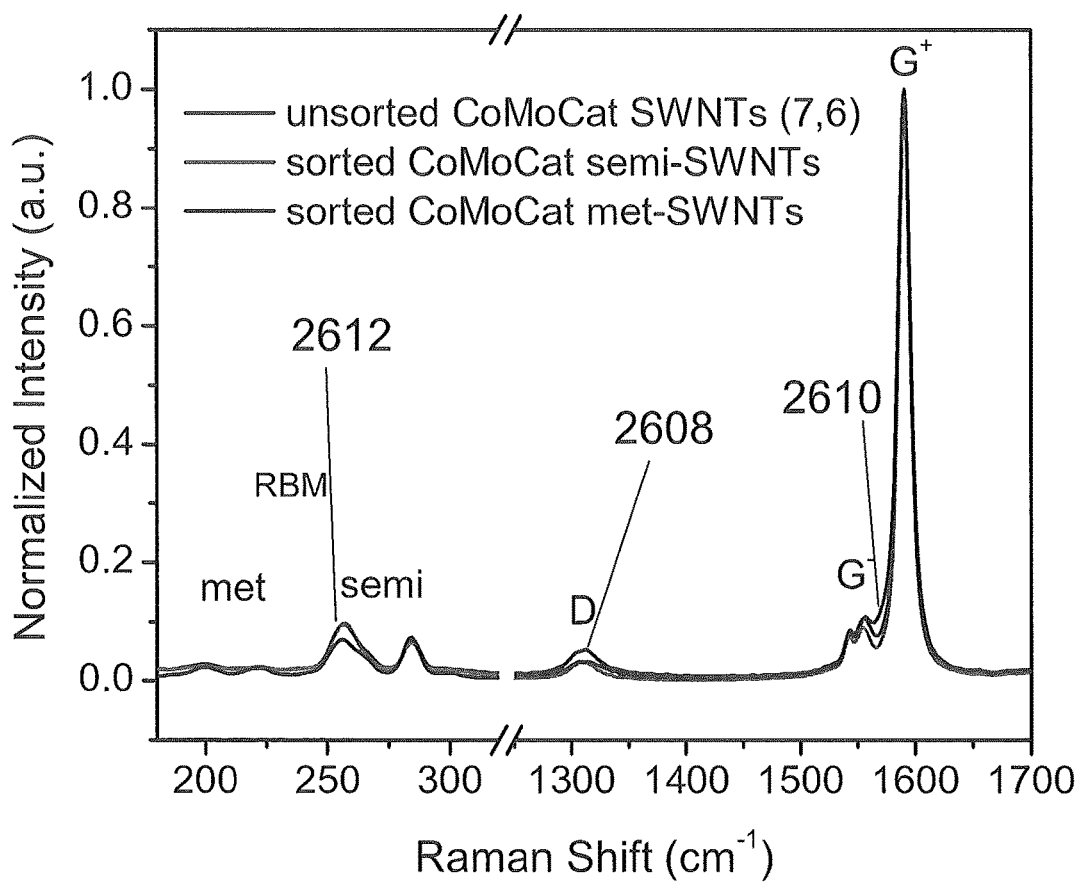

FIG. 26B is a graph of normalized intensity (in arbitrary units or a.u.) as a function of raman shift ($cm^{-1}$) illustrating the Raman spectra (633 nm, red laser) of unsorted CoMoCat® SWNTs, sorted CoMoCat® semiconducting SWNTs, and sorted CoMoCat® metallic SWNTs.

Figure 27A:
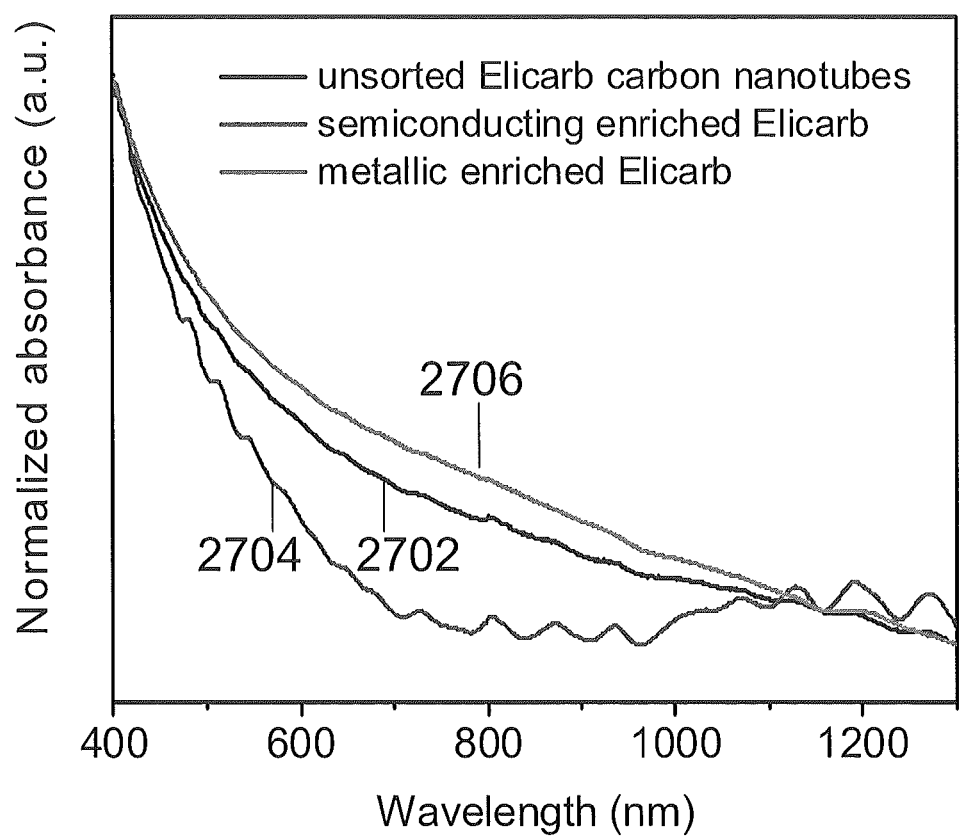

FIG. 27A is a graph of normalized absorbance (in arbitrary units or a.u.) as a function of wavelength (nanometers or nm) illustrating the ultraviolet-visible-near infrared (UV-vis-NIR) spectra of unsorted Elicarb® carbon nanotubes (mixture of single-walled and double-walled carbon nanotubes, sorted semiconducting Elicarb® carbon nanotubes, and metallic Elicarb® carbon nanotubes.

Figure 27B:
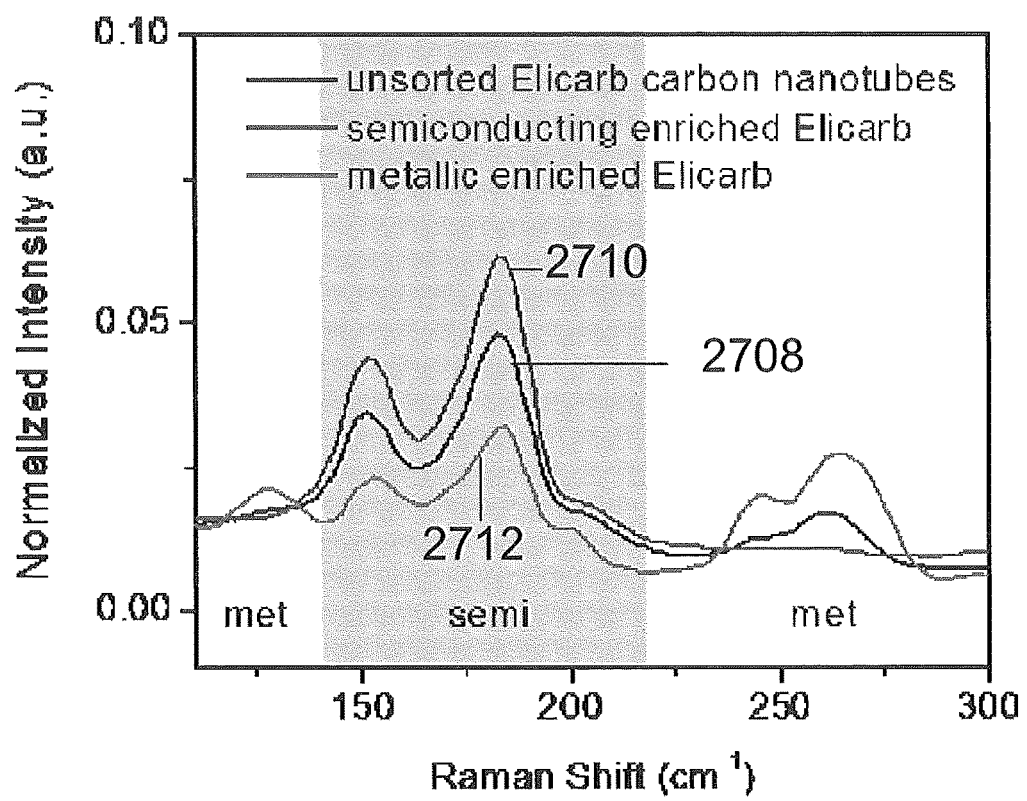

FIG. 27B is a graph of normalized intensity (in arbitrary units or a.u.) as a function of raman shift ($cm^{-1}$) illustrating the Raman spectra (514 nm, green laser) of unsorted Elicarb® carbon nanotubes (mixture of single-walled and double-walled carbon nanotubes), sorted Elicarb® semiconducting carbon nanotubes, and sorted Elicarb® metallic carbon nanotubes. FIG. 27B is plotted over a range of 110 $cm^{-1}$ to 300 $cm^{-1}$.

Figure 27C:
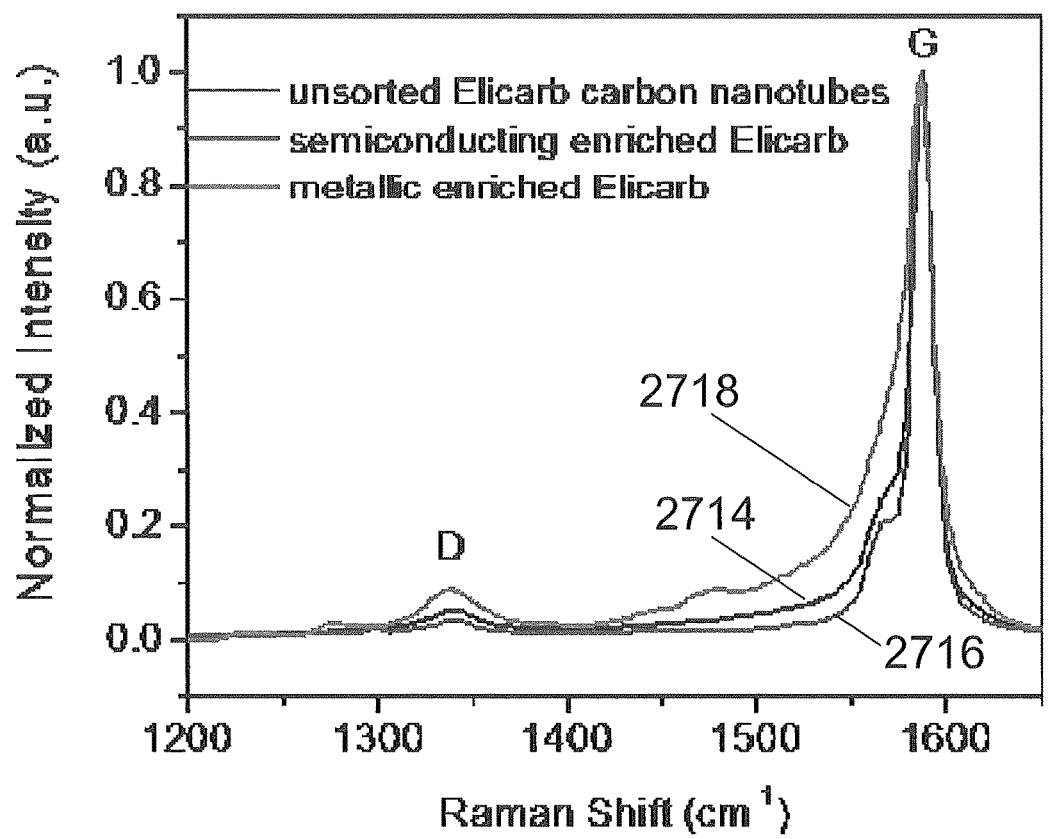

FIG. 27C is a graph of normalized intensity (in arbitrary units or a.u.) as a function of raman shift ($cm^{-1}$) illustrating the Raman spectra (514 nm, green laser) of unsorted Elicarb® carbon nanotubes (mixture of single-walled and double-walled carbon nanotubes), sorted Elicarb® semiconducting carbon nanotubes, and sorted Elicarb® metallic carbon nanotubes. FIG. 27C is plotted over a range of 1200 $cm^{-1}$ to 1600 $cm^{-1}$.

Figure 27D:
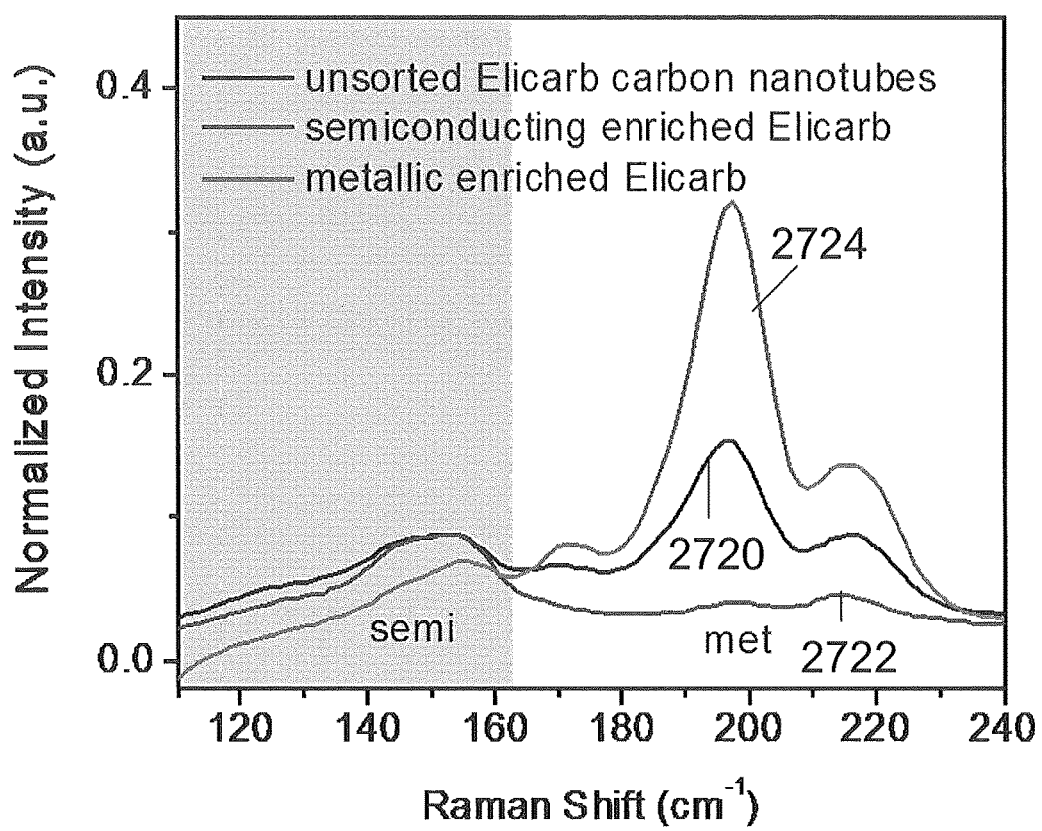

FIG. 27D is a graph of normalized intensity (in arbitrary units or a.u.) as a function of raman shift ($cm^{-1}$) illustrating the Raman spectra (633 nm, red laser) of unsorted Elicarb® carbon nanotubes (mixture of single-walled and double-walled carbon nanotubes), sorted Elicarb® semiconducting carbon nanotubes, and sorted Elicarb® metallic carbon nanotubes. FIG. 27D is plotted over a range of 110 $cm^{-1}$ to 240 $cm^{-1}$.

Figure 27E:
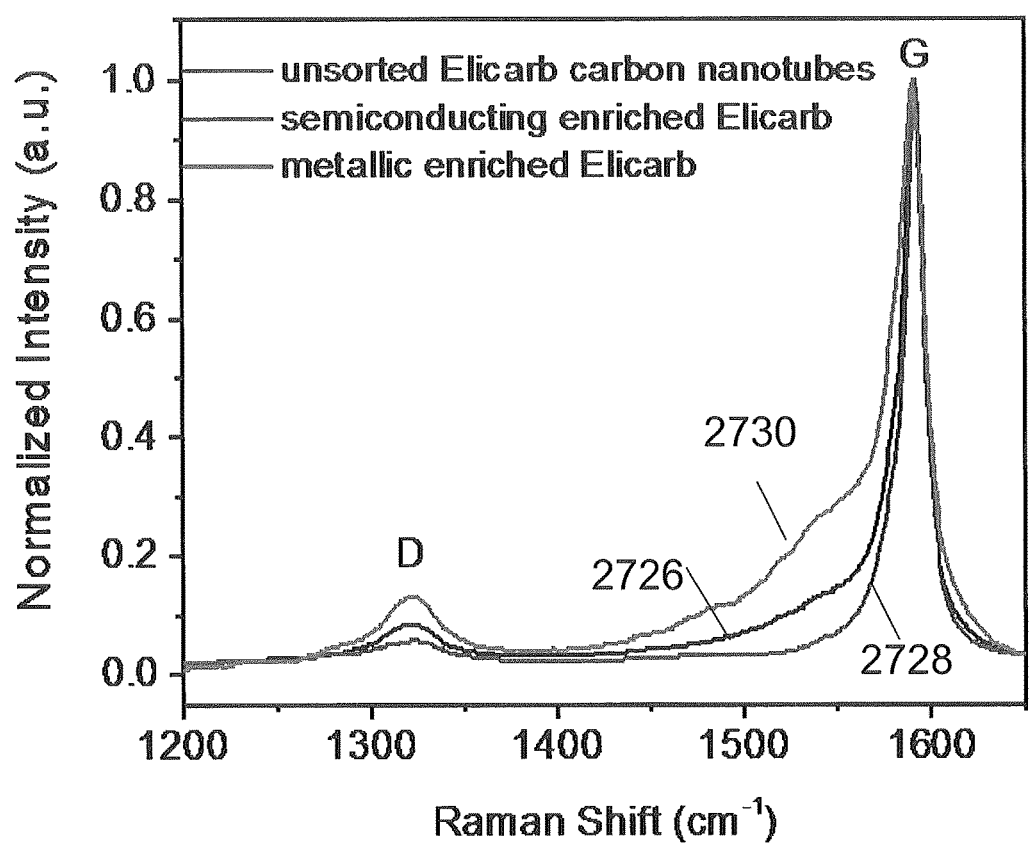

FIG. 27E is a graph of normalized intensity (in arbitrary units or a.u.) as a function of raman shift ($cm^{-1}$) illustrating the Raman spectra (633 nm, red laser) of unsorted Elicarb® carbon nanotubes (mixture of single-walled and double-walled carbon nanotubes), sorted Elicarb® semiconducting carbon nanotubes, and sorted Elicarb® metallic carbon nanotubes. FIG. 27E is plotted over a range of 1200 $cm^{-1}$ to 1650 $cm^{-1}$.

Figure 27F:
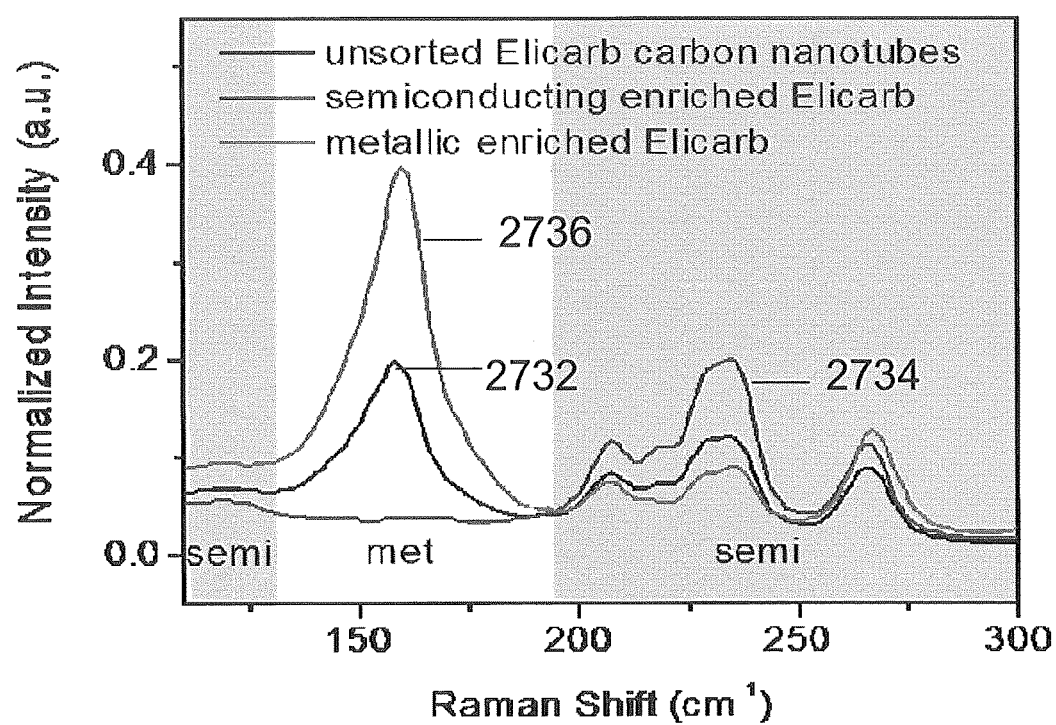

FIG. 27F is a graph of normalized intensity (in arbitrary units or a.u.) as a function of raman shift ($cm^{-1}$) illustrating the Raman spectra (785 nm, red laser) of unsorted Elicarb® carbon nanotubes (mixture of single-walled and double-walled carbon nanotubes), sorted Elicarb® semiconducting carbon nanotubes, and sorted Elicarb® metallic carbon nanotubes. FIG. 27F is plotted over a range of 110 $cm^{-1}$ to 300 $cm^{-1}$.

Figure 27G:
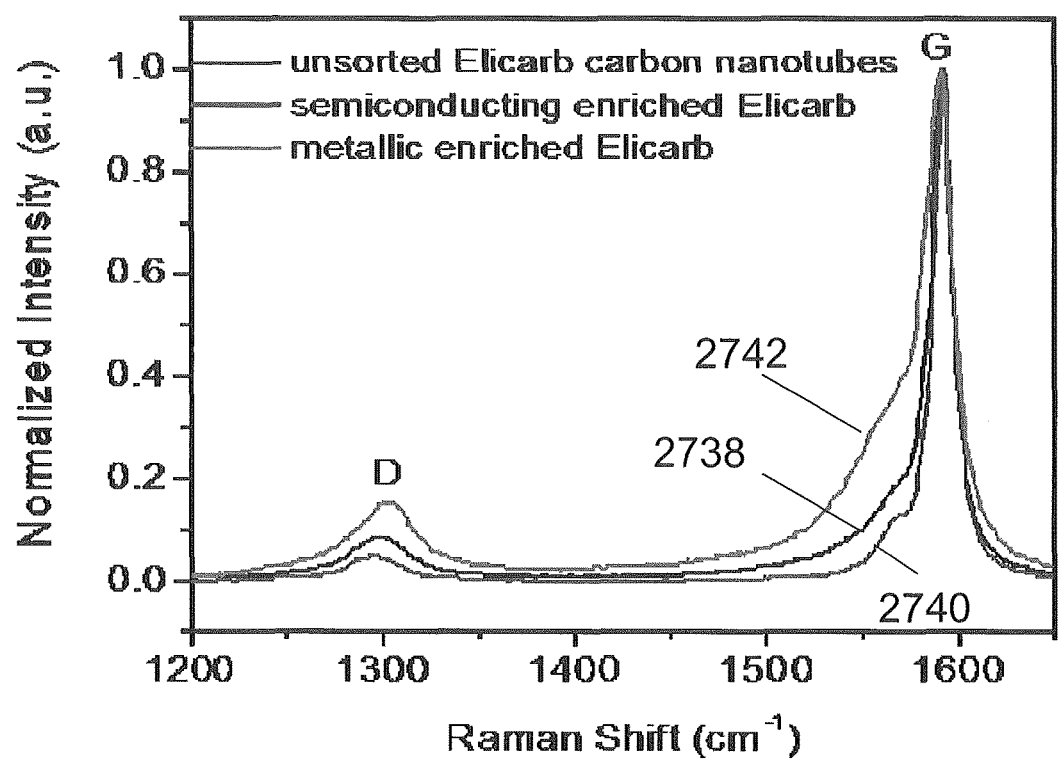

FIG. 27G is a graph of normalized intensity (in arbitrary units or a.u.) as a function of raman shift ($cm^{-1}$) illustrating the Raman spectra (785 nm, red laser) of unsorted Elicarb® carbon nanotubes (mixture of single-walled and double-walled carbon nanotubes), sorted Elicarb® semiconducting carbon nanotubes, and sorted Elicarb® metallic carbon nanotubes. FIG. 27G is plotted over a range of 1200 $cm^{-1}$ to 1650 $cm^{-1}$.

DETAILED DESCRIPTION

The following detailed description refers to the accompanying drawings that show, by way of illustration, specific details and embodiments in which the invention may be practiced.

Figure 1:
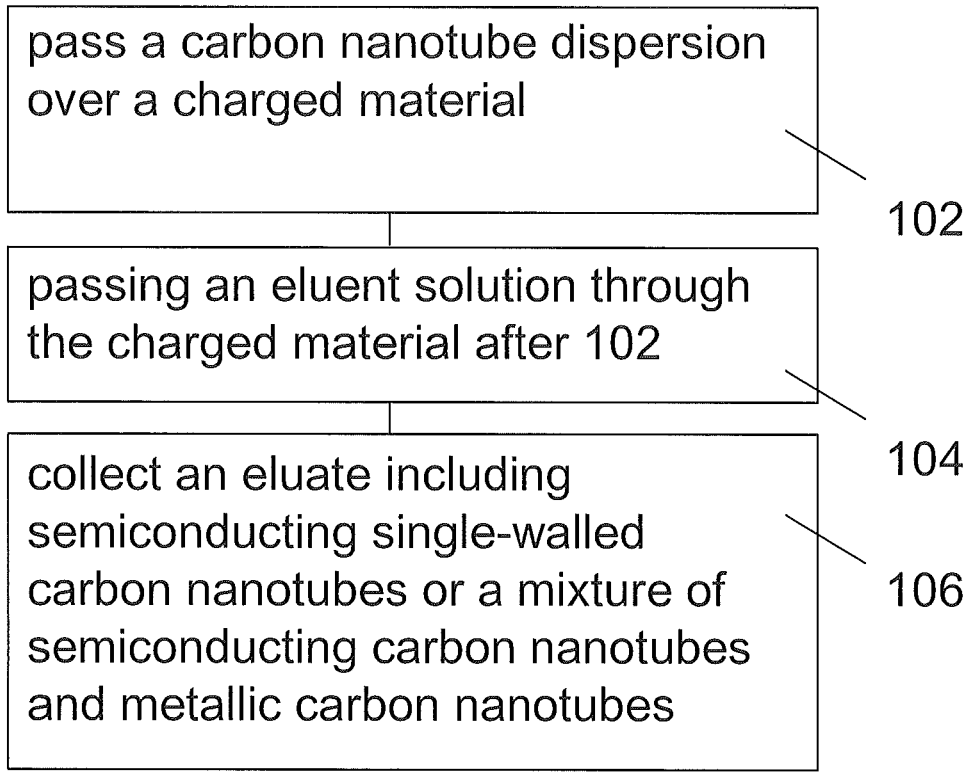
FIG. 1 is a schematic illustrating a method for separating semiconducting carbon nanotubes from metallic carbon nanotubes according to one embodiment.

FIG. 1 is a schematic 100 illustrating a method for separating semiconducting carbon nanotubes from metallic carbon nanotube according to one embodiment. The method may include (the steps of), in 102, passing a carbon nanotube dispersion over or through a charged material. The dispersion may include a mixture of the semiconducting carbon nanotubes and the metallic carbon nanotubes. The method may further include, in 104, passing an eluent solution over or through the charged material after 102. The eluent solution may include a first dispersing agent without a net charge. The method may also include, in 106, collecting an eluate including semiconducting carbon nanotubes, or a mixture of semiconducting carbon nanotubes and metallic carbon nanotubes.

In other words, the method may include flowing a carbon nanotube dispersion through a charged material. The carbon nanotube dispersion may include metallic carbon nanotubes and semiconducting carbon nanotubes. The metallic species may at least be partially be adsorbed by the charged material. As such, when the eluent solution (including a dispersing agent without a net charge) is flowed through the charged material, an eluate enriched in semiconducting carbon nanotubes may be collected.

The eluate includes a higher proportion of semiconducting carbon nanotubes to metallic carbon nanotubes (compared to the carbon nanotube dispersion). In one embodiment, the eluate may include semiconducting carbon nanotubes but may be devoid of metallic carbon nanotubes.

By adjusting various conditions such as pH and/or concentration of the non-ionic surfactant, different amounts of metallic carbon nanotubes may be adsorbed by the charged material. As such, depending on the conditions, the eluate may include only semiconducting carbon nanotubes or a mixture of semiconducting carbon nanotubes and metallic carbon nanotubes.

The carbon nanotubes may include single-walled carbon nanotubes, double-walled carbon nanotubes, multi-walled carbon nanotubes, or a mixture of single-walled carbon nanotubes, double-walled carbon nanotubes, and multi-walled carbon nanotubes.

The method may include passing a further eluent solution through the charged material after collecting the eluate including semiconducting carbon nanotubes or the mixture of semiconducting carbon nanotubes and metallic carbon nanotubes, wherein the further eluent solution includes a second dispersing agent. The method may further include, the steps of, collecting a further eluate including metallic carbon nanotubes or a mixture of metallic carbon nanotubes and semiconducting carbon nanotubes. The semiconducting carbon nanotubes may be minimal and the further eluate may include mainly metallic carbon nanotubes. The semiconducting carbon nanotubes may not be fully washed away when the eluent solution is passed through the charged material and a small amount of semiconducting carbon nanotubes may be collected in the further eluate when the further eluent solution is passed through the charged material. The further eluate includes a higher proportion of metallic carbon nanotubes to semiconducting carbon nanotubes (compared to the carbon nanotube dispersion).

In one embodiment, the further eluate may include metallic carbon nanotubes but may be devoid of semconducting carbon nanotubes.

The metallic carbon nanotubes and the semiconducting carbon nanotubes may develop differential charges in the eluent solution so that the metallic carbon nanotubes is more likely to be adsorbed by the (opposingly) charged material. The semiconducting carbon nanotubes may be more likely to flow through the charged material so the first eluate includes or is enriched in semiconducting carbon nanotubes. A further eluent solution may then be flowed through to remove the metallic carbon nanotubes. The further eluent may include or may be enriched in metallic carbon nanotubes.

The method may include, prior to 102. the step of dispersing the mixture of the semiconducting carbon nanotubes and the metallic carbon nanotubes in a starting dispersing agent to form the carbon nanotube dispersion. The dispersion may include the starting dispersant agent in addition to the mixture of the semiconducting carbon nanotubes and the metallic carbon nanotubes. The mixture of the semiconducting carbon nanotubes and the metallic carbon nanotubes may be suspended in the starting dispersing agent.

In one embodiment, the starting dispersing agent may be a solution of a surfactant without a net charge or a polymer without a net charge. In one embodiment, the solution of the surfactant without a net charge may be a starting non-ionic surfactant solution or a zwitterionic solution. In one embodiment, the starting dispersing agent may be a surfactant solution, e.g. a non-ionic surfactant solution or a zwitterionic solution. In another embodiment, the starting dispersing agent may include a (starting) non-ionic dispersing agent such as pluronic or tetronic. In general, "non-ionic dispersing agents" may include "non-ionic surfactants" as well as other non-ionic chemicals which may be able to disperse carbon nanotubes. Non-ionic dispersing agents that are not non-ionic surfactants may include pluronic and tetronic. The polymer may include Polyethylene oxide-polypropylene oxide copolymer, Polyethylene Glycol, Polyvinvyl alcohol, Polyvinyl pyrrolidone and/or Dextran.

The starting non-ionic surfactant solution or the starting dispersing agent may have a pH of 7 or less.

The first dispersing agent may be a solution of a surfactant without a net charge or a polymer without a net charge. In one embodiment, the solution of the surfactant without a net charge may be a (first) non-ionic surfactant solution or a zwitterionic solution. The first non-ionic surfactant solution or the first dispersing agent may have a pH of 7 or less. The first non-ionic surfactant solution and/or the starting non-ionic surfactant solution may be selected from the group consisting of Triton X-405, Brij L23, and Brij S100. The polymer may include Polyethylene oxide-polypropylene oxide copolymer, Polyethylene Glycol, Polyvinvyl alcohol, Polyvinyl pyrrolidone and/or Dextran.

The first dispersing agent and the starting dispersing agent may be the same or may be different. The first non-ionic surfactant solution and the starting non-ionic surfactant solution may be the same or may be different. In one instance, the first non-ionic surfactant solution and the starting non-ionic surfactant solution may be both Triton X-405. In another instance, the first non-ionic surfactant solution may be Triton X-405 and the starting non-ionic surfactant solution may be Brij L23.

The second dispersing agent may include a solution of a surfactant without a net charge such as a (second) non-ionic surfactant solution or a zwitterionic solution. The second dispersing agent may instead include an ionic surfactant solution such as a negatively charged surfactant. The second dispersing agent may instead include a polymer. The polymer may be a polymer with or without a net charge. The solution of the surfactant without a net charge or the second non-ionic surfactant solution may have a pH above 7. The second dispersing agent may include sodium hydroxide (NaOH) or other suitable basic solutions or amino acids with basic side chains, such as arginine. The polymer may include Polyethylene oxide-polypropylene oxide copolymer, Polyethylene Glycol, Polyvinvyl alcohol, Polyvinyl pyrrolidone and/or Dextran.

In one embodiment, the second dispersing agent may include an ionic surfactant solution. The ionic surfactant may include a negatively charged surfactants or anionic surfactants (which take negative charge in solution) such as sodium dodecyl sulfate (SDS), sodium cholate (SC), sodium deoxycholate (DOC) or sodium dodecylbenzenesulfone (SDBS). The ionic surfactant may also possibly include cationic surfactants such as Cetyltrimethylammonium Bromide. In another embodiment, the second dispersing agent may include a (second) non-ionic surfactant solution having a pH above 7. The first non-ionic surfactant solution and the second non-ionic surfactant solution may be the same or may be different. The first non-ionic surfactant solution, the starting non-ionic surfactant solution and the second non-ionic surfactant solution may be the same or may be different. The second non-ionic surfactant solution may be selected from the group consisting of Triton X-405, Brij L23, and Brij S100. The first non-ionic surfactant solution and/or the second non-ionic surfactant solution may be selected from the group consisting of Triton X-405, Brij L23, and Brij S100. The first non-ionic surfactant solution, the starting non-ionic surfactant solution, and the second non-ionic surfactant solution may be selected from the group consisting of Triton X-405, Brij L23, and Brij S100. The first non-ionic surfactant solution, and the second non-ionic surfactant solution may be Triton X-405. The first non-ionic surfactant solution, the starting non-ionic surfactant solution, and the second non-ionic surfactant solution may be Triton X-405.

The first dispersing agent and the second dispersing agent may be the same or may be different. The first dispersing agent, the starting dispersing agent and the second dispersing agent may be the same or may be different.

The charged material may include functional groups selected from the group consisting of carboxylate, sulfonate, phosphonate, nitrite, hydroxide, and nitrate. The charged material may be modified with compounds containing the functional groups. The functional groups may impart a charge to the material or cause the material to be charged. The charged material may be modified with sulfonate-containing compounds such as congo red, direct blue 71, amino naphthalene sulfonate salts (e.g. sodium 4-amino-1-napthalenesulfonate) or Evans blue. The charged material may be alternatively or additionally be modified with 1-amino-4-nitronaphthalene and/or 4-amino-napthalen-1-ol In one embodiment, pH of the starting dispersing agent may be adjusted to below 4 when the charged material is functionalized with congo red. The pH of the further dispersing agent may be adjusted from 1.9 to 3.9 when the charged material is functionalized with congo red.

The semiconducting carbon nanotubes and the metallic carbon nanotubes may have diameters ranging from 0.3 nm to 2.0 nm e.g. from 1.2 nm to 1.6 nm.

The charged material may include chromatography beads. The chromatography beads may include agarose gel beads (include Sepharose), functionalized agarose gel beads, functionalized polymeric beads, functionalized silica beads, or other hydrogel beads. The agarose gel beads may be Sepharose 2B beads, Sepharose 4B beads, Sepharose 6B beads, Sepharose 2B-CL beads, Sepharose 4B-CL beads, Sepharose 2B beads, Sepharose 6B-CL beads. The other hydrogel beads may be Sephacryl S-100HR beads, Sephacryl S-200HR beads or Sephacryl S-300HR beads.

The Sepharose 4B beads may be modified with congo red, direct blue 71, evans blue, sodium 4-amino-1-naphathalenesulfonate, or/and sodium 2-amino-1-naphathalenesulfonate.

The eluate may include more than 50%, or more than 60%, or more than 70%, or more than 80%, or more than 90%, or more than 95%, or more than 99%, semiconducting carbon nanotubes. The further eluate may include more than 50%, or more than 60%, or more than 70%, or more than 80%, or more than 90%, or more than 95%, or more than 99% metallic carbon nanotubes.

The eluate may include a ratio of semiconducting carbon nanotubes:metallic carbon nanotubes of more than 50:50 or more than 60:40 or more than 70:30 or more than 80:20 or more than 90:10 or more than 95:5 or more than 99:1. The further eluate may include a ratio of metallic carbon nanotubes:semiconducting carbon nanotubes of more than 50:50 or more than 60:40 or more than 70:30 or more than 80:20 or more than 90:10 or more than 95:5 or more than 99:1.

The ratio of the semiconducting carbon nanotubes:metallic carbon nanotubes in the eluate and/or the ratio of the metallic carbon nanotubes:semiconducting carbon nanotubes may be based on the pH (of the first dispersing agent and/or starting dispersing agent and/or the second dispersing agent).

Various embodiments may also include use of semiconducting carbon nanotubes, e.g. semiconducting single-walled carbon nanotubes (SWNTs), semiconducting double-walled carbon nanotubes (DWNTs), semiconducting multi-walled carbon nanotubes or mixtures thereof, obtained by a method described herein, in field-effect-transistors and electronic devices. Various embodiments may include a device or field-effect-transistor formed by one or more carbon nanotubes, the one or more carbon nanotubes obtained by any method described herein.

FIG. 2 is a schematic 200 illustrating a method for separating carbon nanotubes of a first group of chiralities from carbon nanotubes of a second group of chiralities may be provided. The method may include (the steps of), in 202, passing a carbon nanotube dispersion over a negatively charged material. The dispersion may include the carbon nanotubes of a first group of chiralities and the carbon nanotubes of a second group of chiralities. The method may further include, in 204, passing an eluent solution through the charged material after 202. The eluent solution may, include a first non-ionic dispersing agent. The method may also include, in 206, collecting an eluate including carbon nanotubes of the first group of chiralities.

In other words, the method may further include flowing a carbon nanotube dispersion through a charged material. The carbon nanotube dispersion may include a mixture of carbon nanotubes of a first group of chiralities as well as carbon nanotubes of a second group of chiralities. The carbon nanotubes of the second group of chiralities may be adsorbed by the charged material. As such, when the eluent solution is flowed through the charged material, an eluate enriched in carbon nanotubes of the first group of chiralities may be collected.

The carbon nanotubes of the first group of chiralities may include semiconducting carbon nanotubes such as semiconducting single-walled carbon nanotubes, semiconducting double-walled carbon nanotubes, semiconducting multi-walled carbon nanotubes or a mixture thereof. The carbon nanotubes of the second group of chiralities may include metallic nanotubes such as metallic single-walled carbon nanotubes, metallic double-walled carbon nanotubes, metallic multi-walled carbon nanotubes or a mixture thereof.

Whether a single walled carbon nanotube is semiconducting or metallic may be determined by (n-m), where n and m are chiral indices. If (n-m) is not equal to a multiple of 3 or 0, the carbon nanotubes may be semiconducting nanotubes. Conversely, if (n-m) is equal to a multiple of 3 or 0, the carbon nanotubes may be metallic. The first group of chiralities may include a group wherein (n-m) is not a multiple of 3 or 0. The second group of chiralities may include a group wherein (n-m) is a multiple of 3 or 0.

For double-walled carbon nanotubes, the inner wall may be semiconducting or metallic when the outer wall is semiconducting. The inner wall may be semiconducting or metallic when the outer wall is metallic. The double-walled carbon nanotube may belong to carbon nanotubes of the first group of chiralities if (n-m) is not a multiple of 3 or 0 for both inner wall and outer wall. The double-walled carbon nanotube may belong to carbon nanotubes of the second group of chiralities if (n-m) is a multiple of 3 or 0 for either inner wall or outer wall. The double-walled carbon nanotube may be a semiconducting double-walled carbon nanotube when both the inner wall and the outer wall are semiconducting. The double-walled carbon nanotube may be a metallic double-walled carbon nanotube when either the inner wall and the outer wall is metallic.

For multi-walled carbon nanotubes, a multi-walled carbon nanotube may belong to carbon nanotubes of the first group of chiralities if (n-m) is not a multiple of 3 or 0 for all walls in the multi-walled carbon nanotube, and may belong to carbon nanotubes of the second group of chiralities if (n-m) is a multiple of 3 or 0 for at least one wall in the multi-walled carbon nanotube. The multi-walled carbon may be a semiconducting multi-walled carbon nanotube when all walls are semiconducting. The multi-walled carbon may be a metallic multi-walled carbon nanotube when at least one wall is metallic.

In various embodiments, the first non-ionic dispersing agent may be a surfactant without a net charge of a polymer without a net charge having a pH below 7. The first dispersing agent may alternatively other non-ionic chemicals such as pluronic or tetronic. The polymer may include Polyethylene oxide-polypropylene oxide copolymer, Polyethylene Glycol, Polyvinyl alcohol, Polyvinyl pyrrolidone and/or Dextran.

The method may further include, prior to 202, the step of dispersing a mixture of the carbon nanotubes of the first group of chiralities and the carbon nanotubes of the second group of chiralities in a starting non-ionic dispersing agent to form the carbon nanotube dispersion. The starting non-ionic dispersing agent may include a starting non-ionic surfactant solution having a pH below 7. The starting non-ionic dispersing agent may alternatively other non-ionic chemicals such as pluronic or tetronic. The first non-ionic dispersing agent and the starting non-ionic dispersing agent may be the same or may be different.

The method may further include the steps of passing a further eluent solution through the charged material after collecting the eluate including carbon nanotubes of the first group of chiralities. The further eluent solution may include a second dispersing agent. The method may also include collecting a further eluate including carbon nanotubes of the second group of chiralities.

The second dispersing agent may further include an ionic surfactant solution such as such as an anionic surfactant, e.g. sodium dodecyl sulfate (SDS), sodium cholate (SC), sodium deoxycholate (DOC) or sodium dodecylbenzenesulfone (SDBS). The ionic surfactant may include a cationic surfactant such as Cetyltrimethylammonium Bromide. Alternatively, the second dispersing agent may include a surfactant without a net charge or a polymer without a net charge having a pH above 7. In other words, the second dispersing agent may have a pH above 7. The second dispensing agent may alternatively include non-ionic chemicals such as pluronic or tetronic. The second dispersing agent may include sodium hydroxide (NaOH) or other suitable basic solutions or argine. The polymer may include Polyethylene oxide-polypropylene oxide copolymer, Polyethylene Glycol, Polyvinvyl alcohol, Polyvinyl pyrrolidone and/or Dextran.

The eluate may include more than 50%, or more than 60%, or more than 70%, or more than 80%, or more than 90%, or more than 95%, or more than 99%, or more than 99.9%, or more than 99.99% semiconducting carbon nanotubes. The further eluate may include more than 50%, or more than 60%, or more than 70%, or more than 80%, or more than 90%, or more than 95%, or more than 99%, or more than 99.9%, or more than 99.99% metallic carbon nanotubes.

The eluate may include a ratio of semiconducting carbon nanotubes:metallic carbon nanotubes of more than 50:50 or more than 60:40 or more than 70:30 or more than 80:20 or more than 90:10 or more than 95:5 or more than 99:1. The further eluate may include a ratio of metallic carbon nanotubes:semiconducting carbon nanotubes of more than 50:50 or more than 60:40 or more than 70:30 or more than 80:20 or more than 90:10 or more than 95:5 or more than 99:1.

The ratio of the semiconducting carbon nanotubes:metallic carbon nanotubes in the eluate and/or the ratio of the metallic carbon nanotubes:semiconducting carbon nanotubes may be based on the pH (of the non-ionic dispersing agent and/or further non-ionic dispersing agent and/or the other dispersing agent).

In one embodiment, a method for separating carbon nanotubes (including single-walled and double-walled) according to different electronic types may be provided. The method may include (a) adding a carbon nanotube dispersion over a separation material included of a charged material. The method may further include (b) allowing the separation material to adsorb metallic carbon nanotubes, thereby obtaining a residual dispersion enriched in semiconducting carbon nanotubes. The method may also include (c) removing the residual dispersion from the separation material. The method may additionally include (d) flushing the separation material with a liquid to remove the adsorbed metallic enriched carbon nanotubes from the separation material.

In other words, the method may include flowing a carbon nanotube (including single-walled and double-walled) dispersion through a separation material. The separation material may be charged. The separation material may adsorb metallic carbon nanotubes from the carbon nanotube dispersion, leaving a residual dispersion of semiconducting carbon nanotubes. The residual dispersion may then be subsequently removed from the separation material. The method may additionally include flowing a liquid or solvent through the separation material to remove the adsorbed metallic enriched carbon nanotubes from the separation material.

In one embodiment, a method for separating single-walled carbon nanotubes (SWNTs) according to different chiralities may be provided. The method may include (a) adding a carbon nanotube dispersion over a separation material included of a charged material. The method may further include (b) allowing the separation material to adsorb SWNTs having a first set of chiralities thereto, thereby obtaining a residual dispersion enriched in another set of chiralities. The method may also include (c) removing the residual dispersion from the separation material. The method may additionally include (d) flushing the separation material with a liquid to remove the adsorbed. SWNTs having the first set of chiralities from the separation material.

In other words, the method may include flowing a carbon nanotube dispersion through a separation material. The separation material may be charged. The separation material may adsorb SWNT which have a first set of chiralities from the carbon nanotube dispersion, leaving a residual dispersion of a second set of chiralities. The residual dispersion may then be subsequently removed from the separation material. The method may additionally include flowing a liquid or solvent through the separation material to remove the adsorbed SWNTs having the first set of chiralities s from the separation material.

In one embodiment, a method for separating a metallic and semiconducting SWNTs may be provided. The method may include (a) adding a carbon nanotube dispersion over a separation material included of a charged material. The method may also include (b) allowing the separation material to adsorb metallic SWNTs thereto, thereby obtaining a residual dispersion enriched in semiconducting SWNTs. The method may further include (c) removing the residual dispersion from the separation material. The method may additionally include (d) flushing the separation material with a liquid to remove the adsorbed metallic SWNTs.

In other words, the method may further include flowing a carbon nanotube dispersion through a separation material. The separation material may be charged. The separation material may adsorb metallic SWNTs (met-SWNTs) from the carbon nanotube dispersion, leaving a residual dispersion having an increased proportion of semiconducting SWNTs (semi-SWNTs). The residual dispersion may then be subsequently removed from the separation material. The method may additionally include flowing a liquid or solvent through the separation material to remove the adsorbed met-SWNTs from the separation material.

In one embodiment, a method for separating a metallic and semiconducting SWNTs may be provided. The method may include (a) passing a carbon nanotube dispersion over a chromatography column filled with a charged material. The method may further include (b) allowing the charged material to adsorb metallic SWNTs thereto, thereby obtaining a residual dispersion enriched in semiconducting SWNTs. The method may also include (c) eluting the residual dispersion from the chromatography column with a first liquid or solvent. The method may additionally include (d) flushing the chromatography column with a second liquid or solvent to remove the adsorbed metallic SWNTs.

In other words, the method may further include flowing a carbon nanotube dispersion through a chromatography column. The chromatography column may include a charged material. The charged material may adsorb metallic SWNTs (met-SWNTs) from the carbon nanotube dispersion, leaving a residual dispersion having an increased proportion of semiconducting SWNTs (semi-SWNTs). The residual dispersion may be extracted from the chromatography column by washing with a first liquid or solvent. The method may additionally include flowing a second liquid or solvent through the chromatography column to remove the adsorbed met-SWNTs from the chromatography column.

In one embodiment, a method for sorting semiconducting and metallic carbon nanotubes (e.g. SWNTs) from each other may be provided. The method may include (a) dispersing unsorted carbon nanotubes (e.g. SWNTs) in a starting surfactant solution. The method may further include (b) passing the dispersion of (a) over chromatography beads packed in a chromatography column. The method may also include (c) passing a first eluent solution through the chromatography column, wherein the first eluent solution includes a first surfactant solution. The method may additionally include (d) collecting a first eluate comprising sorted semiconducting carbon nanotubes/SWNTs. The method may additionally include (e) passing a second eluent solution through the chromatography column after (d), wherein the second eluent solution includes a second surfactant solution. The method may also include (f) collecting the second eluate including sorted metallic carbon nanotubes/SWNTs enriched fraction.

In other words, the method may further include dispersing an unsorted mixture of carbon nanotubes (e.g. SWNTS including semiconducting SWNTs (semi-SWNTs) and metallic SWNTs (met-SWNTs)) in a starting surfactant solution. The method may also include flowing the resultant dispersion through a chromatography column. The chromatography column may include chromatography beads. The method may further include flowing a first eluent solution through the chromatography column, wherein the first eluent solution includes a first surfactant solution. A first eluate may be collected after the first eluent solution is flowed through the chromatography column, the first eluate including sorted semiconducting carbon nanotubes e.g. semiconducting SWNTs (semi-SWNTs) in the second surfactant solution. The method may further include flowing a second eluent solution through the chromatography column, wherein the second eluent solution includes a second surfactant solution. A second eluate may be collected after the second eluent solution is flowed through the chromatography column, the second eluate including an increased proportion of metallic carbon nanotubes e.g. metallic SWNTs (met-SWNTs) in the second surfactant solution.

In one embodiment, a method of separating metallic SWNTs (met-SWNTs) and semiconducting SWNTs (semi-SWNTs) (or separating metallic carbon nanotubes and semiconducting carbon nanotubes) may be provided. The method may include (a) dispersing unsorted carbon nanotubes or SWNTs in a starting zero net charge surfactant solution. The method may also include (b) passing the dispersion of (a) over charged chromatography beads packed in a chromatography column. The method may also include (c) passing a first eluent solution through the chromatography column after (b), wherein the first eluent solution comprises a first surfactant solution. The method may additionally include (d) collecting a first eluate comprising sorted semiconducting carbon nanotubes or semiconducting SWNTs. The method may additionally include (e) passing a second eluent solution through the chromatography column after (d), wherein the second eluent solution comprises a second surfactant solution. The method may further include (f) collecting the second eluate comprising sorted metallic carbon nanotubes enriched fraction or metallic SWNTs enriched fraction.

In other words, the method may further include dispersing an unsorted mixture of semiconducting SWNTS (semi-SWNTs) and metallic SWNTs (met-SWNTs) (or mixture of semiconducting carbon nanotubes and metallic carbon nanotubes) in a starting uncharged surfactant solution. The method may also include flowing the resultant dispersion through a chromatography column. The chromatography column may include chromatography beads. The method may further include flowing a first eluent solution through the chromatography column, wherein the first eluent solution includes a first surfactant solution. A first eluate may be collected after the first eluent solution is flowed through the chromatography column, the first eluate including sorted semiconducting carbon nanotubes or semiconducting SWNTs (semi-SWNTs) in the first surfactant solution. The method may further include flowing a second eluent solution through the chromatography column, wherein the second eluent solution includes a second surfactant solution. A second eluate may be collected after the second eluent solution is flowed through the chromatography column, the second eluate including an increased proportion of metallic carbon nanotubes or metallic SWNTs (met-SWNTs) in the second surfactant solution.

Various embodiments may help to provide a simpler method for separating metallic carbon nanotubes and semiconducting carbon nanotubes. Various embodiments may provide a way to increase throughput and/or increase purity of carbon nanotubes.

The unsorted carbon nanotubes may include both semiconducting carbon nanotubes and metallic carbon nanotubes. The metallic and semiconducting carbon nanotubes may develop opposing charges under a predetermined range of pH. The charges may be developed on the surface on carbon nanotubes. In one embodiment, the metallic carbon nanotubes may develop an overall positive charge while the semiconducting carbon nanotubes may develop an overall negative charge in acidic conditions.

The unsorted carbon nanotubes may be dispersed in a (starting) non-ionic surfactant solution. In other words, the starting zero net charged surfactant solution may be a non-ionic surfactant solution. Using a non-ionic surfactant instead of an ionic surfactant may avoid the charge differential between metallic and semiconducting carbon nanotubes from being masked by external surfactant charges.

The unsorted carbon nanotubes may be dispersed in a non-ionic surfactant solution (i.e. the first non-ionic surfactant solution) with pH 7 or less. In various embodiments, the semiconducting and metallic carbon nanotubes may develop opposing charges under acidic conditions, thereby allowing separation of the semiconducting and metallic carbon nanotubes based on the charge differential. The carbon nanotubes may include functional groups such as carboxyl groups, carbonyl or hydroxyl groups so the carbon nanotubes have a net negative charge at neutral conductions. As pH decreases, the metallic carbon nanotubes may be more easily doped to gain a net positive charge due to the lower work function. The semiconducting carbon nanotubes may remain less doped and may maintain a net negative charge under acidic conditions.

The first eluent solution may include a first non-ionic surfactant solution. The first solution may be a zero-net charge solution such as a non-ionic solution. The charges developed on the carbon nanotubes may not be masked or affected by the use of an ionic surfactant.

The first eluent solution may be passed through the chromatography column. Either the semiconducting carbon nanotubes or the metallic carbon nanotubes may be attracted to the charged chromatography beads within the chromatography column. In one embodiment, the chromatography beads within the chromatography column may be negatively charged. In one embodiment, the metallic carbon nanotubes may be positively charged and may be attracted to the negatively charged chromatography beads. The first eluent solution may form the first eluate as the first eluent solution passes through the chromatography column. As the metallic carbon nanotubes may be retained within the chromatography column by the negatively charged chromatography beads, the first eluate may contain sorted semiconducting carbon nanotubes. In one embodiment, the first eluate may contain an increased proportion of semiconducting carbon nanotubes relative to metallic carbon nanotubes. In one embodiment, the eluate may contain a very small amount of metallic carbon nanotubes or may be devoid of metallic carbon nanotubes.

The first eluent solution may include a first non-ionic surfactant solution with pH 7 or less. Opposing charges on the semiconducting carbon nanotubes and metallic carbon nanotubes may be developed or maintained.

The second eluent solution may include a second non-ionic surfactant solution and has a pH above 7. In one embodiment, the metallic carbon nanotubes attracted to the negatively charged chromatography beads may develop an overall negative charge under basic conditions.

Alternatively, the second eluent solution may include an ionic surfactant solution. The ionic surfactant may also impart an overall negative charge to the metallic carbon nanotubes. The metallic carbon nanotubes having an overall negative charge may no longer be attracted to the negatively charged beads. The second eluent solution may form the second eluate as the first eluent solution passes through the chromatography column. The second eluate may contain an increased proportion of metallic carbon nanotubes as the metallic carbon nanotubes are no longer retained by the chromatography column. The second eluate may contain very small amount of semiconducting carbon nanotubes or may be devoid of semiconducting carbon nanotubes as the semiconducting carbon nanotubes has already been eluated out in the first eluate.

In one embodiment, first non-ionic surfactant solution and the second non-ionic surfactant solution may be the same.

In one embodiment, the starting non-ionic surfactant solution, the first non-ionic surfactant solution, and the second non-ionic surfactant solution may be the same.

The starting non-ionic surfactant solution, the first non-ionic surfactant solution, and the second non-ionic surfactant solution may be selected from the group consisting of Triton X-405, Brij L23, and Brij S100. The starting non-ionic surfactant solution, the first non-ionic surfactant solution, and the second non-ionic surfactant solution may be Triton X-405.

The ionic surfactant solution may be sodium dodecyl sulfate (SDS), sodium cholate (SC), sodium deoxycholate (DOC) or sodium dodecylbenzenesulfone (SDBS).

In one embodiment, the pH of the starting non-ionic surfactant solution may be adjusted to below 4 when the beads are functionalized with congo red. The pH of the starting non-ionic surfactant solution is adjusted from 1.9 to 3.9 when the beads are functionalized with congo red.

The unsorted SWNTs may include SWNTs having diameters range from 0.3 nm to 2.0 nm.

The charged material may be or may include chromatography beads. The chromatography beads may be negatively charged. The negatively charged chromatography beads may include Sepharose, functionalized agarose, functionalized polymeric beads or functionalized silica beads. The chromatography beads may be or may include chromatography beads. In one embodiment, the beads may retain negative charges under neutral to acidic conditions.

The negatively charged chromatography beads may include functional groups selected from the group consisting of carboxylate, sulfonate, phosphonate, hydroxide, nitrite, and nitrate. The functional groups may be attached to the chromatography beads. The functional groups may help the beads retain negative charges under neutral to acidic conditions. The functional groups may help improve sorting purity as the positively charged carbon nanotubes may be more attracted to functionalized beads compared to non-functionalized beads.

The negatively charged chromatography beads may be modified with sulfonate-containing compounds such as congo red, direct blue 71, Evans blue, or amino naphthalene sulfonate salts. Congo red, direct blue 71, Evans blue, or amino naphthalene sulfonate salts may, include sulfonate functional groups. The negatively charged chromatography beads may also be modified with other sulfonate-containing compounds.

The beads may additionally or alternatively be modified with carboxylate, phosphonate, hydroxide, nitrite, or nitrate-containing compounds. In some embodiments, the beads may not be modified.

The chromatography beads may be or may include agarose gel beads. The agarose gel beads may be or may include Sepharose 2B beads, Sepharose 4B beads, Sepharose 6B beads, Sepharose 2B-CL beads, Sepharose 4B-CL beads, Sepharose 2B beads, Sepharose 6B-CL beads. The chromatography beads may be or may include other hydrophilic gel beads. The other hydrophilic gel beads may be or may include Sephacryl S-100HR beads, Sephacryl S-200HR beads or Sephacryl S-300HR beads.

The Sepharose 4B beads may be modified with congo red, direct blue 71, Evans blue, or sodium 4-amino-1-naphathalenesulfonate.

A use of semiconducting carbon nanotubes obtained by any method described herein in field-effect-transistors and electronic devices may also be provided. The semiconducting carbon nanotubes may include single-walled carbon nanotubes (SWNTs), double-walled carbon nanotubes (DWNTs), multi-walled carbon nanotubes or mixtures thereof. A use of metallic carbon nanotubes obtained by any method described herein may also be provided. The metallic carbon nanotubes may include single-walled carbon nanotubes (SWNTs), double-walled carbon nanotubes (DWNTs), multi-walled carbon nanotubes or mixtures thereof.

Single-walled carbon nanotubes (SWNTs), double-walled carbon nanotubes (DWNTs), multi-walled carbon nanotubes or mixtures thereof obtained by any method described herein may also be provided.

An electronic device such as a field-effect transistor including semiconducting carbon nanotubes obtained by any method described herein may also be provided. The carbon nanotubes may include SWNTs, DWNTs, multi-walled nanotubes or a mixture thereof.

Semiconducting single-walled carbon nanotubes may be referred to as semiconducting SWNTs or semi-SWNTs. Metallic single-walled carbon nanotubes may be referred to as metallic SWNTs or met-SWNTs.

EXAMPLES

Experiment 1

Herein, a class of new bulk separation techniques based on the intrinsic charges on metallic versus semiconducting carbon nanotubes suspended by a non-ionic surfactant in water/oxygen solution with controlled pH may be provided. Various methods may exploit the varying electrostatic interaction (EI) between anionic hydrophilic chromatography beads and the intrinsic charges on differentially p-doped carbon nanotubes with varying cationicity controllable by the bandgap-dependent redox reaction (REDOX) with dissolved oxygen in acidic water.

Materials

Triton X-405 solution (70% in H2O) was obtained from Dow Chemical. Sepharose 4B beads (GE Healthcare), (±)-epichlorohydrin (epichlorohydrin, technical grade), sodium hydroxide (NaOH, 98%), hydrochloric acid (HCl, 36-37%), Sodium dodecylbenzenesulfonate (SDBS, technical grade), sodium cholate (SC, ≥99%), cetyltrimethylammonium bromide (CTAB, ≥99%), congo red (CR, 85%), direct blue 71 (DB, 50%), sodium 4-amino-1-naphthalenesulfonate (SANS, technical grade) and all the solvents were purchased from Sigma-Aldrich and used as received. Arc-discharge SWNTs were purchased from Carbon Solutions (P2-SWNTs) and Hanwha Chemical (ASP-100F). HiPco SWNTs were purchased from Unidym. CoMoCat SWNTs were purchased from SouthWest NanoTechnologies. Elicarb carbon nanotubes (mixture of single-walled and double-walled carbon nanotubes) were obtained from Thomas Swan. Ultrapure deionized water (18.2 MΩ·cm) (D.I. water) from a Milli-Q System (Millipore, Billerica, Mass.) was used in all experiments.

Figure 15A:
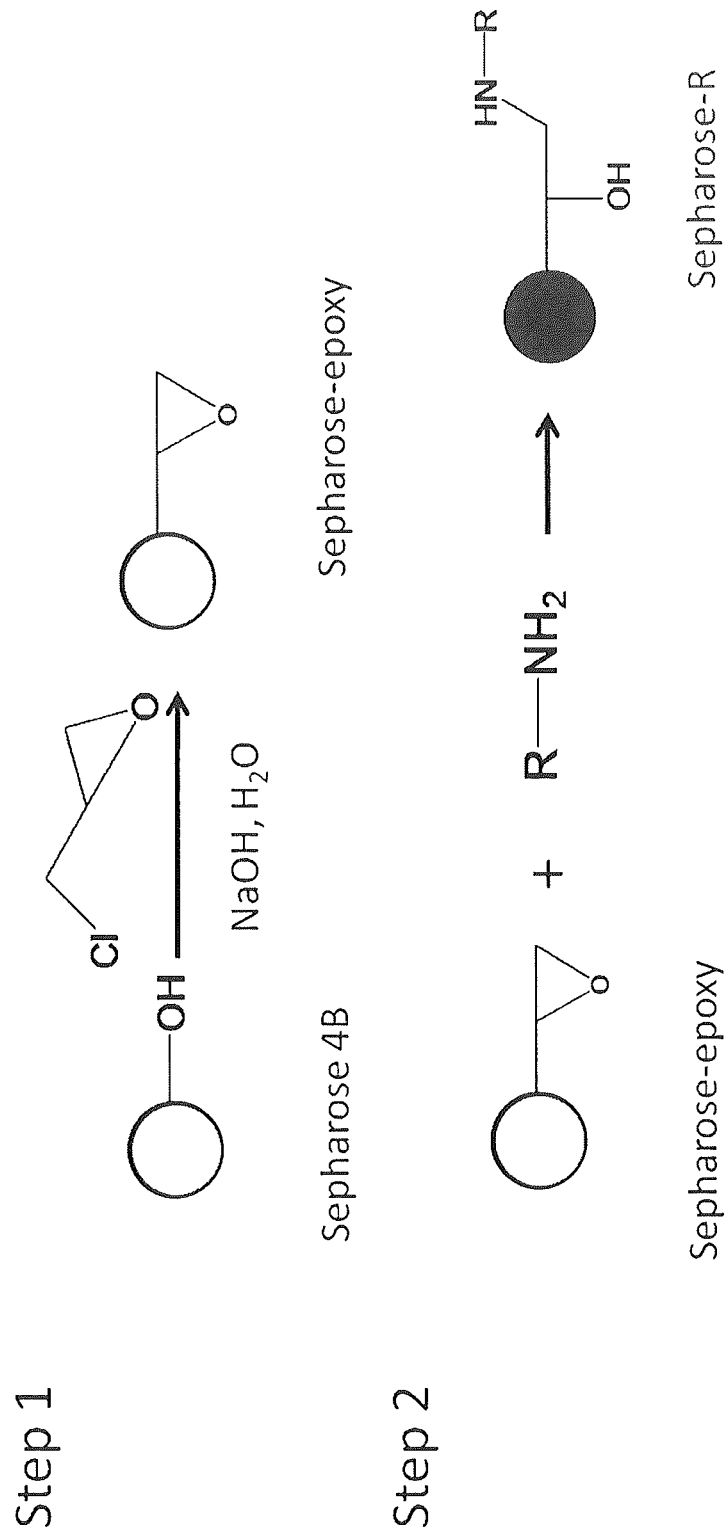
FIG. 15A is a schematic illustrating the functionalization of Sepharose 4B beads by activating with epoxy (in step 1) and functionalization of negatively-charged chemicals (in step 2).

Synthesis of Negatively-Charged Chromatography Beads 20 mL of Sepharose 4B beads were triple washed with 20 mL of deionised (D.I.) water. The washed beads were suspended in a mixture of 20 mL of 1 M NaOH and 6 mL of epichlorohydrin. The mixture was agitated with a tumbler in an oven at 40° C. for overnight and then washed thoroughly again with D.I water. 0.5 mmol of anionic sulfonate chemical (congo red, direct blue 71, evans blue or sodium 4-amino-1-naphthalenesulfonate) was dissolved in 20 mL mixture of methanol:water (1:1) and then mixed with the bead suspension. The mixture was agitated with a tumbler at room temperature for overnight and washed thoroughly with D.I. water and 20% ethanol (alternately). The functionalized beads were kept at 4° C. until use. This process is shown in FIG. 15A.

Carbon Nanotube Dispersion Preparation

Taking Triton X-405 and P2-SWNTs as an example, 70% Triton X-405 dispersion was diluted to 2.8% aqueous solution (w/v) with D.I. water. The pH of the Triton X-405 solution was adjusted with 0.1 M HCl. 1 mg/mL solution of P2-SWNTs in 2.8% aqueous Triton X-405 (pH adjusted) was ultrasonicated by a 750-Watt Ultrasonic Processor (VCX750, Sonics & Materials, Inc., USA) for 1 h with ice bath (30% amplitude, 1 s on, 1 s off). The pH of the Triton X-405 solution should be consistent with the eluting solution later used for chromatography. The suspension of P2-SWNTs was then centrifuged at 122,000 g for 1 h or at 54,000 g for 4 h. The top 80% supernatant was carefully extracted and used for chromatography separation. The dispersion was bath-sonicated for 10 min before use if it had been prepared more than 1 day before separation.

The type, and concentration of surfactants/dispersing agents may be varied but using a similar procedure. The pH of the eluting solution may also be varied. The amplitude of sonication may be varied for different types and amounts of carbon nanotubes.

Chromatography Process

FIG. 3A is a plot 300a of Fermi level against density of states of the carbon nanotubes in different conditions. FIG. 3B is a schematic 300b of the carbon nanotubes in different conditions.

Figure 4:
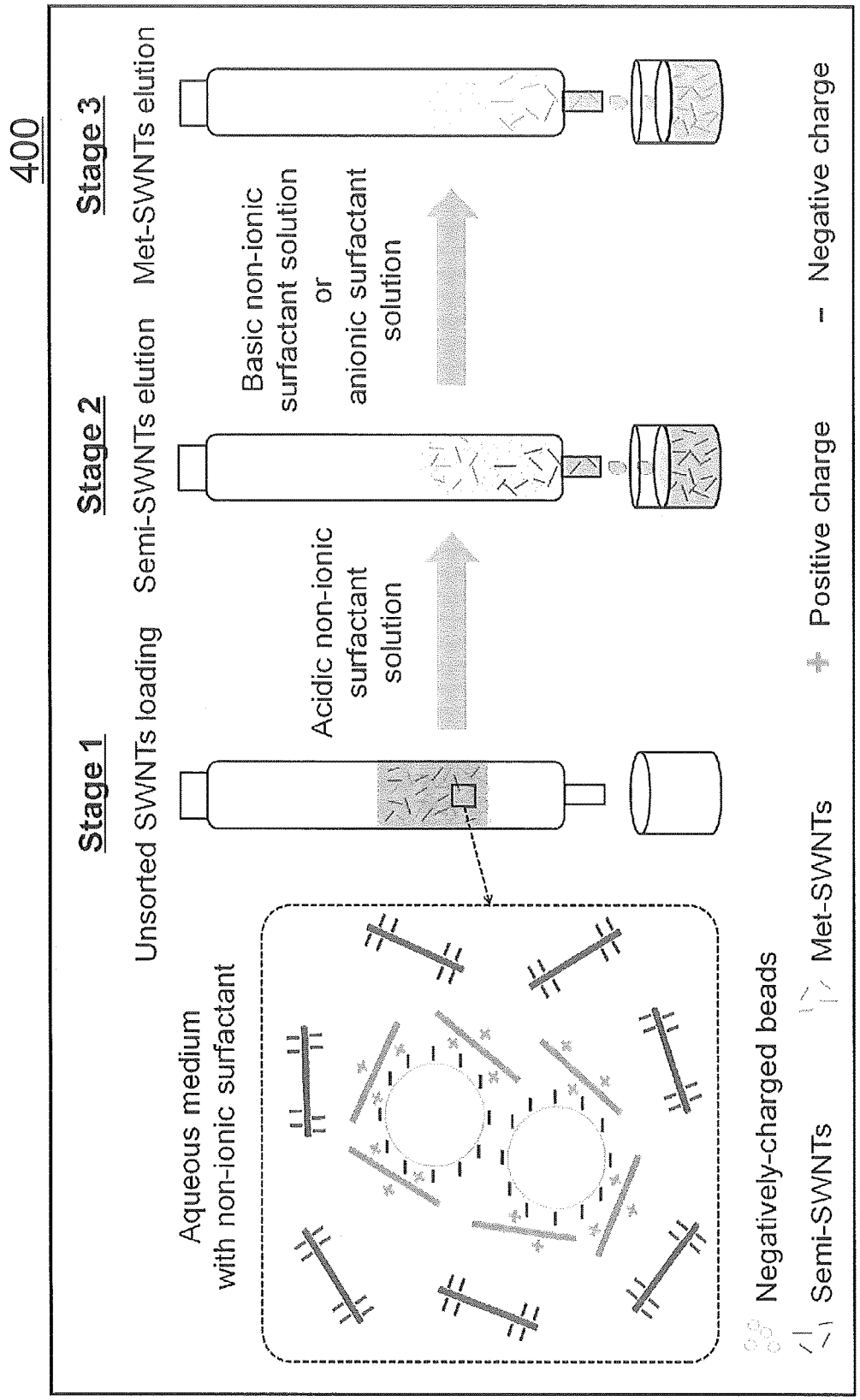
FIG. 4 is a schematic illustrating a method according to one embodiment.

FIGS. 3A-B show the behaviour of semiconducting single-walled nanotubes (semi-SWNTs) and metallic single-walled nanotubes (met-SWNTs) in different pH solutions according to one embodiment. The redox potential of the $O_2/H_2O$ couple may be tuned so that the met-SWNTs become more positively charged compared to semi-SWNTs as pH decreases. FIG. 4 is a schematic 400 illustrating a method according to one embodiment. FIG. 4 illustrates sorting via Redox-enabled Electrostatic Interaction Chromatography (REIC).

Functionalized or unmodified beads were packed into a glass chromatography column (5 cm bed height). The column was flushed with deionized (D.I.) water with back pressure (compressed air) to make the packing firm. The column was flushed with at least 2 column volumes of 2.8% Triton X-405 in aqueous solution (pH consistent with the eluting condition) before loading the carbon nanotube dispersion. The pH of the SWNTs feed, which is also the pH of the column in Stage 1 and Stage 2, hereafter just called the sorting pH, need to be optimized for different SWNT types and batches for maximising the semiconducting fraction purity. Various iterations of sorting pH values were usually conducted and we typically start from a pH close to neutral (say 6.9). Separately, the SWNTs are dispersed in the same acidic 2.8% Triton X-405 aqueous solution at the concentration of 1 mg/mL by probe sonication followed by a 1 h centrifugation at 122,000 g to remove all the bundles and graphite impurities. The carbon nanotube dispersion is then poured into the top of the column and the nanotubes flow through the column and separate into the two main fractions—semiconducting and metallic.

In Stage 2, 2 mL carbon nanotube dispersion at the sorting pH was added into the column and was allowed to pass through the column via gravity (no back pressure applied). When the P2-SWNTs dispersion had almost fully entered the gel column, 2.8% Triton X-405 solution at the same sorting pH was added to elute the semiconducting carbon nanotubes out. Triton X-405 solution was continuously added until no more semiconducting carbon nanotubes came out. The fraction that eluted out first is semiconducting enriched and usually pink to red in color for arc-discharge SWNTs and green to blue in color for HiPco SWNTs.

In Stage 3, then 0.5% SDBS aqueous solution or 2.8% Triton X-405 (pH >10) solution was continuously added into the column until all the met-SWNTs (green solution) were eluted. The column was then flushed thoroughly by D.I. water and was ready to re-use for the next cycle of separation. The sorted SWNTs were characterized using a Varian Cary 4000 UV-vis-NIR spectrophotometer and a Renishaw inVia Raman microscope with 633 nm (1.96 eV) laser wavelength in a backscattering configuration.

The type, and concentration of surfactants/dispersing agents may be varied but using a similar procedure. The pH of the eluating solution may also be varied.

Electrical Testing

The FETs were fabricated on highly p-doped silicon wafer containing 300 nm of thermally grown $SiO_2$ by photolithography (L=75 μm, W=25 μm). Source and drain electrodes were 50 nm Au coated on top of 10 nm Ti, deposited by electron beam (e-beam). The electrode patterns were cleaned by Argon plasma (100 W) for 2 min (the plasma chamber was cleaned by 300 W Oxygen plasma for 5 min before Ar plasma) and immersed in 0.5 vol. % of (3-Aminopropyl) triethoxysilane (APTES) solution in ethanol for 45 min to enhance the adhesion of the SWNTs to be deposited. The devices were annealed in vacuum ($10^{-6}$ mbar) overnight at 250° C. to improve hydrophobicity of the surface and remove the solvent residues. The sorted semi-SWNTs were then carefully dropped between the source and drain electrodes with a syringe and fine needle. Before drop-casting, the semi-SWNTs solution was diluted with D.I. water and sonicated for 10 min in a bath sonicator. To avoid the coffee-ring effect, the devices were rinsed with D.I. water when the droplets were about to dry and then were blown dry with compressed air. The devices were placed on a hot plate (130° C.) for 10 min before the next drop. The drop-casting procedure was repeated until the desired SWNTs density was achieved. The electrical testing of the FET devices was carried on a Keithley semiconductor parameter analyzer Model 4200-SCS in ambient environment.

Zeta Potential Measurement

The unsorted P2-SWNTs and sorted semiconducting-enriched and metallic-enriched fractions were centrifuged at 20,000 g for 1 hour to remove bundles. The centrifuged samples were diluted with ultra-pure water to achieve SWNTs concentration of approximately 0.01 mg/ml. 0.1 M HCl and 0.1 M NaOH solutions were used to adjust the pH. The zeta potential measurement was performed with a ZetaPALS Zeta Potential Analyzer at room temperature (23° C.) immediately after the samples were ready.

Figure 5:
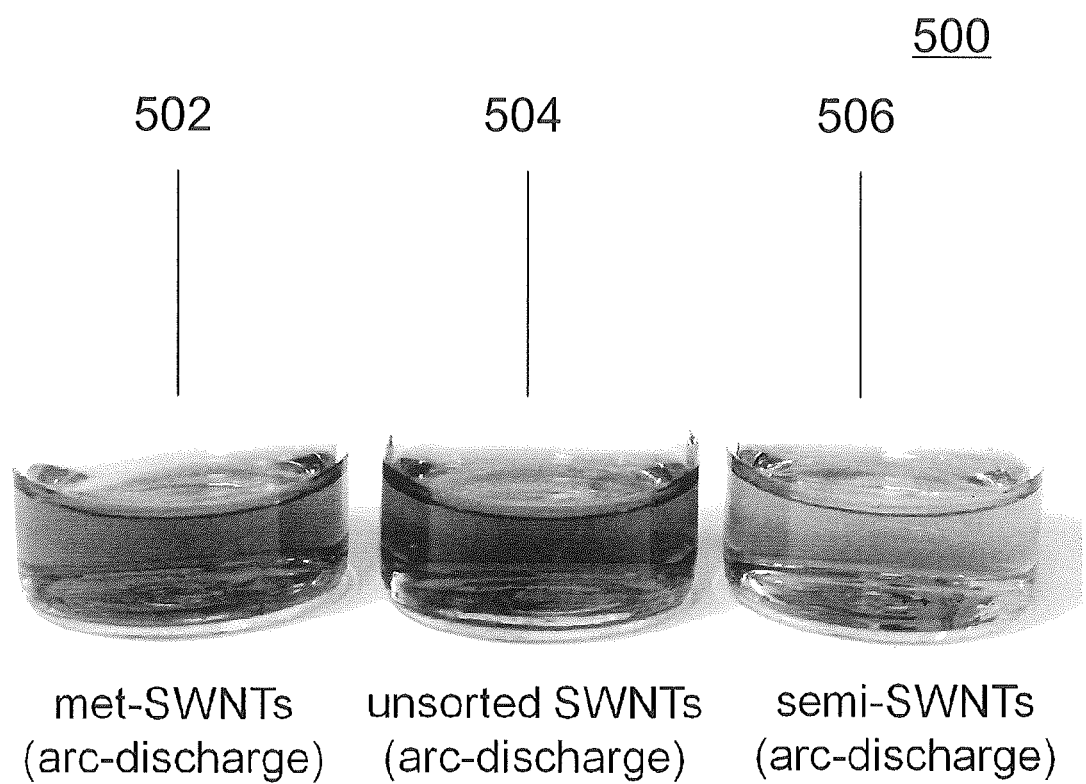
FIG. 5 is a photo showing the visual appearance of arc-discharge single-walled nanotube (SWNTs) dispersions in aqueous solution with surfactant: sorted metallic SWNTs, unsorted SWNTs and sorted semiconducting SWNTs.

FIG. 5 is a photo 500 showing the visual appearance of arc-discharge single-walled nanotube (SWNT) dispersions in aqueous solution with surfactant: sorted metallic SWNTs (502), unsorted SWNTs (504) and sorted semiconducting SWNTs a(506).

The use of non-ionic surfactant, control of pH of the aqueous solution, and the type of anionic beads used in our REIC method may be essential for high purity sorting. The applicability of our novel REIC sorting method for nanotubes with large average diameter produced by the arc-discharge method (P2-SWNTs from Carbon Solutions and ASP-100F from Hanwha Chemical), smaller diameter HiPco tubes (from Unidym) and CoMoCat tubes (from SouthWest NanoTechnologies), as well as single-walled and double-walled mixture (Elicarb carbon nanotubes form Thomas Swan) may be demonstrated, showing that the method is not sensitive to the nanotube diameter distribution.

SWNTs may undergo pH-mediated charge transfer p-doping by dissolved oxygen/water redox couple according to the Equation. (1).

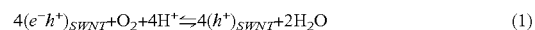

$$4(e^-h^+)_{SWNT} + O_2 + 4H^+ \rightleftharpoons 4(h^+)_{SWNT} + 2H_2O \qquad (1)$$

where $e^-$ represents an electron and $h^+$ represents a hole in a SWNT.

The Fermi level of un-doped SWNTs is around −4.7 eV ($E_{Fi}$, FIG. 3) and is higher than the electrochemical potential of $O_2/H_2O$ couple (in the absolute scale) in the neutral to acidic pH range, which varies from −5.27 eV to −5.67 eV as pH decreases from 7 to 0 in accordance with the Nernst equation. Therefore, from thermodynamics consideration, heterogeneous electron transfer from a SWNT to the $O_2/H_2O$ couple can happen until the new Fermi level of doped SWNT equals the electrochemical potential of $O_2/H_2O$ The half-cell reactions of reaction (1) may be represented as follows:

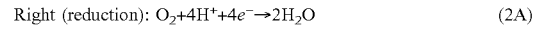

$$\text{Right (reduction): } O_2 + 4H^+ + 4e^- \rightarrow 2H_2O \qquad (2A)$$

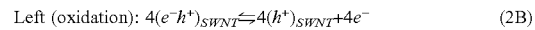

$$\text{Left (oxidation): } 4(e^-h^+)_{SWNT} \rightleftharpoons 4(h^+)_{SWNT} + 4e^- \qquad (2B)$$

For the right half-cell reaction above, $E_R$ (eV) is the actual electrochemical potential of $O_2/H_2O$ couple which can be calculated from the Nernst equation:

$$E_R = E_{O_2/H_2O} = -4.44 + (-1)(+1.229) + \frac{0.0592}{4}[4\ \text{pH} - \log_{10}(\rho_{O_2})] \qquad (3C)$$

where $\rho_{O_2}$ is the oxygen partial pressure (0.213 bar at atmospheric pressure).

For the left-cell reaction, $E_L$ is the Fermi level for both met-SWNTs and semi-SWNTs. Since $E_L > E_R$ at all pH (see FIG. 8), electrons can jump from higher energy level (SWNTs) to lower energy level ($O_2/H_2O$ couple) and the reaction (1) can happen spontaneously. However, this analysis only takes into account thermodynamics while the actual electron transfer rate is controlled by reaction kinetics discussed in the main text. As a result, the effective sorting pH is within the acidic pH range which is much smaller than the one predicted based on just thermodynamics.

However, in addition to thermodynamics, the kinetics aspect of the heterogeneous reaction also must be considered. The redox reaction (1) is known to be rate-limited by the electron-transfer reaction (4):

$$O_2 + e_{SWNT}^- \rightarrow O_2^- \qquad (4)$$

According to MG theory, the heterogeneous electron transfer kinetics is dependent on the availability, at/near the nanotube Fermi level, of both the occupied electronic states in the solid nanotubes and the unoccupied states of the $O_2/H_2O$ redox couples in solution (FIG. 3A). The MG theory also predicts that the density of states (DOS) at different energy levels of the $O_2/H_2O$ couple in the electrolyte has a Gaussian distribution with the maxima offset from its electrochemical potential (also the electrolyte Fermi level) by a reorganization energy ($\lambda$), as depicted in FIG. 3A (the blue bell-shaped curves). Physically, $\lambda$ is an energy penalty that relates to the reorganization of the polar water solvent molecules around the ions/molecules involved in the rate-limiting electron transfer reaction (4) and is approximately 1 eV for the $O_2/H_2O$ couple.

For met- and semi-SWNTs, their electron transfer kinetics could be drastically different due to their dramatically contrasted DOS in the bandgap region. At neutral pH, the electron transfer kinetics for both types of nanotubes is slow. The redox potential of the $O_2/H_2O$ couple decreases monotonically with pH so that as pH is reduced, the overlap of the occupied electronic states of nanotubes and the unoccupied energy states of the dissolved $O_2/H_2O$ couple increases for both types of nanotubes (FIG. 3A, from left to right, shaded region area increases), resulting in faster electron transfer kinetics for both semi- and met-SWNTs. More significantly, the absence of a bandgap in met-SWNTs leads to a significantly larger overlap of electronic states compared to that of semi-SWNTs (FIG. 3A, top versus bottom, shaded regions of the $D_{ox}$ curves). Such larger overlap for met-SWNTs, particularly at acidic pH, results in a much higher rate of electron transfer from met-SWNTs to dissolved oxygen and thus a higher concentration of cationic charges on met-SWNTs surfaces (FIG. 3B). Therefore, although both types of SWNTs have anionic charges at neutral pH, which are caused by carboxylic groups on their defect sites, at certain acidic pH, met-SWNTs will quickly gain enough positive charges to compensate the initial anionic surface charges and thus acquire cationic net electrostatic polarity, a phenomenon that has previously been observed in diamonds as well. On the other hand, semi-SWNTs still largely preserve their anionic net surface charges due to their much slower rate of reaction.

Figure 6A:
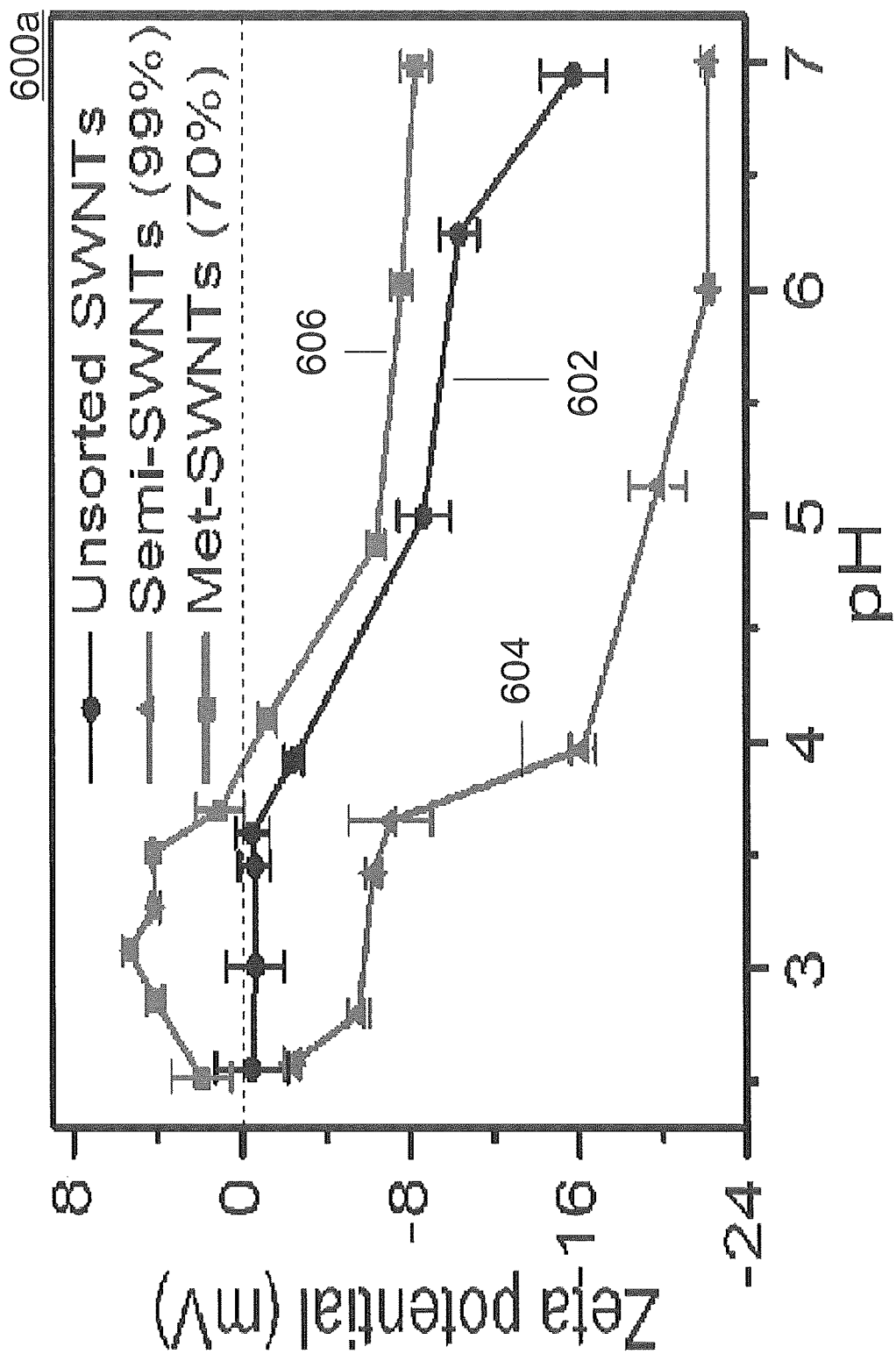
FIG. 6A is a plot of zeta potential (millivolts or mV) against pH of unsorted single-walled nanotubes (SWNTs), semiconducting single-walled nanotubes (semi-SWNTs) enriched fraction and metallic single-walled nanotubes (met-SWNTs) enriched fraction.

To experimentally observe the changes of surface charges on SWNTs, effects from charged functional groups on typically used ionic surfactants wrapping around nanotubes must be eliminated. We avoid this masking effect by suspending and de-bundling nanotubes in water with the help of non-ionic surfactants and consequently we are able for the first time to directly observe the met-versus semi-contrast in electrostatic polarity by means of zeta potential measurements of bulk nanotube samples. FIG. 6A is a plot 600a of zeta potential (mV) against pH of unsorted single-walled nanotubes (SWNTs), semi-conducting single-walled nanotubes (semi-SWNTs) enriched fraction and metallic single-walled nanostubes (met-SWNTs) enriched fraction. 602 represents the results for the unsorted SWNTs. 604 represents the results for eluted fraction containing 99% semi-SWNTs. 606 represents the results for the bound fraction containing 70% met-SWNTs.

Figure 6B:
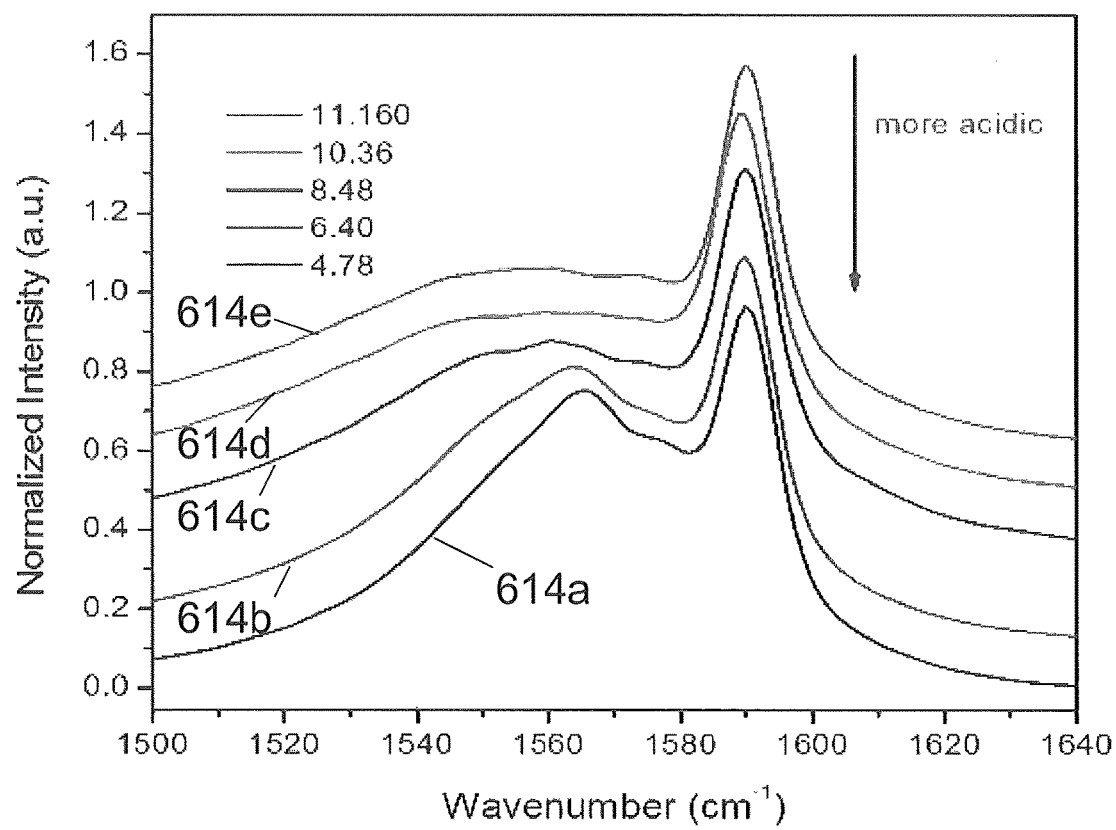
FIG. 6B is a plot of normalized intensity (arbitrary units or a.u.) against wavenumber ($cm^{-1}$).
Figure 6C:
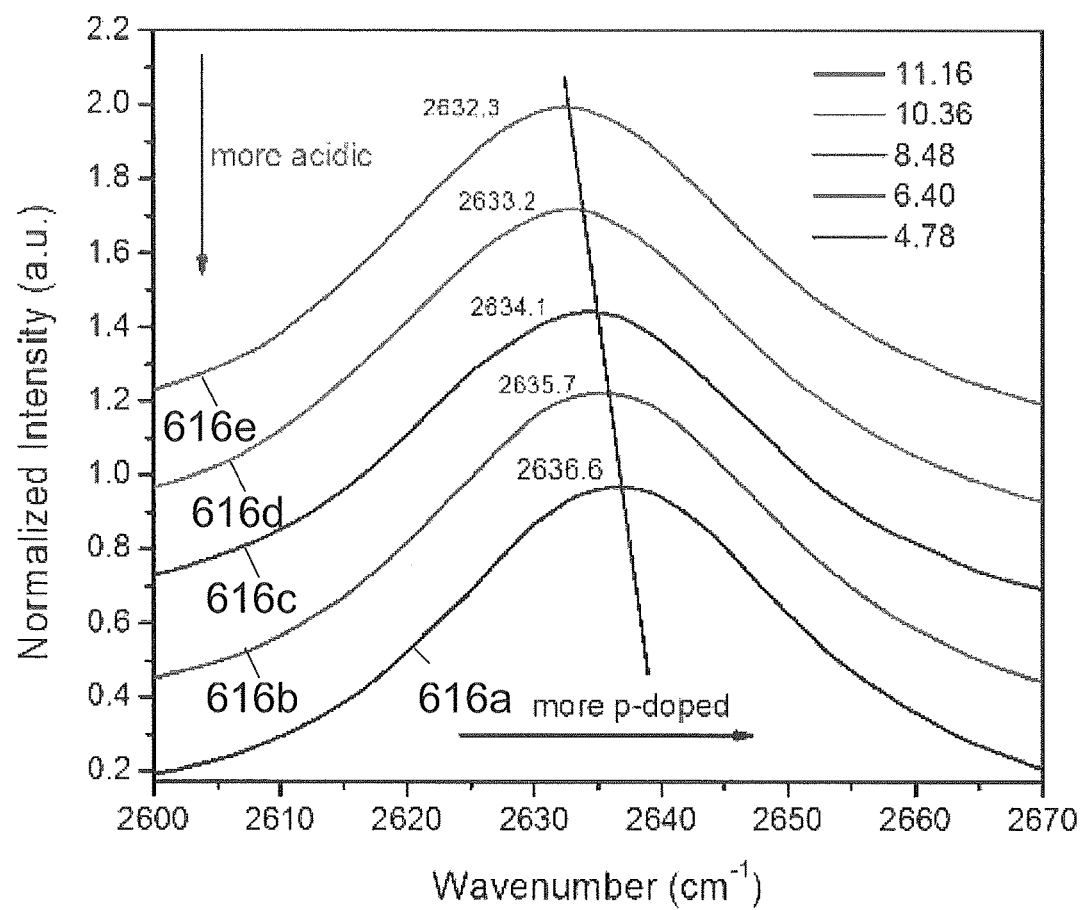
FIG. 6C is another plot of normalized intensity (arbitrary units or a.u.) against wavenumber (in reciprocal centimeters or $cm^{-1}$).
Figure 6D:
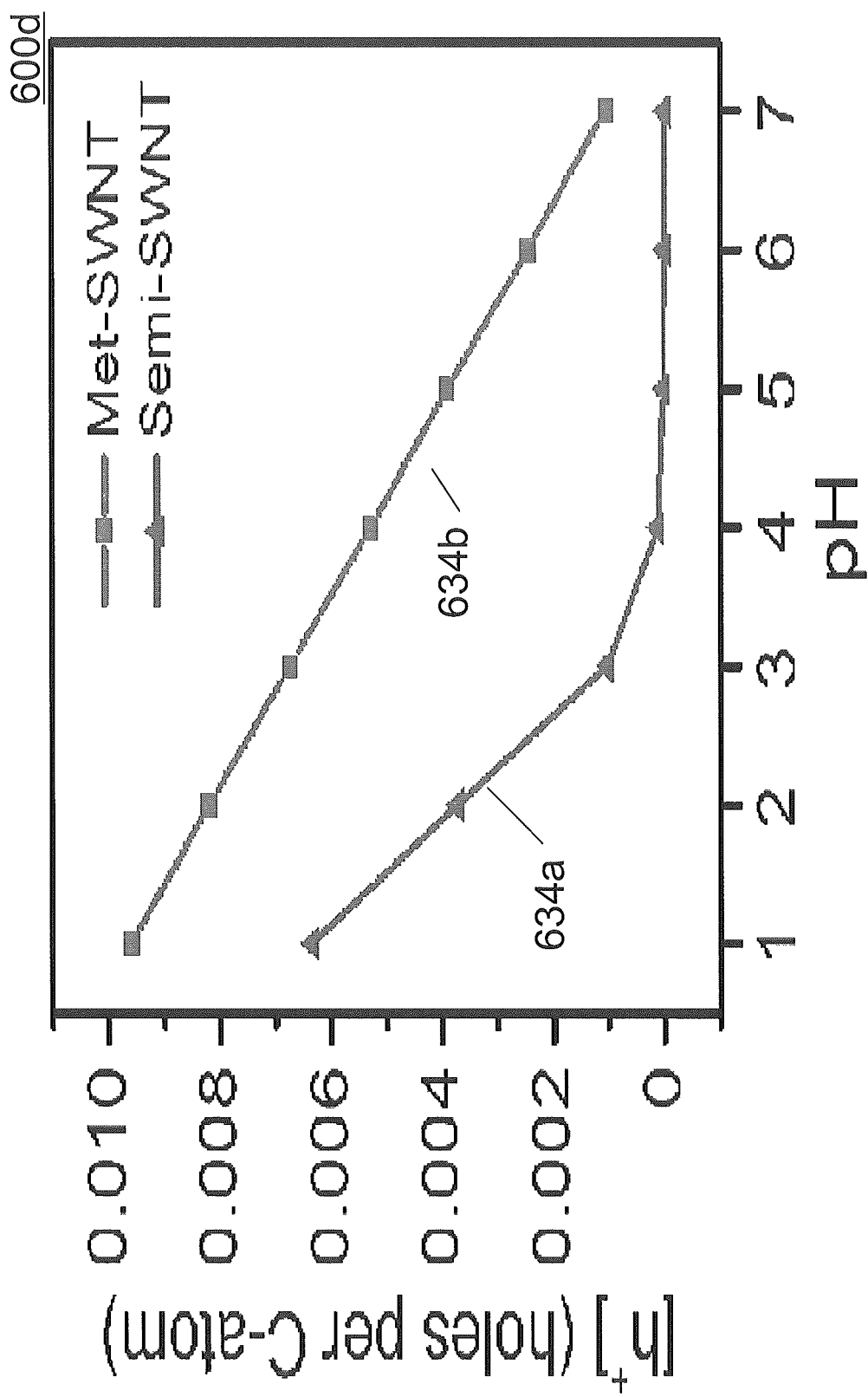
FIG. 6D is a plot of calculated concentrations of holes (holes per carbon atoms) in semi-SWNTs and met-SWNTs at various pH based on the Marcus-Gerischer model.

FIG. 6B is a plot 600b of normalized intensity (arbitrary units) against wavenumber ($cm^{-1}$). FIG. 6B illustrates the Raman spectra (633 nm, red laser) focusing on G band (1540 $cm^{-1}$ to 1600 $cm^{-1}$) of unsorted SWNTs as pH decreases. All spectra are normalized with the $G^+$ peak intensity. 614a-e represent the Raman spectra at pH=4.78, 6.40, 8.48, 10.36 and 11.160 respectively. FIG. 6C is another plot 600c of normalized intensity (arbitrary units) against wave number ($cm^{-1}$). FIG. 6C illustrates the Raman spectra (633 nm, red laser) focusing on 2D band (2630 $cm^{-1}$) of unsorted SWNTs as pH decreases. All spectra are normalized with the 2D peak intensity. 616a-e represent the Raman spectra at pH=4.78, 6.40, 8.48, 10.36 and 11.160 respectively. The Raman spectroscopy shows narrowing of the Breit-Wigner-Fano (BWF) band at lower wave number (FIG. 6B) and the upshift of the 2D band as pH decreases proving that SWNTs become more doped as pH becomes more acidic (FIG. 6C). FIG. 6D is a plot 600d of calculated concentrations of holes (holes per carbon (C) atom) in semi-SWNTs and met-SWNTs at various pHs based on the Marcus-Gerischer model. 634a represents data for semi-SWNTs and 634b represents data for metallic-SWNTs.

The enhanced p-doping of SWNTs suspended in Triton X-405 surfactant as a function of pH is supported by both the increasing zeta potential (FIG. 6A) and the pH-dependent Raman spectra shown in FIGS. 6B and 6C. In addition, as shown in FIG. 6A, the zeta potential of met-SWNTs is always higher than that of semi-SWNTs, reflecting the greater degree of electron transfer from met-SWNTs as predicted by the MG theory. Crucially, over a substantial pH range of around 3~4, the measured zeta potentials of met- and semi-SWNTs have opposite signs (FIG. 6A). Numerical estimates of the concentrations of holes acquired by SWNTs (FIG. 6D) indicate that in this pH range, met-SWNTs are substantially p-doped (~0.005 to ~0.007 holes per carbon-atom) while the p-doping of semi-SWNTs is several-fold smaller. This contrast is large enough to overcome the polydisperse character of the anionic charge due to nanotube defects and impart a distinguishable electrostatic polarity to the met- and semi-SWNT populations. Remarkably, the initial negative charges on the semi-SWNTs due to defects are advantageous for the purposes of sorting as they facilitate the creation of an opposite polarity contrast in the surface charges of met-versus semi-SWNTs.

The differentially doped nanotube species may be used as feedstock for the REIC process in which the chromatography beads are anionic (as shown in FIG. 4). Spharorse-CR beads which are agarose beads (Sepharose 4B, GE) functionalized with congo red (CR) containing anionic sulfonate groups may be used (FIG. 4 inset). The sulfonate groups may have pKa of around −2.8 and may be chosen because they remain negatively charged at pH values above 0 to confer pH-stable anionic charge to the agarose beads when the solution pH is adjusted from neutral to acidic. The suspension may be loaded on top of the column and the semi-SWNTs enriched fraction may collected after few minutes (1st elution, FIG. 4 inset) while the met-SWNTs remains absorbed. The met-SWNTs may be eluted out by an aqueous solution of an ionic surfactant of simply raising the pH of the Triton solution to basic (>10) (2nd elution, FIG. 4 inset).

Alternatively, the beads may also be modified with direct blue 71 or amino-naphthalene-sulfonate salts or Evans blue.

Figure 7A:
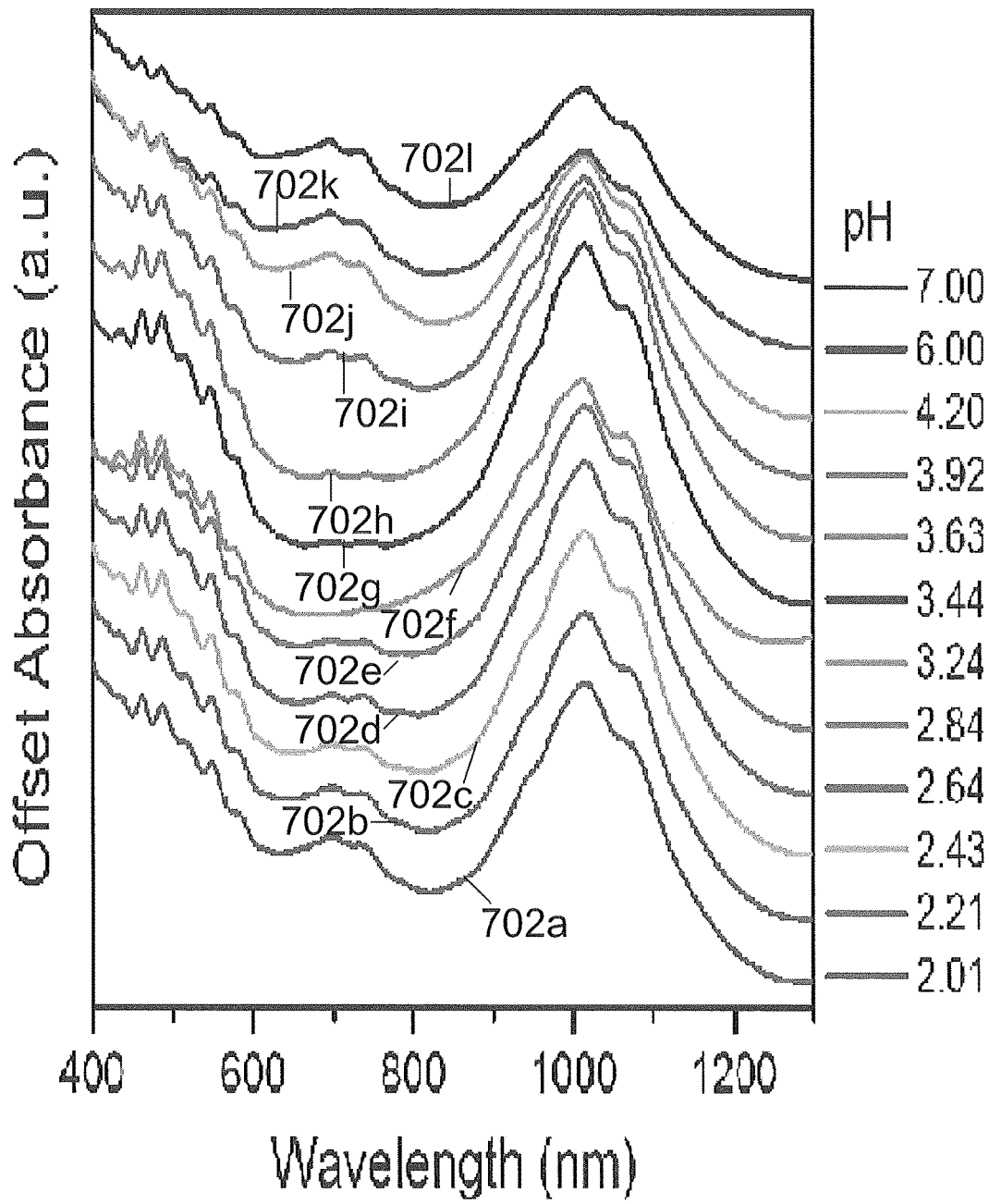
FIG. 7A is a plot of normalized offset absorbance (arbitrary units or a.u.) against wavelength (nanometers or nm) showing the ultraviolet-visible-near infrared spectra (UV-vis-NIR) spectra of sorted semi-SWNTs.
Figure 7B:
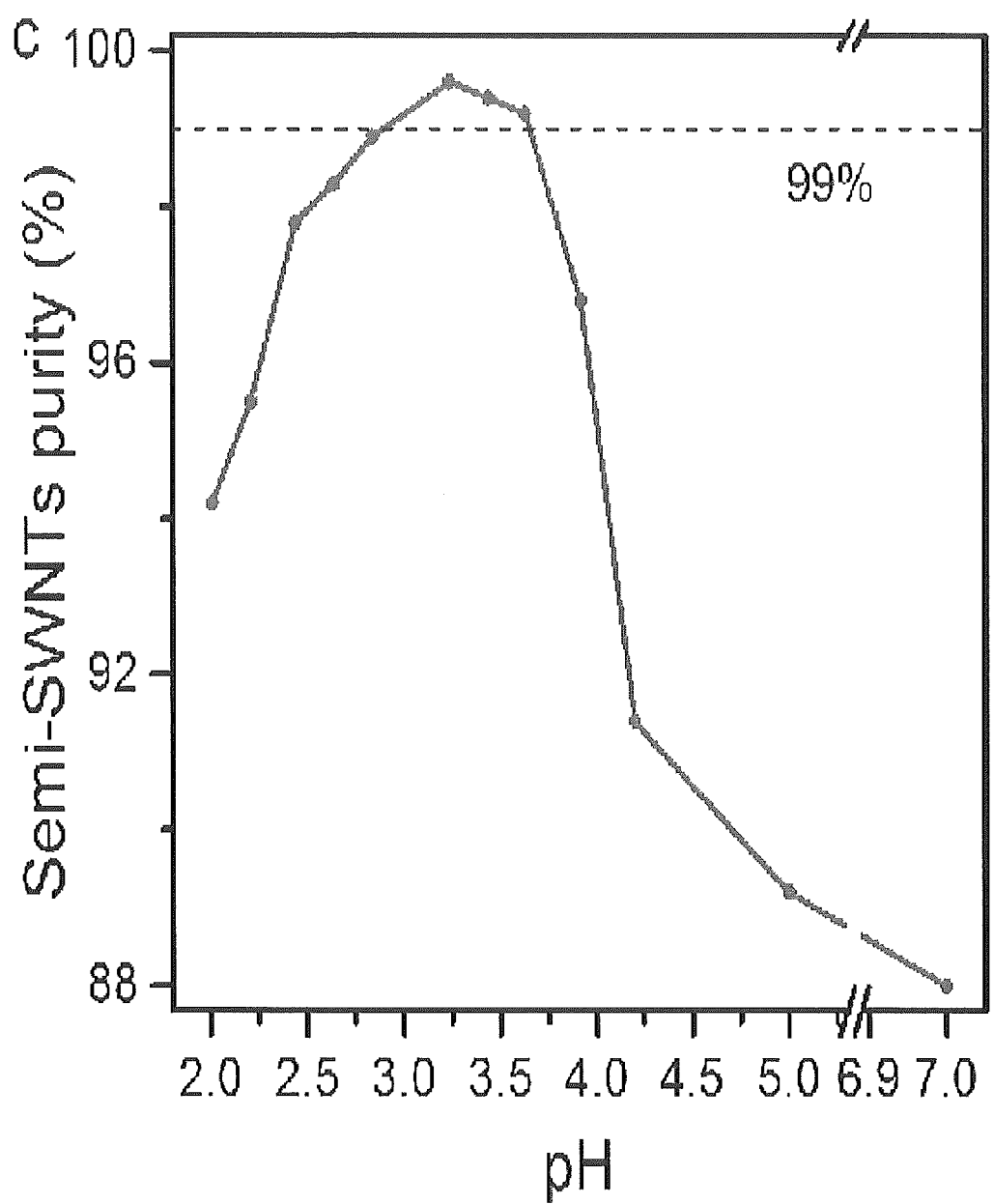
FIG. 7B is a plot of purity (in percentage or %) against pH illustrating the semiconducting single-walled nanotubes (SWNTs) purity of the eluted fraction collected at various sorting pH.
Figure 7C:
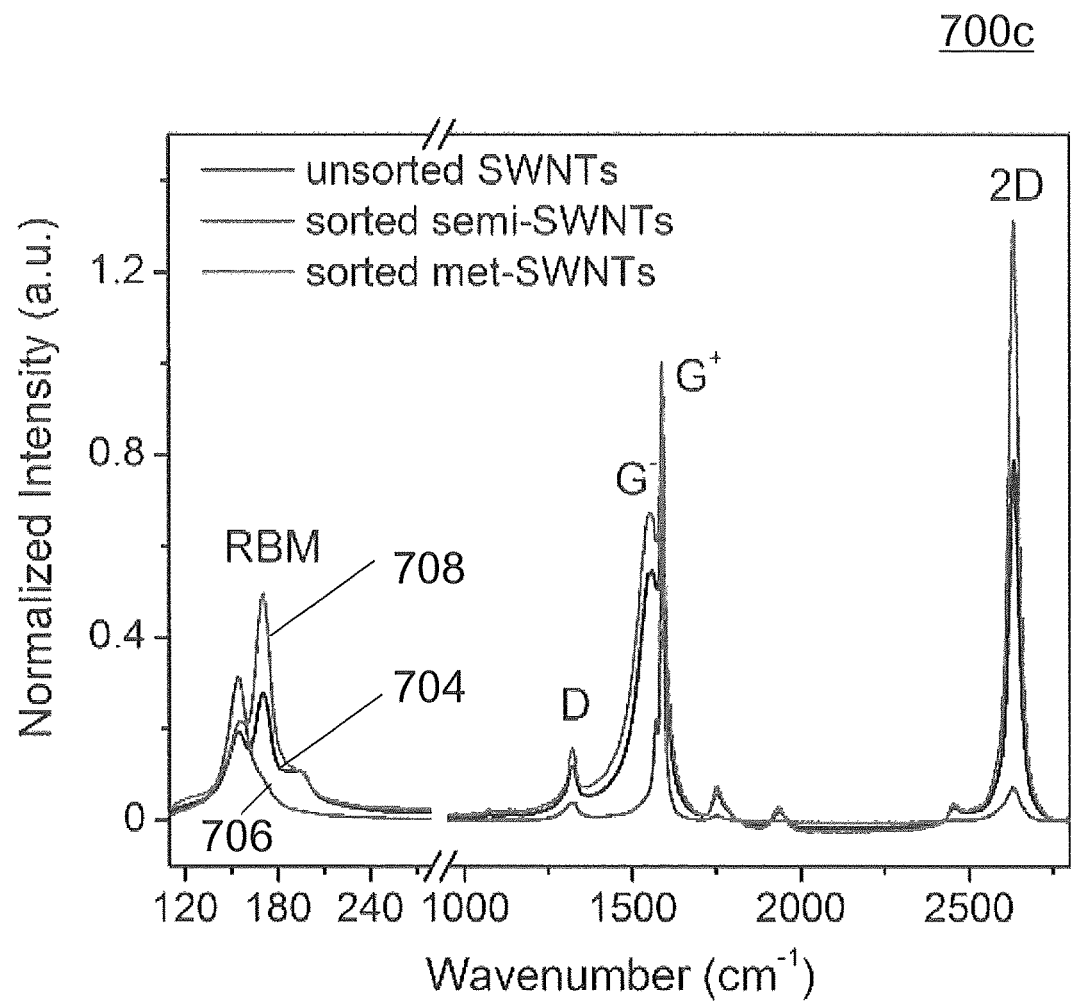
FIG. 7C is a plot of normalized intensity (arbitrary units or a.u.) against wavenumber ($cm^{-1}$) illustrating the Raman spectra (633 nm, red laser) of unsorted single-walled nanotubes (SWNTs), semiconducting-SWNTs (semi-SWNTs) and metallic-SWNTs (met-SWNTs) sorted via Sepharose-CR beads (pH=3.2).

FIG. 7A is a plot 700a of offset normalized absorbance against wavelength (nm) showing the ultraviolet-visible-near infrared spectra (UV-vis-NIR) spectra of sorted semi-SWNTs. The sorted semi-SWNTs may be collected in Stage 2 at sorting pH from 2.01 to 7.00 via Sepharose-CR beads. 702a-1 present data for sorting pHs of 2.01, 2.21, 2.43, 2.64, 2.84, 3.24, 3.44, 3.63, 3.92, 4.20, 6.00 and 7.00 respectively. FIG. 7B is a plot 700b of purity (%) against pH illustrating the semiconducting single-walled nanotubes (SWNTs) purity of the eluted fraction collected at various sorting pH. The eluted fraction may be collected in Stage 2 at sorting pH from 2.01 to 7.00 via Sepharose-CR beads. FIG. 7C is a plot 700c of normalized intensity (arbitrary units) against wavenumber ($cm^{-1}$) illustrating the Raman spectra (633 nm, red laser) of unsorted single-walled nanotubes (SWNTs), semi-conducting-SWNTs (semi-SWNTs) and metallic-SWNTs (met-SWNTs) sorted via Sepharose-CR beads (pH=3.2).

Figure 7D:
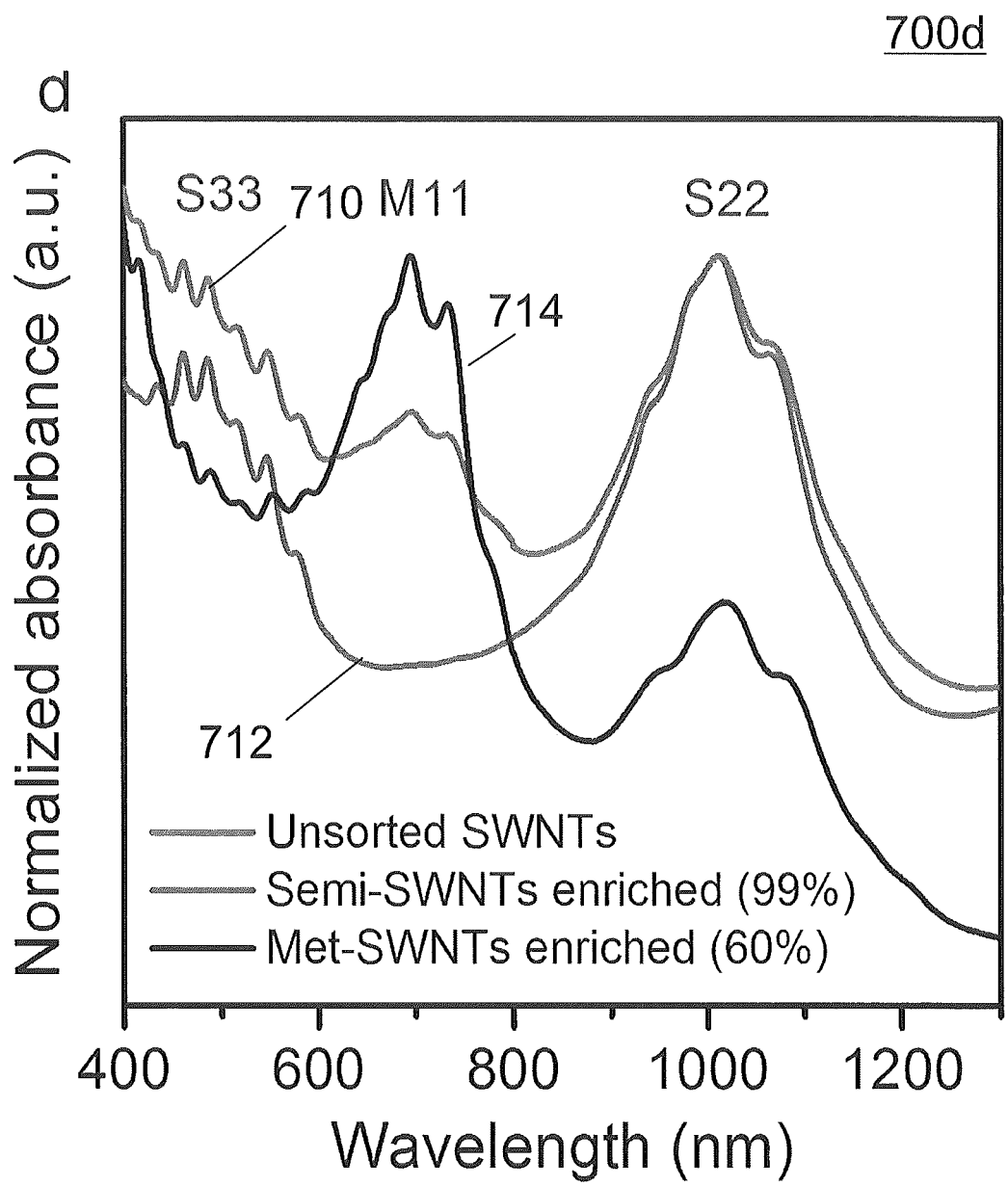
FIG. 7D is a plot of normalized absorbance (in arbitrary units or a.u.) as a function of wavelength (in nanometers or nm) illustrating the ultraviolet-visible-near infrared (UV-vis-NIR) spectra of unsorted SWNTs, semi-SWNTs enriched and met-SWNTs enriched fractions sorted at pH=3.2 using Sepharose-CR beads.

704 represents data related to unsorted SWNTs, 706 represents data related to semi-SWNTs and 708 represents data related to met-SWNTs. FIG. 7D is a plot 700d of UV-vis-NIR spectra of unsorted SWNTs, semi-SWNTs enriched and met-SWNTs enriched fractions sorted at pH=3.2 using Sepharose-CR beads. 710 represent data for unsorted SWNTs, 712 represents data for semi-SWNTs and 714 represents data for met-SWNTs.

Figure 8:
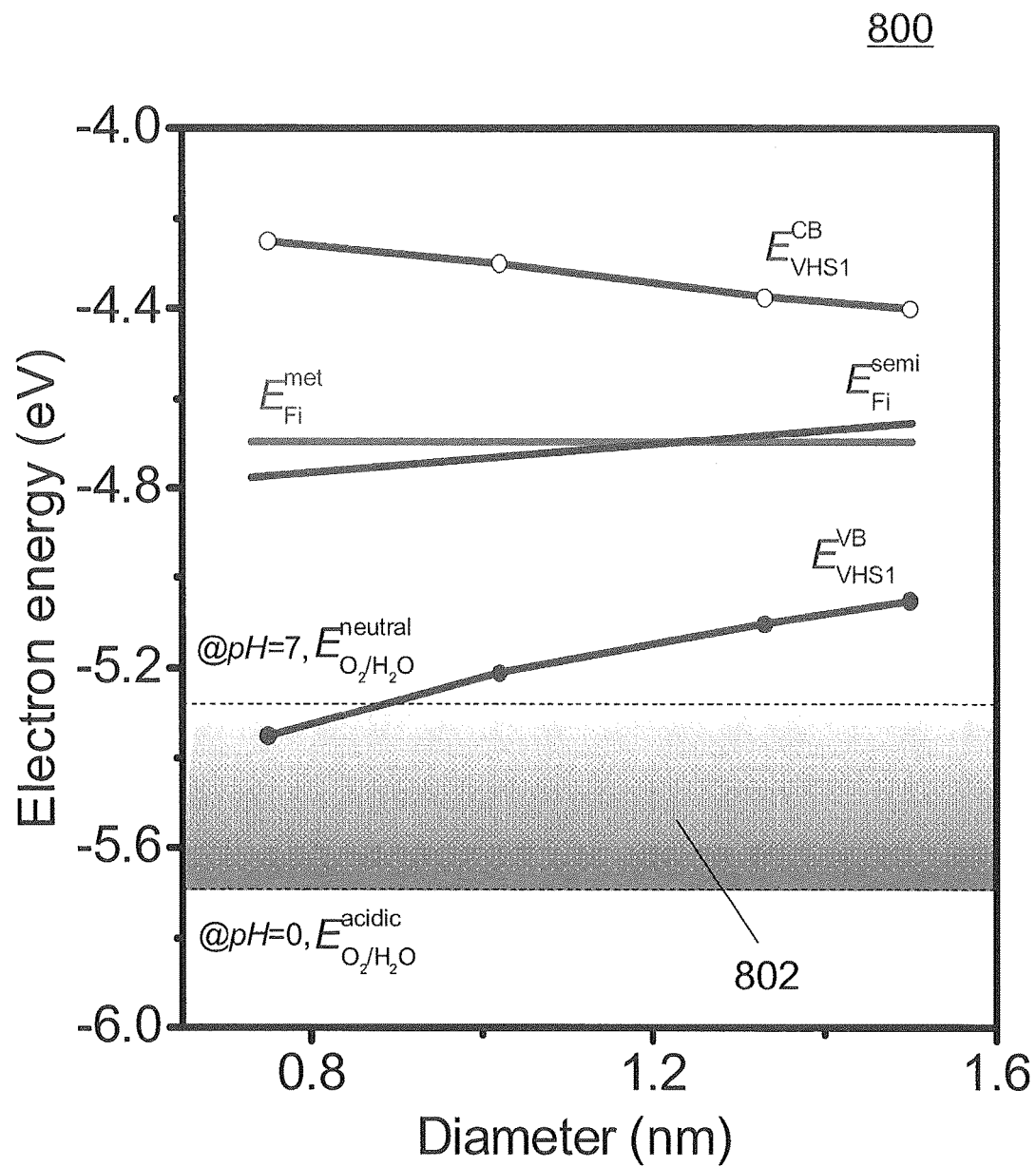
FIG. 8 is a plot of electron energy (electron volts or eV) as a function of diameter (nanometers or nm). $E_{Fi}^{met}$, $E_{Fi}^{semi}$ $E_{VHS1}^{VB}$, $E_{VHS1}^{CB}$ are the respective 1$^{st}$ Van Hove singularities in the valence band and conduction band of semi-SWNTs, blue shaded area indicates the electrochemical potential of $O_2/H_2O$ couple from pH=0 to pH=7).

With pH optimization, ultra-high purity (>99%) sorted semi-SWNTs may be achieved between pH=3.2 to pH=3.6 with Sepharose-CR beads (FIGS. 7A-B). UV-VIS-NIR spectroscopy showed that the semi-SWNT purity is >99% with M11 peaks almost undetectable (for sorting pH=3.2 as an illustration). Raman spectroscopy (red laser with 1.96 eV excitation energy) was used to confirm the sorting purity. We see that for the sorted semi-SWNTs (line 706 in FIG. 7C), the metallic peaks at ~171 cm$^{-1}$ and ~196 cm$^{-1}$ in radial breathing mode (RBM) region totally disappear while the G-band (~1569 cm$^{-1}$) becomes much narrower because of the greatly reduced met-SWNTs content. Also, the 2D peak at ~2600 cm$^{-1}$ reduces corroborating that the semi-SWNTs purity increases. It is important to note that the optimum sorting pH range may differ from source to source, and from batch to batch, due to variations in SWNT chiralities and the degree of functionalization on the SWNT side-wall. FIG. 8 is a plot 800 of electron energy (eV) as a function of diameter. FIG. 8 illustrates the electronic band structure of met-SWNTs and semi SWNTs as a function of diameter together with electrochemical potential of $O_2/H_2O$ couple from pH=0 to pH=7 ($E_{Fi}^{met}$, $E_{Fi}^{semi}$ are the respective intrinsic Fermi levels of met-SWNTs and semi-SWNTs, $E_{VHS1}^{VB}$, $E_{VHS1}^{CB}$ are the respective 1$^{st}$ Van Hove singularities in the valence band and conduction band of semi-SWNTs. Area 802 indicates the electrochemical potential of $O_2/H_2O$ couple from pH=0 to pH=7)

Figure 9A:
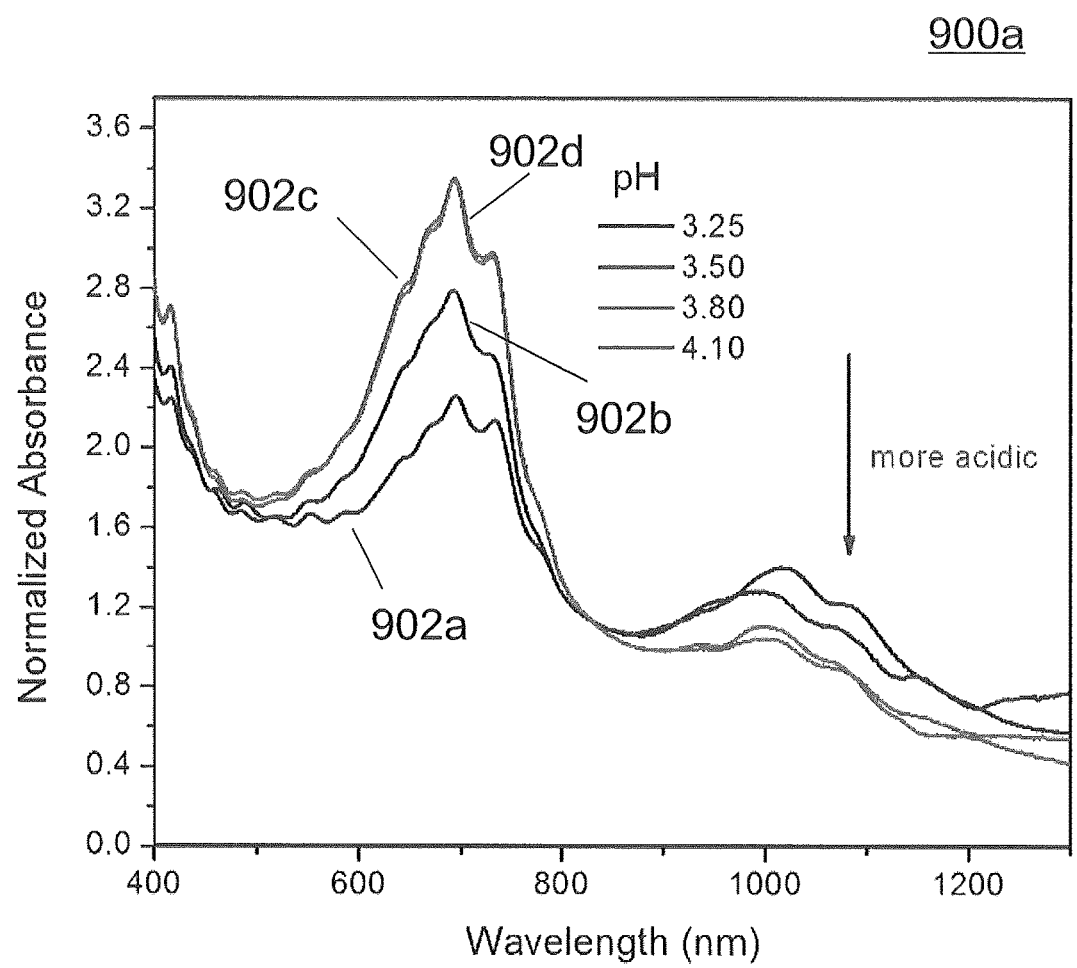
FIG. 9A is a plot of normalized absorbance (in arbitrary units or a.u.) against wavelength (nanometers or nm) illustrating the ultraviolet-visible-near infrared (UV-vis-NIR) of the metallic single-walled nanotubes (met-SWNTs) enriched fractions collected in Stage 3 at sorting pH from 3.25 to 4.10 via Sepharose-congo red (CR) beads.
Figure 9B:
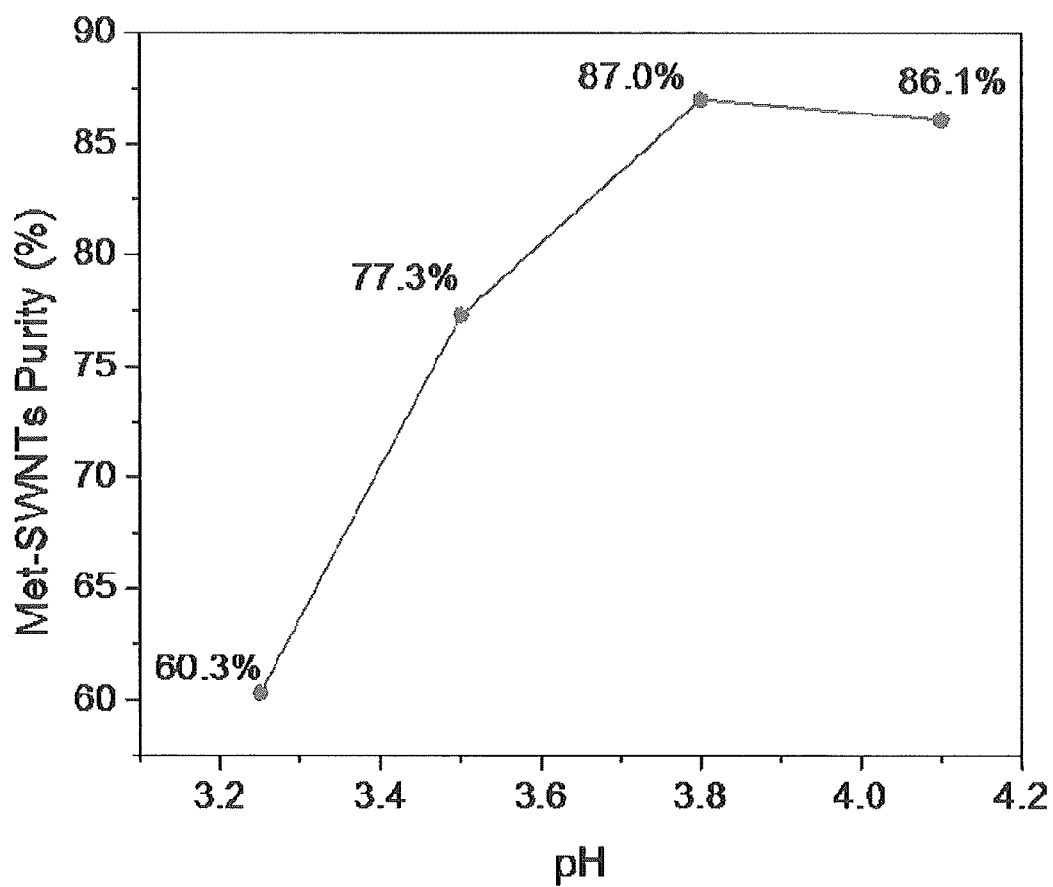
FIG. 9B is a plot of metallic single-walled nanotubes purity (percentage or %) against pH illustrating the metallic single-walled nanotubes (met-SWNTs) purity in elution collected in Stage 3 at sorting pH from 3.25 to 4.10 via Sepharose-congo red (CR) beads.

Met-SWNTs purity may be greatly enhanced when pH is from 3.8 to 4.0 since only a few chiralities of met-SWNTs have positive net charges and may be adsorbed on to the beads. FIG. 9A is a plot 900a of normalized absorbance against wavelength (nm) illustrating the ultraviolet-visible-near infrared (UV-vis-NIR) of the metallic single-walled nanotubes (met-SWNTs) enriched fractions collected in Stage 3 at sorting pH from 3.25 to 4.10 via Sepharose-congo red (CR) beads. 902a-d illustrate the data at sorting pHs of 3.25, 3.50, 3.80 and 4.10 respectively. FIG. 9B is a plot 900b of metallic single-walled nanotubes purity (%) against pH illustrating the metallic single-walled nanotubes (met-SWNTs) purity in elution collected in Stage 3 at sorting pH from 3.25 to 4.10 via Sepharose-congo red (CR) beads.

In order to sort out the different nanotube chiral species, the different nanotube chiral species need to be suspended individually. The surfactant must not interfere with the subtle differential charge conferred by the different bandgaps so as to exploit the subtle doping differences. However, most other nanotube sorting techniques use ionic surfactants for suspending the nanotubes. A consequence of this is that the charges of the ionic surfactants may mask the differential charges on the differentially doped semi-versus metallic SWNTs. One of the key features according to various embodiments may include the use of the relatively unexploited non-ionic surfactants for suspending the nanotubes. When using non-ionic surfactants, there may be no masking effect and the full extent of pH-controllable differential doping of metallic and semiconducting species may be exploited.

Various embodiments involve the use of non-ionic surfactant as opposed to SDS/SC used previously for all other conventional high purity sorting with density gradient ultra-centrifugation (DGU) and column chromatography. The use of non-ionic surfactant may be important for avoiding introduction of any external ions onto the SWNTs side-wall. The use of ionic surfactants, e.g., SDS, SDBS, SC or cetyltrimethylammonium bromide (CTAB), instead of Triton X-405 solution, to disperse and elute the unsorted SWNTs are also investigated. Unsurprisingly, none of these gives rise to any separation because the subtle charge differential between semi- and met-SWNTs at the optimum sorting pH (usually, acidic) was masked by the external surfactant charges. On the other hand, other non-ionic surfactants, e.g., Brij L23 and Brij S100, are demostrated to be able to achieve excellent separations as well. Also, to reduce other interactions of nanotubes with beads, we have used hydrophilic agarose beads. Efforts with cationic hydrophobic polydivinylbenzene-based beads has not produced good purity sorting.

Figure 10:
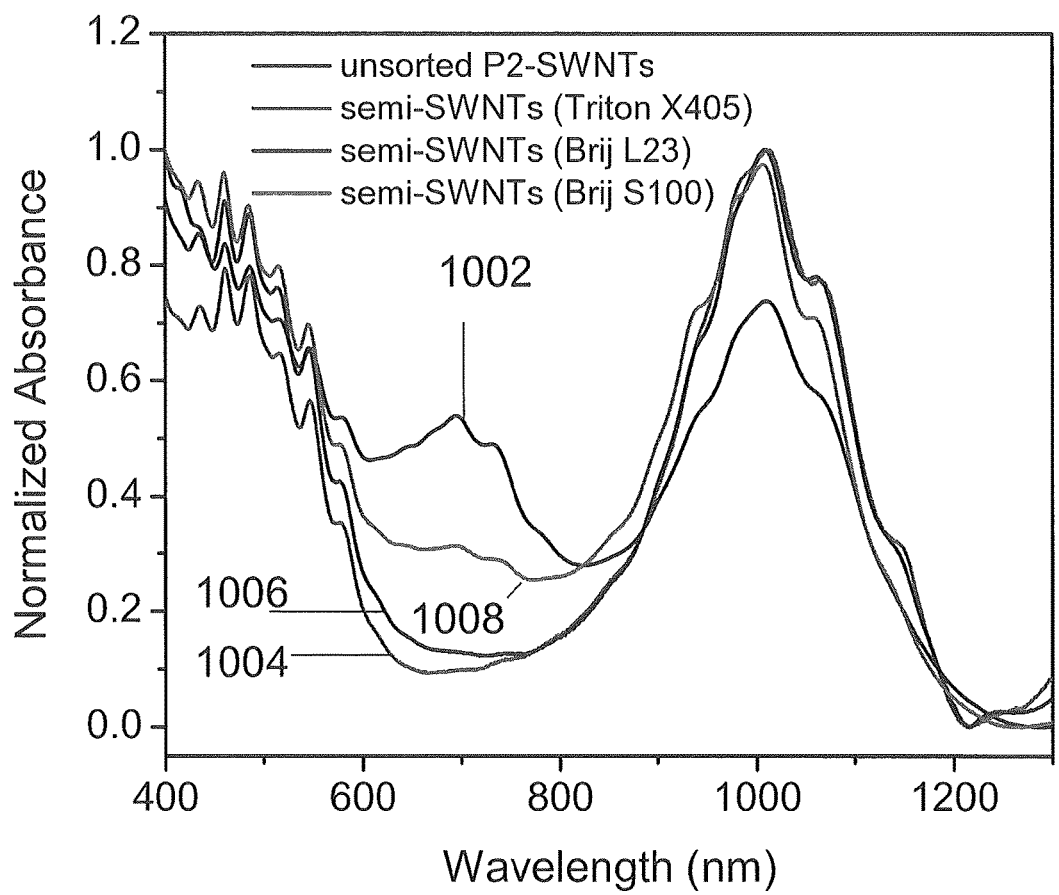
FIG. 10 is a plot of normalized absorbance (arbitrary units or a.u.) against wavelength (nanometers or nm) illustrating the ultraviolet-visible-near infrared (uv-vis-NIR) of unsorted arc-discharge single-walled nanotubes (SWNTs) (P2-SWNTs from Carbon Solutions, Inc) and sorted semiconducting single-walled nanotubes (semi-SWNTs) with 2.8% Triton X-405, 5% Brij L23 and 5% Brij S100.

FIG. 10 is a plot 1000 of normalized absorbance against wavelength (nm) illustrating the ultraviolet-visible-near infrared (uv-vis-NIR) of unsorted arc-discharge single-walled nanotubes (SWNTs) (P2-SWNTs from Carbon Solutions, Inc) (SWNTs) and sorted semi-conducting single-walled nanotubes (semiconducting SWNTs or semi-SWNTs) with 2.8% Triton X-405, 5% Brij L23 and 5% Brij S100. All the sorting were performed on Sepharose-CR beads and sorting pH=3.2. 1002 represents the data for unsorted P2-single-walled nanotubes (SWNTs). 1004 represents the data for sorted semi-conducting single-walled nanotubes (semiconducting SWNTs or semi-SWNTs) with 2.8 Triton X-405 (red), 1006 represents the data for sorted semi-conducting single-walled nanotubes (semi-SWNTs) with 5% Brij L23, and 1008 represents the data for sorted semi-conducting single-walled nanotubes (semi-SWNTs) with 5% Brij S100.

Figure 11:
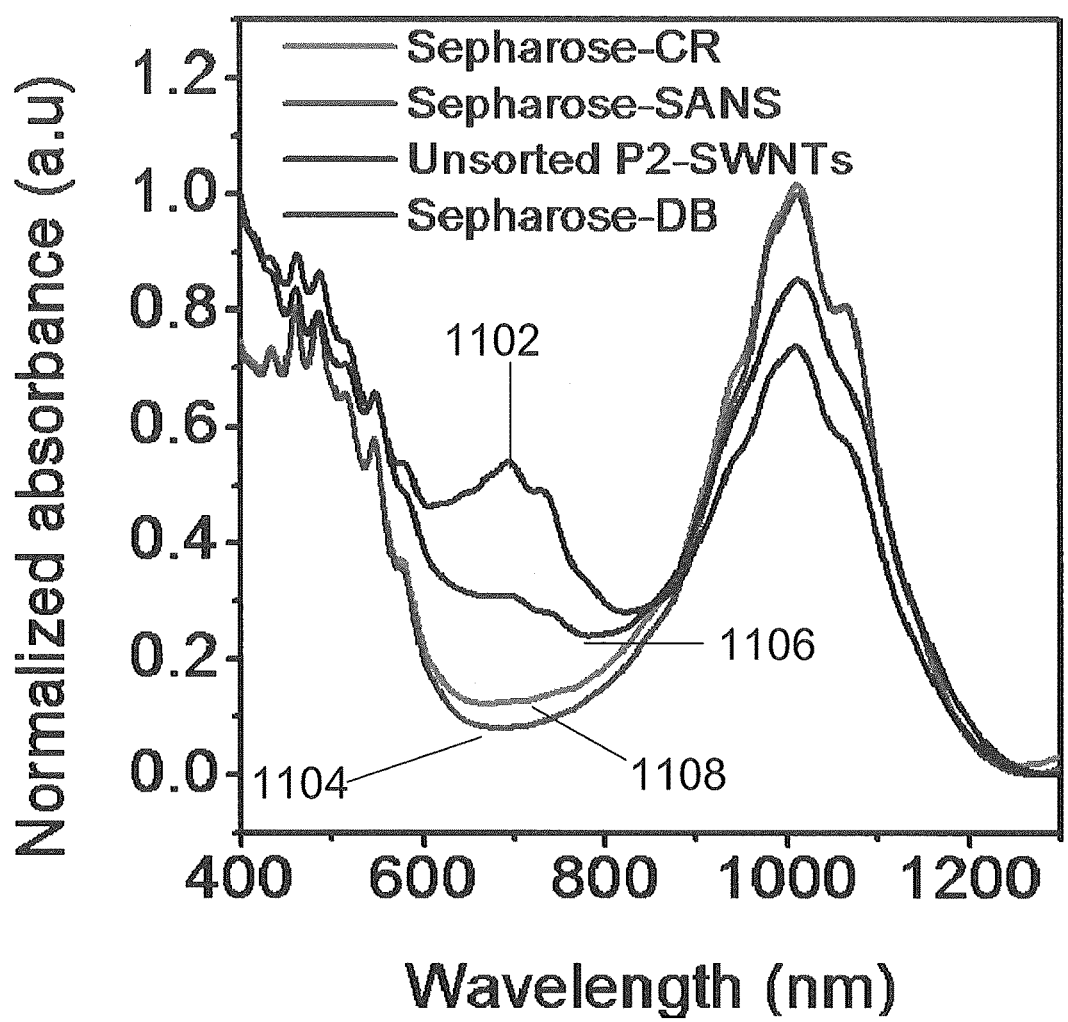
FIG. 11 is a plot of normalized absorbance (arbitrary units or a.u.) against wavelength (nanometers or nm) illustrating the ultraviolet-visible-near infrared (uv-vis-NIR) of unsorted arc-discharge single-walled nanotubes (SWNTs) (P2-SWNTs from Carbon Solutions, Inc), semiconducting single-walled nanotubes (sorted using Sepharose beads functionalized with Direct Blue (DB)), semiconducting single-walled nanotubes (sorted using Sepharose functionalized using sodium 4-amino-1-naphthalenesulfonate (SANS)) and semiconducting single-walled nanotubes (sorted using Sepharose functionalized using congo red (CR)).

FIG. 11 is a plot 1100 of normalized absorbance against wavelength (nm) illustrating the ultraviolet-visible-near infrared (uv-vis-NIR) of unsorted arc-discharge single-walled nanotubes (SWNTs) (P2-SWNTs from Carbon Solutions, Inc) (SWNTs), semiconducting single-walled nanotubes (sorted using Sepharose beads functionalized with Direct Blue (DB)), semiconducting single-walled nanotubes (sorted using Sepharose functionalized using 4-amino-1-naphthalenesulfonate (SANS)) and semiconducting single-walled nanotubes (sorted using Sepharose functionalized using congo red (CR)). 1102 represents the data for unsorted P2-single-walled nanotubes (SWNTs), 1104 represents the data for semiconducting single-walled nanotubes (Sepharose—Direct Blue (DB)), 1106 represents the data for semi-conducting single-walled nanotubes (Sepharose—sodium 4-amino-1-naphthalenesulfonate (SANS)) and 1108 represents the data for semiconducting single-walled nanotubes (Sepharose—congo red (CR)).

Figure 12:
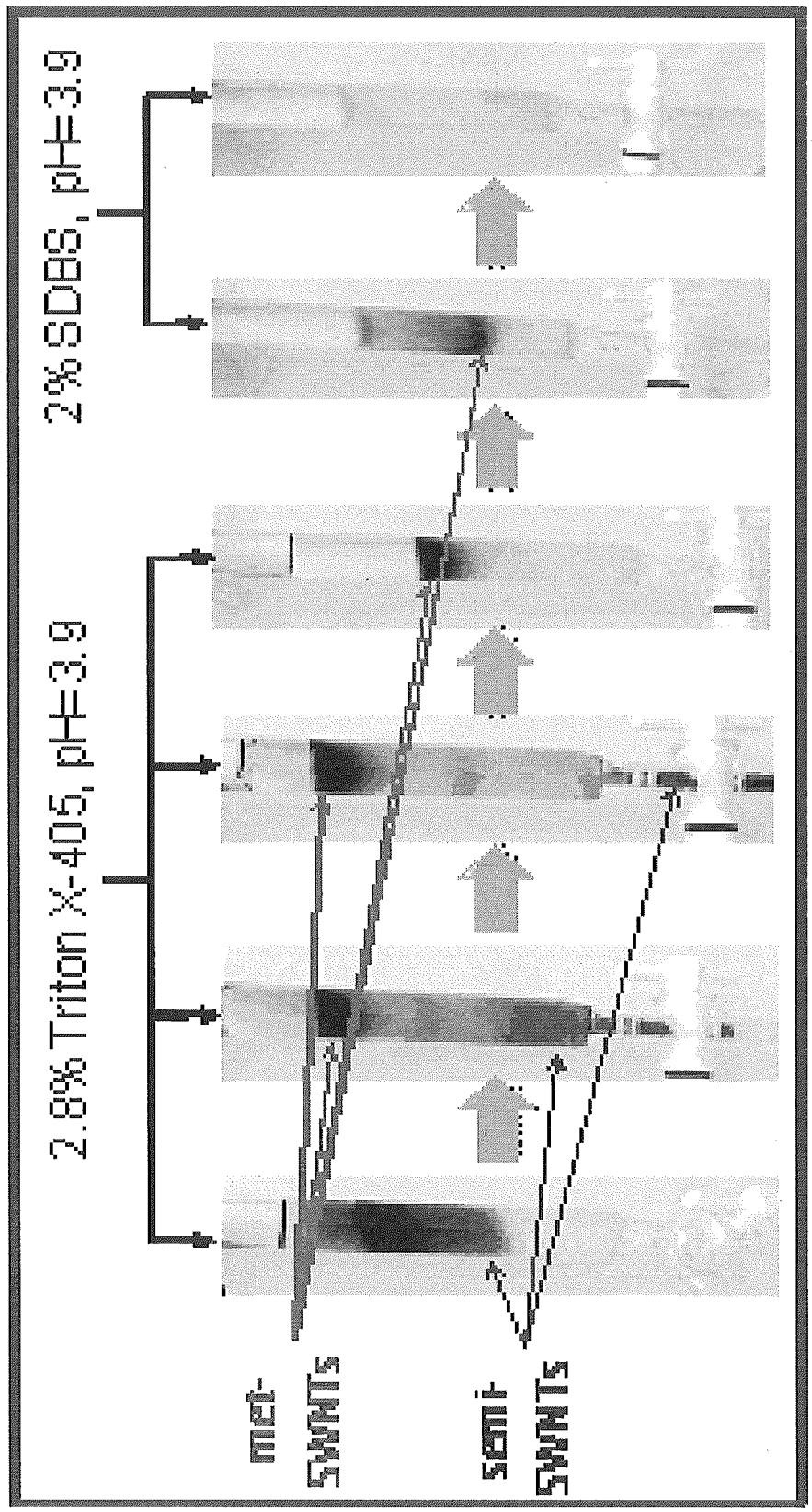
FIG. 12 is a photo illustrating the separation process in Sepharose 4B column with 2.8% Triton X-405 at acidic condition (pH=3.9).
Figure 17:
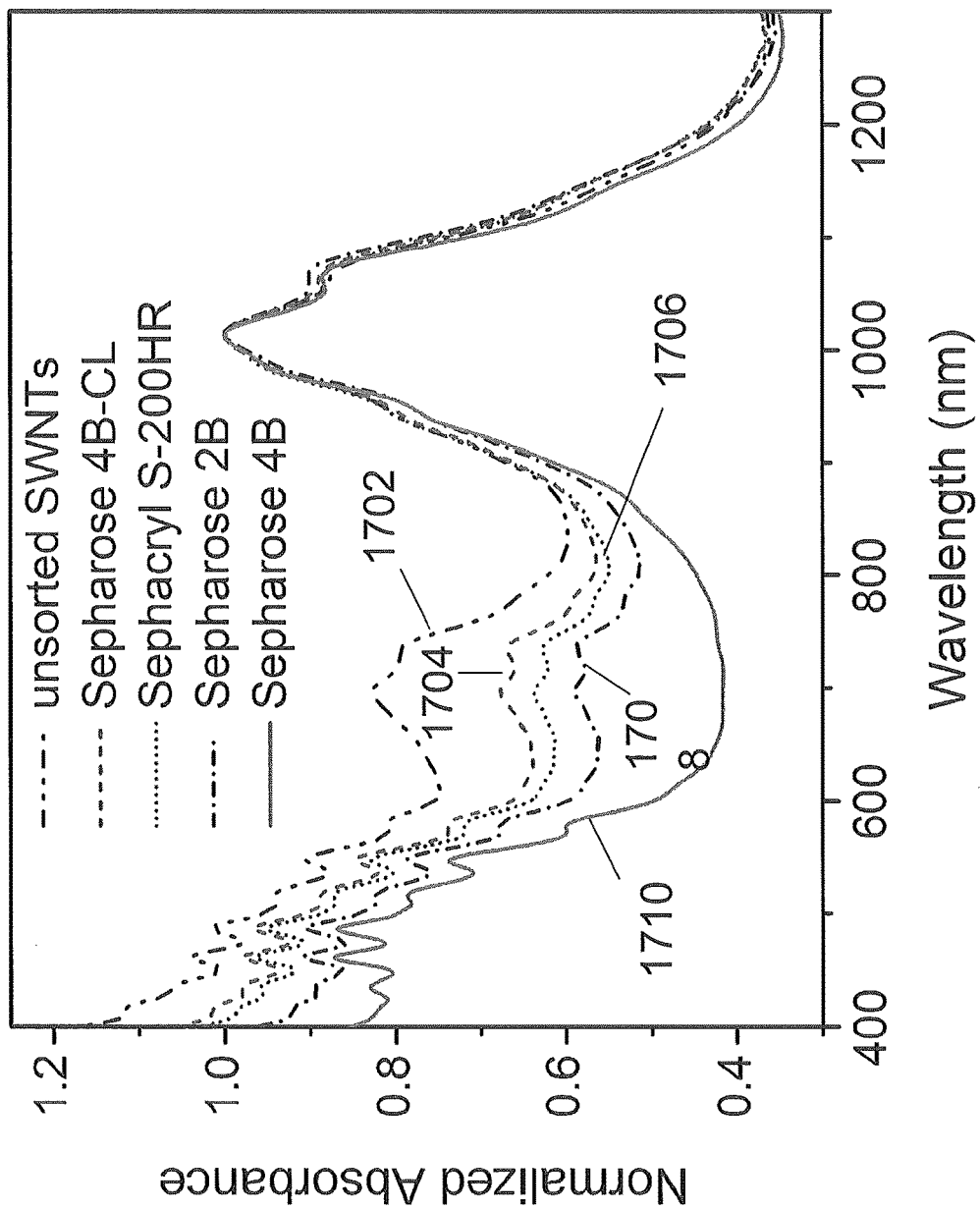
FIG. 17 is a graph of normalized absorbance (arbitrary units or a.u.) as a function of wavelength (nanometers or nm) illustrating the ultraviolet-visible-near infrared (UV-vis-NIR) of unsorted and sorted semiconducting SWNTs by Sepharose 4B-CL, Sephacryl S-200HR, Sepharose 2B and Sepharose 4B beads.

Besides congo red, other naphthalene sulfonate-containing compounds i.e. direct blue 71 and sodium 4-amino-1-naphthalenesulfonate may also used for agarose bead functionalization and effective SWNTs sorting were also obtained. Unmodified Sepharose beads and Sephacryl beads were also investigated and sorting was found to also happen at acidic conditions (pH no lower than 3). FIG. 12 is a photo 1200 illustrating the separation process in Sepharose 4B column with 2.8% Triton X-405 at acidic condition (pH=3.9). FIG. 17 is a plot 1700 of normalized absorbance against wavelength (nm) illustrating the ultraviolet-visible-near infrared (uv-vis-NIR) of unsorted P2-SWNTs and sorted semi-SWNTs via unmodified. Sepharose 4B-CL, Sephacryl S-200HR, Sepharose 2B and Sepharose 4B beads.

All the SWNTs were dispersed in 2.8% Triton X-405 and the sorting pH was 3.9. 1702 represents the data for unsorted SWNTs, 1704 represents the data of sorted semi-SWNTs via unmodified Sepharose 4B-CL, 1706 represents the data of sorted semi-SWNTs via Sephacryl S-200HR, 1708 represents the data of sorted semi-SWNTs via Sephraose 2B and 1710 represents the data of sorted semi-SWNTs via Sephrose 4B beads. 2.8% Triton X-405 solution (pH=3.9) was used in all experiments.

However, the purity of sorted SWNTs with unmodified beads was not as good as that via the sulfonate-modified beads. Pristine Sepharose beads may contain small amount of ionic sulfonate and carboxyl groups, according to the supplier's information sheet, which makes the beads also slightly negatively charged, both at neutral and acidic pH. However, with modified Sepharose-CR beads beads, the preferential interaction of metallic tubes over semi-tube with the aromatic group on naphthalene sulfonate functional groups via π-π stacking may be a contributor to the better sorting purity achieved, compared to unmodified beads. In addition, it was noticed that there was no sorting effect with the unmodified Sepharose beads when pH was lower than 3, which might be due to the greatly reduced surface negative charge on agarose beads with the protonation of carboxylic groups (in the form of pyruvic acid) at lower pH.

HiPco SWNTs with smaller diameter has been demonstrated to be successfully sorted with functionalized Sepharose beads sorting pH to be reduced to ~2. The sorting of HiPCo was performed using the same method but with the pH of the Triton X-405 solution adjusted lower (pH=1.9) due to the smaller diameter of HiPco SWNTs.

Figure 13A:
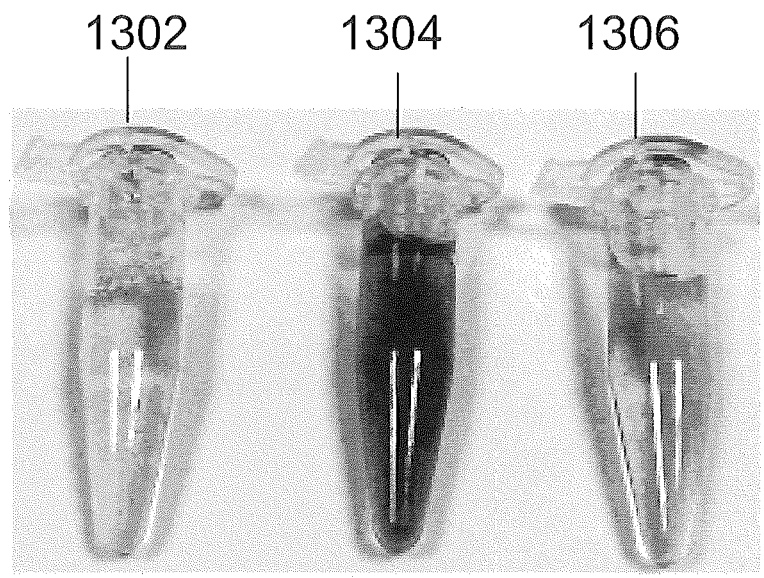
FIG. 13A is a photo illustrating the visual appearance of HiPco SWNT dispersions in aqueous solution with surfactant: sorted metallic, unsorted and sorted semiconducting.
Figure 13B:
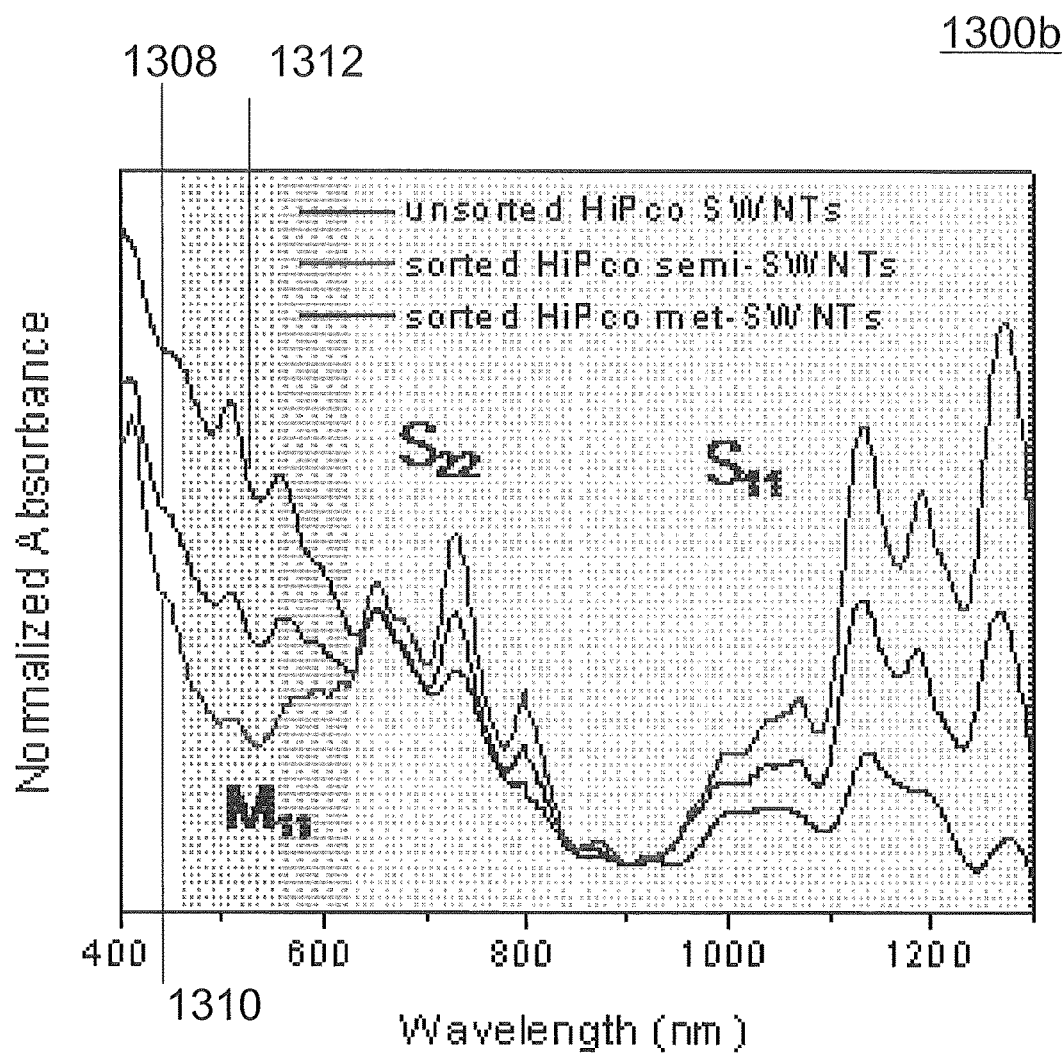
FIG. 13B is a plot of normalized absorbance (arbitrary units or a.u.) against wavelength (or nanometers or nm) illustrating the ultraviolet-visible-near infrared (UV-vis-NIR) spectra of unsorted HiPco SWNTs, sorted semiconducting and metallic SWNTs.
Figure 13C:
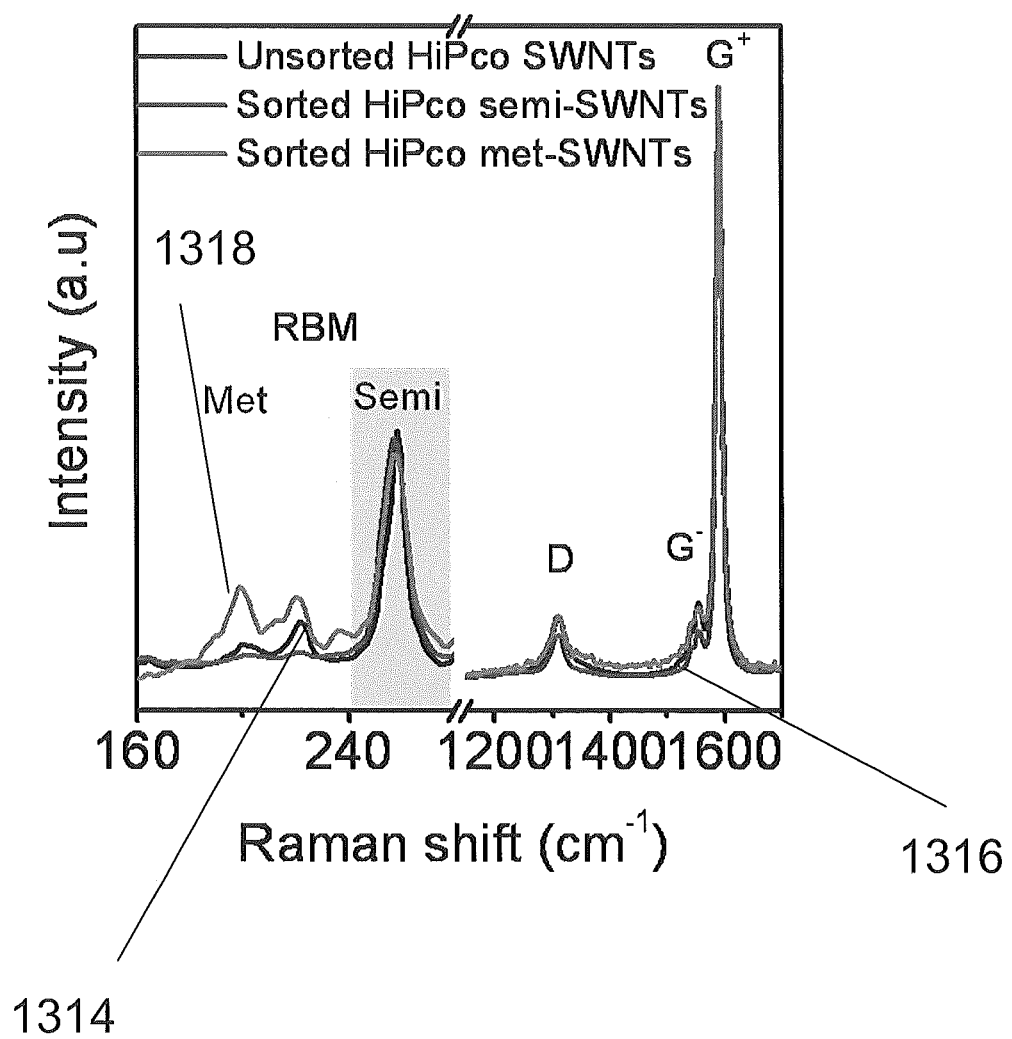
FIG. 13C is a plot of normalized intensity (arbitrary units or a.u.) against Raman shift ($cm^{-1}$) illustrating the Raman spectra (633 nm, red laser) of unsorted HiPco SWNTs, sorted semiconducting SWNTs and metallic SWNTs.

FIG. 13A is a photo 1300a illustrating the visual appearance of HiPco SWNT dispersions in aqueous solution with surfactant: sorted metallic (1302), unsorted (1304) and sorted semiconducting (1306). FIG. 13B is a plot 1300b of normalized absorbance against wavelength (nm) illustrating the ultraviolet-visible-near infrared (UV-vis-NIR) spectra of unsorted HiPco SWNTs, sorted semiconducting and metallic SWNTs. 1308 represents the data for unsorted HiPco SWNTs, 1310 represents the data for semi-SWNTs and 1312 represents the data for met-SWNTs. FIG. 13C is a plot 1300c of normalized intensity against Raman shift (cm$^{-1}$) illustrating the Raman spectra (633 nm, red laser) of unsorted HiPco SWNTs, sorted semiconducting SWNTs and metallic SWNTs. 1314 represents the data for unsorted HiPco SWNTs, 1316 represents the data for sorted semiconducting SWNTs and 1318 represents the data for sorted metallic SWNTs.

Similarly to the arc-discharge SWNTs, semi-SWNTs were eluted out first (indicated by 1306, green in colour), while met-SWNTs (indicated by 1302, pink in colour) were trapped in the column until the later elution with basic Triton X-405 solution (pH >10). UV-vis-NIR absorption clearly shows decrease of M11 relative to S11 and S22 in the sorted semiconducting fraction (indicated by 1310), and a corresponding, though less dramatic, increase in the metallic spectral features relative to semiconducting in the sorted metallic fraction (indicated by 1312). The sorting effect was further confirmed with Raman spectroscopy (633 nm). As shown in FIG. 13C, the metallic peaks (175-240 cm$^{-1}$) in RBM region almost disappear for the sorted semi-SWNTs (red curve), but increase for the sorted met-SWNTs (blue curve).

FIG. 26A is a plot 2600a of normalized absorbance (arbitrary units or a.u.) against wavelength (nm) illustrating the ultraviolet-visible-near infrared (UV-vis-NIR) spectra of unsorted CoMoCat® SWNTs, sorted CoMoCat® semiconducting SWNTs and sorted CoMoCat® metallic SWNTs. The CoMoCat® SWNTs are purchased from Sigma Aldrich. 2602 represents the data for unsorted CoMoCat® SWNTs, 2604 represents the data for semi-SWNTs and 2606 represents the data for met-SWNTs. FIG. 26B is a plot 2600b of normalized intensity against Raman shift (cm$^{-1}$) illustrating the Raman spectra (633 nm, red laser) of unsorted CoMoCat® SWNTs, sorted CoMoCat® semiconducting SWNTs and sorted CoMoCat® metallic SWNTs. 2608 represents the data for unsorted CoMoCat® SWNTs, 2610 represents the data for sorted semiconducting SWNTs and 2612 represents the data for sorted metallic SWNTs.

Similarly to the HiPco SWNTs, semi-SWNTs were eluted out first (green in colour), while met-SWNTs (pink in colour) were trapped in the column until the later elution with basic Triton X-405 solution (pH >10) or 0.5% SDBS solution. UV-vis-NIR absorption clearly shows decrease of M11 relative to S11 and S22 in the sorted semiconducting fraction (indicated by 2604), and a corresponding, though less dramatic, increase in the metallic spectral features relative to semiconducting in the sorted metallic fraction (indicated by 2606). The sorting effect was further confirmed with Raman spectroscopy (633 nm). As shown in FIG. 26B, the metallic peaks (175-240 cm$^{-1}$) in RBM region almost disappear for the sorted semi-SWNTs (indicated by 2612), but increase for the sorted met-SWNTs (indicated by 2610).

FIG. 27A is a plot 2700a of normalized absorbance (arbitrary units or a.u.) against wavelength (nm) illustrating the ultraviolet-visible-near infrared (UV-vis-NIR) spectra of unsorted Elicarb® carbon nanotubes (mixture of single-walled and double-walled carbon nanotubes), sorted Elicarb® semiconducting carbon nanotubes and sorted Elicarb® metallic carbon nanotubes. 2702 indicates data for the unsorted carbon nanotubes, 2704 indicates data for the sorted semiconducting carbon nanotubes and 2706 indicates data for the sorted metallic carbon nanotubes.

FIG. 27B is a plot 2700b of normalized intensity (arbitrary units or a.u.) against Raman shift (cm$^{-1}$) illustrating the Raman spectra (514 nm, green laser) of unsorted Elicarb® carbon nanotubes, sorted Elicarb® semiconducting carbon nanotubes and sorted Elicarb® metallic carbon nanotubes. FIG. 27B is plotted over a range of 110 cm$^{-1}$ to 300 cm$^{-1}$. 2708 indicates data for the unsorted carbon nanotubes, 2710 indicates data for the sorted semiconducting carbon nanotubes and 2712 indicates data for the sorted metallic carbon nanotubes. FIG. 27C is a plot 2700c of normalized intensity (arbitrary units or a.u.) against Raman shift (cm$^{-1}$) illustrating the Raman spectra (514 nm, green laser) of unsorted Elicarb® carbon nanotubes, sorted Elicarb® semiconducting carbon nanotubes and sorted Elicarb® metallic carbon nanotubes. FIG. 27C is plotted over a range of 1200 cm$^{-1}$ to 1650 cm$^{-1}$. 2714 indicates data for the unsorted carbon nanotubes, 2716 indicates data for the sorted semiconducting carbon nanotubes and 2718 indicates data for the sorted metallic carbon nanotubes.

FIG. 27D is a plot 2700d of normalized intensity (arbitrary units or a.u.) against Raman shift (cm$^{-1}$) illustrating the Raman spectra (633 nm, red laser) of unsorted Elicarb® carbon nanotubes, sorted Elicarb® semiconducting carbon nanotubes and sorted Elicarb® metallic carbon nanotubes. FIG. 27D is plotted over a range of 110 cm$^{-1}$ to 240 cm$^{-1}$. 2720 indicates data for the unsorted carbon nanotubes, 2722 indicates data for the sorted semiconducting carbon nanotubes and 2724 indicates data for the sorted metallic carbon nanotubes. FIG. 27E is a plot 2700e of normalized intensity (arbitrary units or a.u.) against Raman shift (cm$^{-1}$) illustrating the Raman spectra (633 nm, red laser) of unsorted Elicarb® carbon nanotubes, sorted Elicarb® semiconducting carbon nanotubes and sorted Elicarb® metallic carbon nanotubes. FIG. 27E is plotted over a range of 1200 cm$^{-1}$ to 1650 cm$^{-1}$. 2726 indicates data for the unsorted carbon nanotubes, 2728 indicates data for the sorted semiconducting carbon nanotubes and 2730 indicates data for the sorted metallic carbon nanotubes.

FIG. 27F is a plot 2700*f* of normalized intensity (arbitrary units or a.u.) against Raman shift (cm$^{-1}$) illustrating the Raman spectra (785 nm, red laser) of unsorted Elicarb® carbon nanotubes, sorted Elicarb® semiconducting carbon nanotubes and sorted Elicarb' metallic carbon nanotubes. FIG. 27F is plotted over a range of 110 cm$^{-1}$ to 300 cm$^{-1}$. 2732 indicates data for the unsorted carbon nanotubes, 2734 indicates data for the sorted semiconducting carbon nanotubes and 2736 indicates data for the sorted metallic carbon nanotubes. FIG. 27G is a plot 2700*g* of normalized intensity (arbitrary units or a.u.) against Raman shift (cm$^{-1}$) illustrating the Raman spectra (785 nm, red laser) of unsorted Elicarb® carbon nanotubes, sorted Elicarb® semiconducting carbon nanotubes and sorted Elicarb® metallic carbon nanotubes. FIG. 27F is plotted over a range of 1200 cm$^{-1}$ to 1650 cm$^{-1}$. 2738 indicates data for the unsorted carbon nanotubes, 2740 indicates data for the sorted semiconducting carbon nanotubes and 2742 indicates data for the sorted metallic carbon nanotubes.

The Elicarb nanotubes were purchased from Thomas Swan and Co. Ltd. Similarly to the arc-discharge SWNTs, semiconducting carbon nanotubes were eluted out first (grey in colour), while metallic carbon nanotubes (black in colour) were trapped in the column until the later elution with basic Triton X-405 solution (pH >10) or 0.5% SDBS solution. UV-vis-NIR absorption shows decrease of metallic peaks relative to semiconducting peaks in the sorted semiconducting fraction. The sorting effect was further confirmed with Raman spectroscopy (514 nm, 633 nm and 785 nm). As shown in FIGS. 27B-G, the metallic peaks in RBM region almost disappear for the sorted semiconducting carbon nanotubes (red curve), but increase for the sorted metallic enriched carbon nanotubes (olive curve).

This REIC method may be highly versatile and the operational parameters may be easily optimized for different carbon nanotube sources, surfactants, functionalizations and beads. With optimization of the various parameters, ultra-high purity for sorted semi-SWNTs may be achieved with just one pass through the column.

Figure 14:
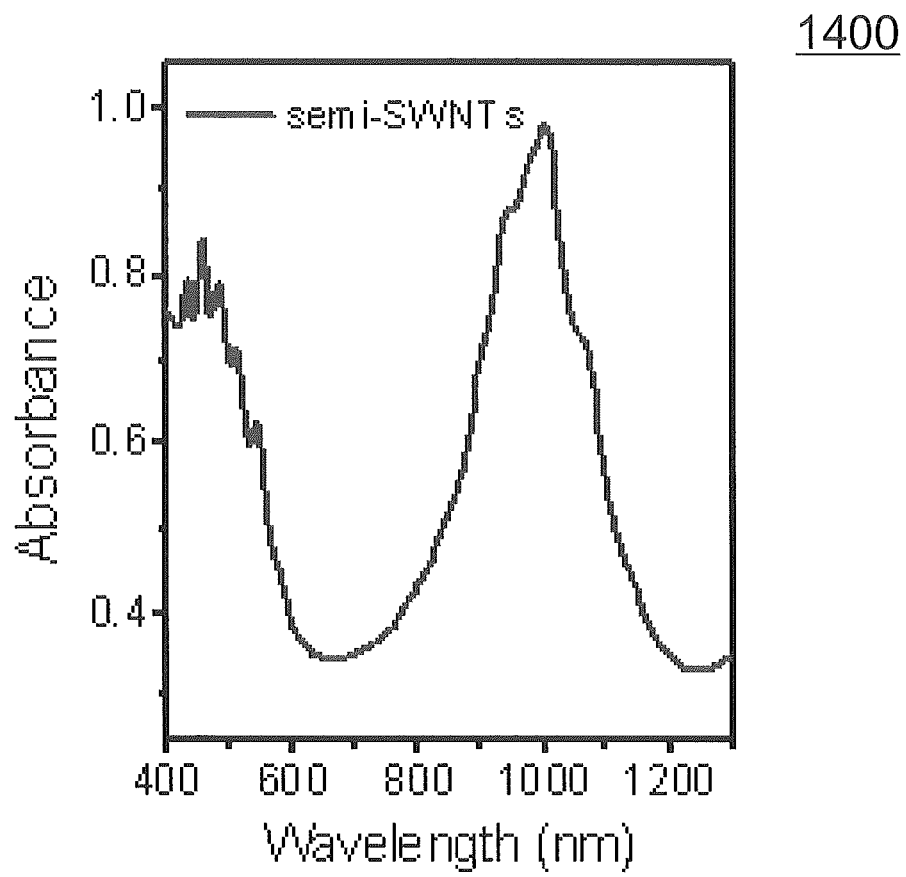
FIG. 14 is a plot of absorbance (arbitrary units or a.u.) against wavelength (nanometers or nm) illustrating the ultraviolet-visible-near infrared (UV-vis-NIR) spectrum of the as-sorted arc-discharge semi-SWNTs with purity 99.94±0.04%.

FIG. 14 is a plot 1400 of absorbance against wavelength illustrating the ultraviolet-visible-near infrared (UV-vis-NIR) spectrum of the as-sorted semi-SWNTs with a record high purity of 99.94±0.04%.

By using minimally interfering non-ionic surfactants and anionic hydrophilic functionalized agarose chromatography beads, we can exploit the slightly higher cationic charges on metallic versus semiconducting carbon nanotubes in acidic pH to sort carbon nanotubes in a facile manner to achieve record-high purity (99.94±0.04%).

To demonstrate the excellent electronic properties of our sorted semi-SWNTs, we fabricated network field effective transistors (FET) with the sorted dispersion by drop casting. Source and drain electrodes 2006*a*, 2006*b* were fabricated on Si wafer 2002 with 300 nm SiO$_2$ as dielectric layer 2004. The dispersion of sorted semi-SWNTs 2008 was carefully dropped between the source and drain electrodes 2006*a*, 2006*b* (FIG. 20A). 2010 shows an AFM image of the semi-SWNTs network between the electrodes. The length of the sorted semi-SWNTs are 0.8-1 μm. FIGS. 20B-C show the performance of typical FET devices with on/off ratio 10$^4$-10$^5$ and mobility 15-30 cm$^2$ V$^{-1}$ s$^{-1}$ (mobility computed using the coupling model mobility equations employed in our previous publications. The good on-off switching ratio confirms the high purity of the sorted semi-SWNTs.

The examples described herein illustrate a column chromatography-based technique, (which may enjoy low cost and high throughput) to realize the final physical separation of metallic/semiconducting carbon nanotubes species from solution. However, other techniques, such as selective adsorption of these differently charged nanotubes on chemical functionalized surfaces, may also be utilized to achieve high selectivity separation with the same or similar mechanism.

Figure 16A:
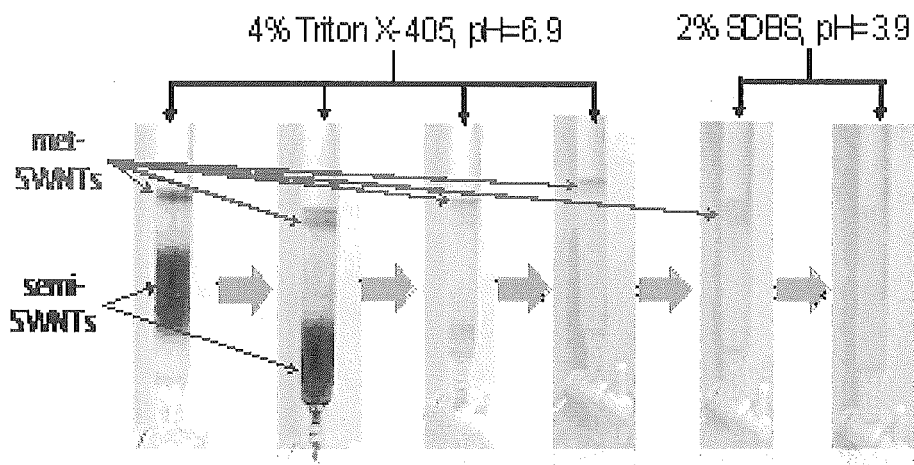
FIG. 16A are photos of the separation process in Sepharose 4B column with 2.8% Triton X-405 at neutral condition (pH=6.9).
Figure 16B:
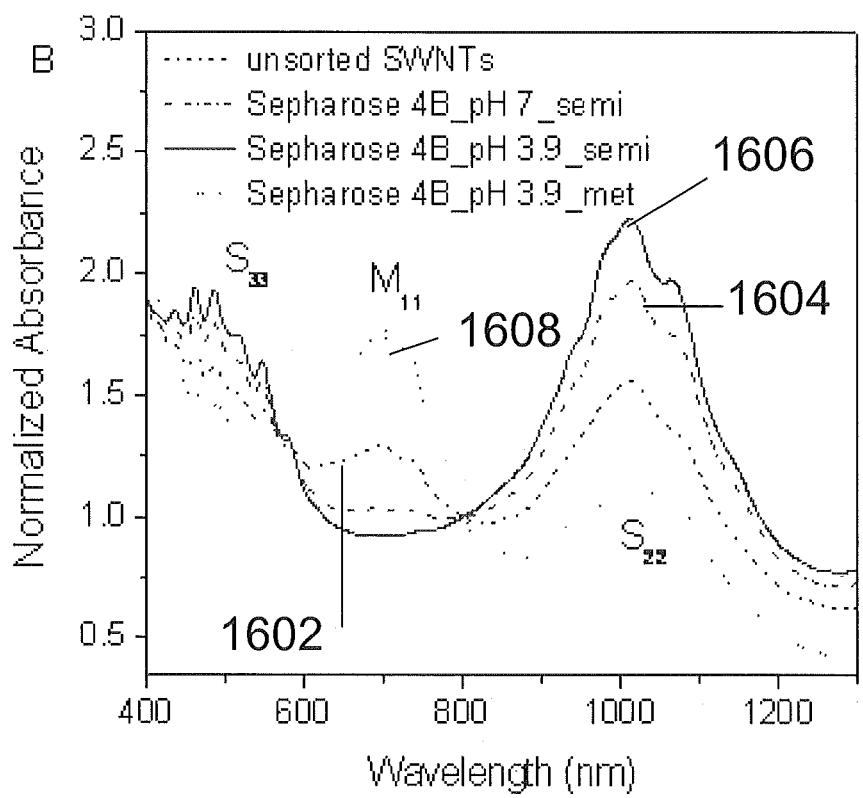
FIG. 16B is a graph of normalized absorbance (arbitrary units or a.u.) as a function of wavelength (nanometers or nm) showing the ultraviolet-visible-near infrared (UV-vis-NIR) spectra of unsorted, sorted semi-SWNTs at neutral pH, sorted semi-SWNTs at acidic pH and sorted met-SWNTs at acidic pH.

FIG. 16A are photos 1600*a* of the separation process in Sepharose 4B column with 2.8% Triton X-405 at neutral condition (pH=6.9). FIG. 16B is a graph 1600*b* showing the ultraviolet-visible-near infrared (UV-vis-NIR) spectra of unsorted (short dash 1602), sorted semi-SWNTs at neutral pH (short dash dot 1604), sorted semi-SWNTs at acidic pH (solid line 1606) and sorted met-SWNTs at acidic pH (short dot 1608). 1602 indicates the ultraviolet-visible-near infrared (UV-vis-NIR) spectra of unsorted SWNTs, 1604 indicates the ultraviolet-visible-near infrared (UV-vis-NIR) spectra of sorted semi-SWNTs at neutral pH, 1606 indicates the ultraviolet-visible-near infrared (UV-vis-NIR) spectra of sorted semi-SWNTs at acidic pH, and 1608 indicates the ultraviolet-visible-near infrared (UV-vis-NIR) spectra of sorted met-SWNTs.

Figure 18:
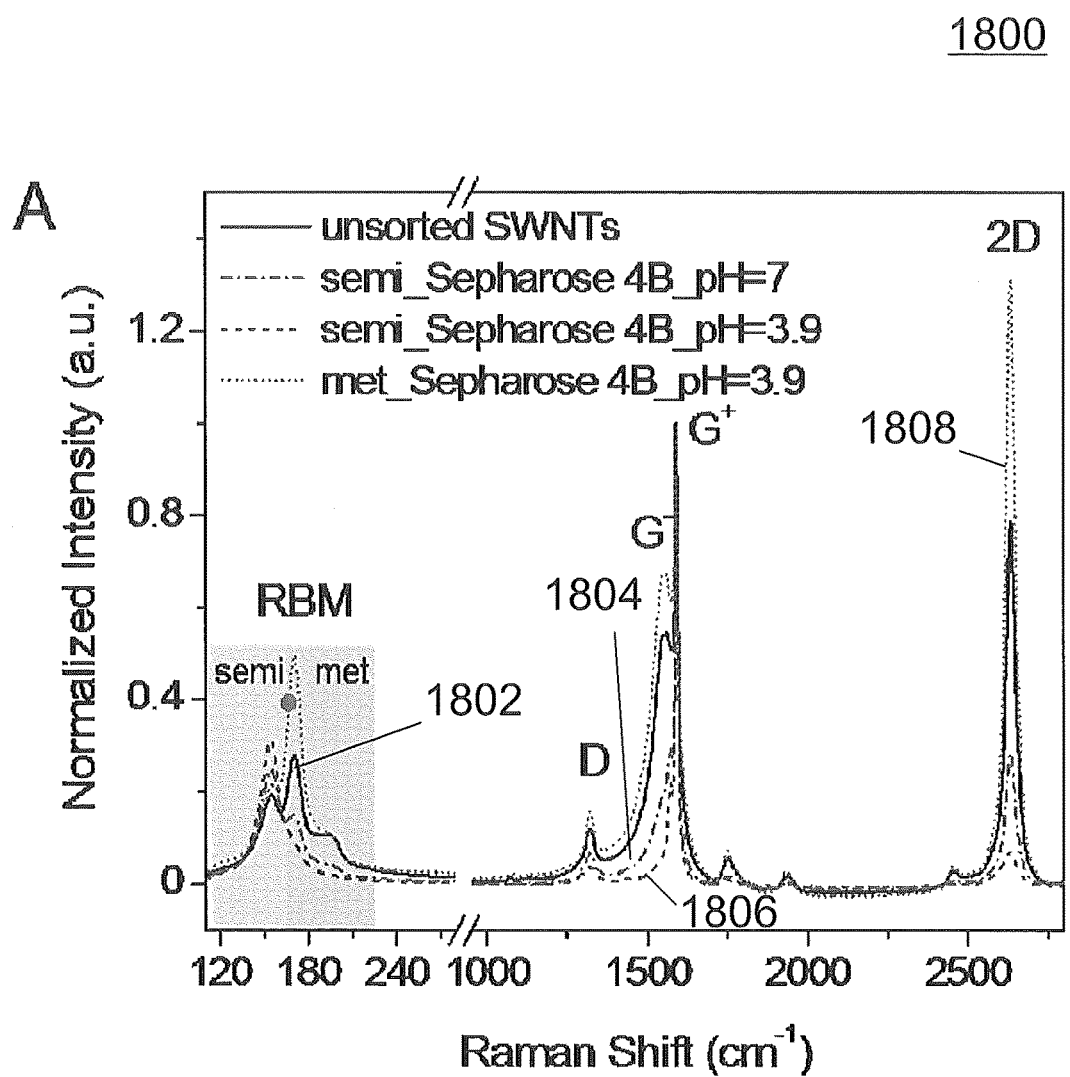
FIG. 18 is a graph of normalized intensity (arbitrary units or a.u.) as a function of the raman shift ($cm^{-1}$) showing the Raman spectra (633 nm, red laser) of unsorted arc-discharge SWNTs, sorted arc-discharge semi-SWNTs at neutral pH, sorted arc-discharge semi-SWNTs at acidic pH and sorted arc-discharge met-SWNTs at acidic pH via un-functionalized Sepharose 4B beads.

FIG. 18 is a graph 1800 showing the Raman spectra (633 nm, red laser) of unsorted arc-discharge SWNTs (solid line 1802), sorted arc-discharge semi-SWNTs at neutral pH (short dash dot 1804), sorted arc-discharge semi-SWNTs at acidic pH (short dash 1806) and sorted arc-discharge met-SWNTs at acidic pH (short dot 1808) via un-functionalized Sepharose 4B beads. 1802 indicates the Raman spectra for unsorted SWNTs, 1804 indicates the Raman spectra for sorted-SWNTs at neutral pH, 1806 indicates the Raman spectra for sorted semi-SWNTs at acidic pH and 1808 indicates the Raman spectra for sorted met-SWNTs at acidic pH.

Figure 19A:
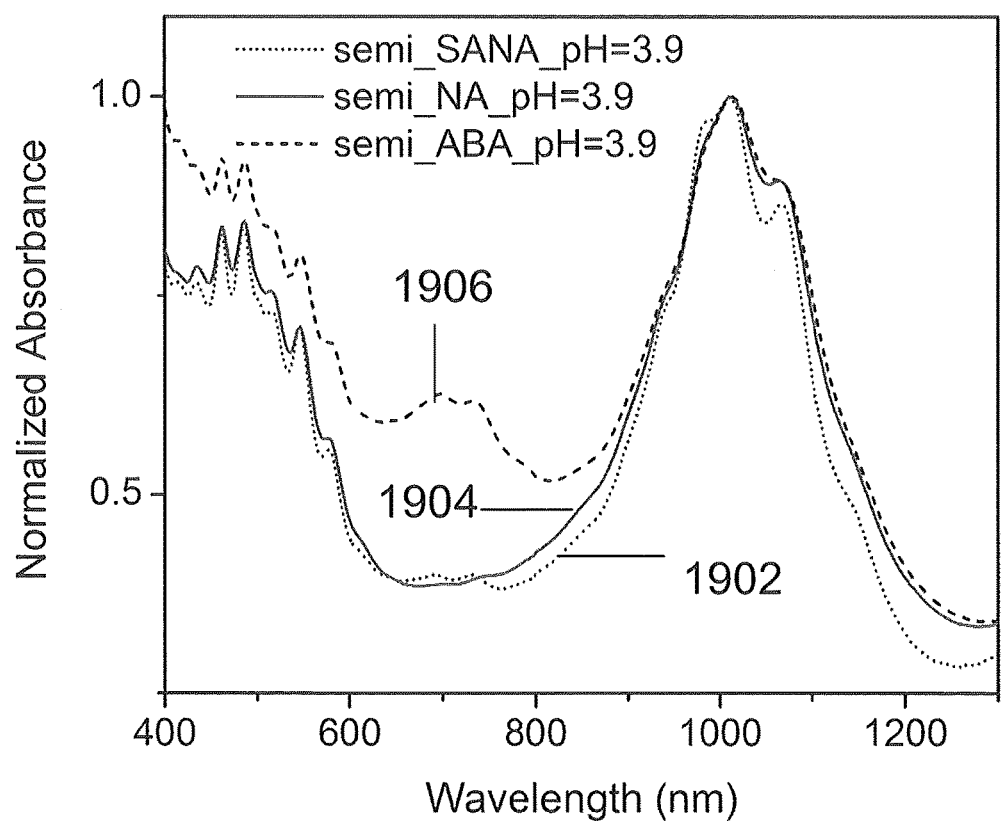
FIG. 19A is a graph of normalized absorbance (arbitrary units or a.u.) as a function of wavelength (nanometers or nm) showing the ultraviolet-visible-near infrared (UV-vis-NIR) spectra of semi-SWNTs sorted by sodium 4-amino-1-naphthalenesulfonate (SANS), 1-naphylamine (NA) and 4-aminobutyric acid (ABA) functionalized beads.
Figure 19B:
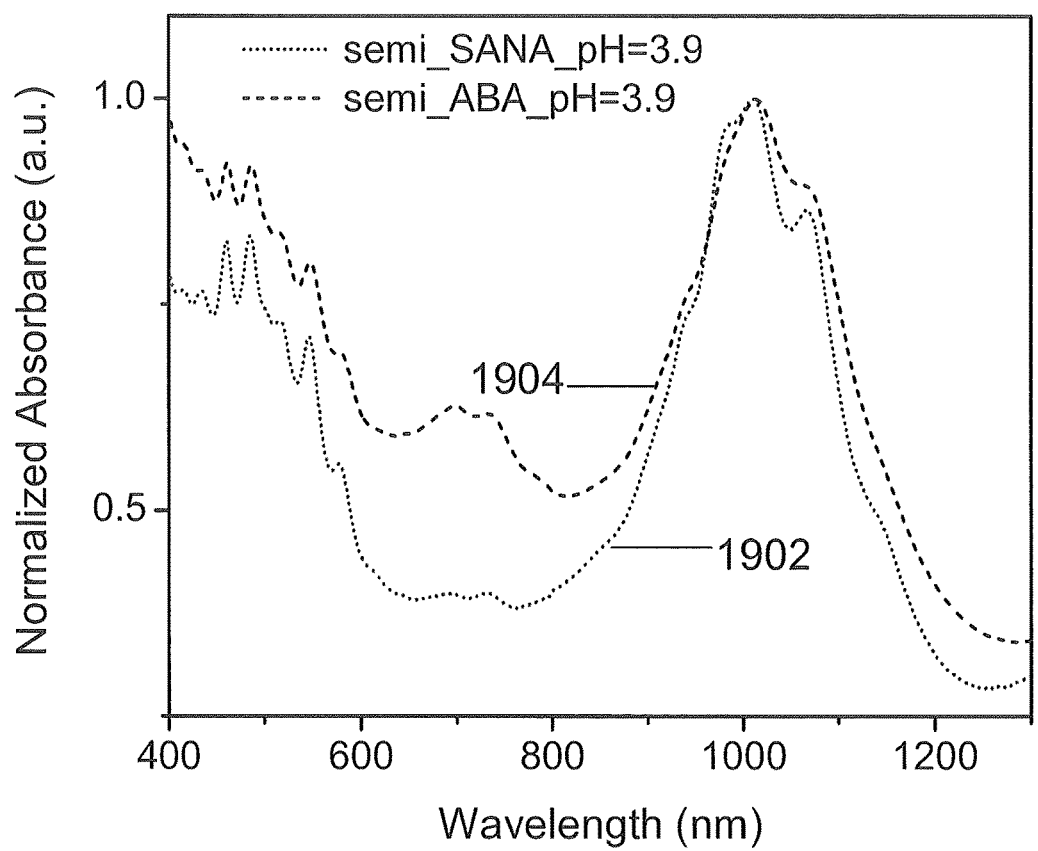
FIG. 19B is a graph of normalized absorbance (arbitrary units or a.u.) plotted as a function of wavelength (nanometers or nm) showing a magnified portion showing the ultraviolet-visible-near infrared (UV-vis-NIR) spectra of semi-SWNTs sorted by sodium 4-amino1-naphthalenesulfonate (SANS) and 1-naphylamine (NA).

FIG. 19A is a graph 1900*a* of normalized absorbance (arbitrary units or a.u.) plotted as a function of wavelength (nm) showing the ultraviolet-visible-near infrared (UV-vis-NIR) spectra of semi-SWNTs sorted by sodium 4-amino-1-naphthalenesulfonate (SANS) (short dot 1902), 1-naphylamine (NA) (solid line 1904) and 4-aminobutyric acid (ABA) (short dash 1906) functionalized beads. 1902 indicates the results for SANS functionalized beads, 2204 indicates the results for NA functionalized beads and 1906 indicates the results for ABA functionalized beads. FIG. 19B is a graph 1900*b* of normalized absorbance (arbitrary units or a.u.) plotted as a function of wavelength (nm) showing a magnified portion showing the ultraviolet-visible-near infrared (UV-vis-NIR) spectra of semi-SWNTs sorted by sodium 4-amino-1-naphthalenesulfonate (SANS) (short dot 1902) and 1-naphylamine (NA) (solid line 1904).

Figure 20A:
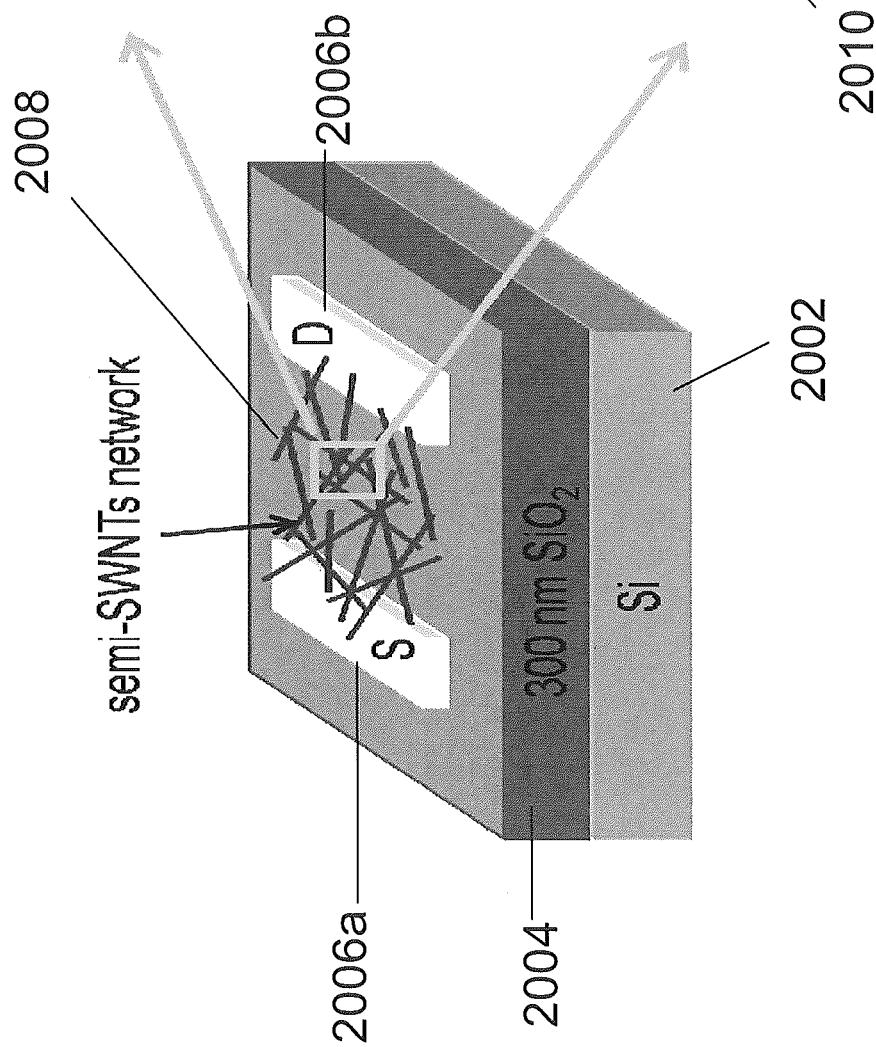
FIG. 20A is a schematic of a network field effect transistor according to various embodiments.
Figure 20B:
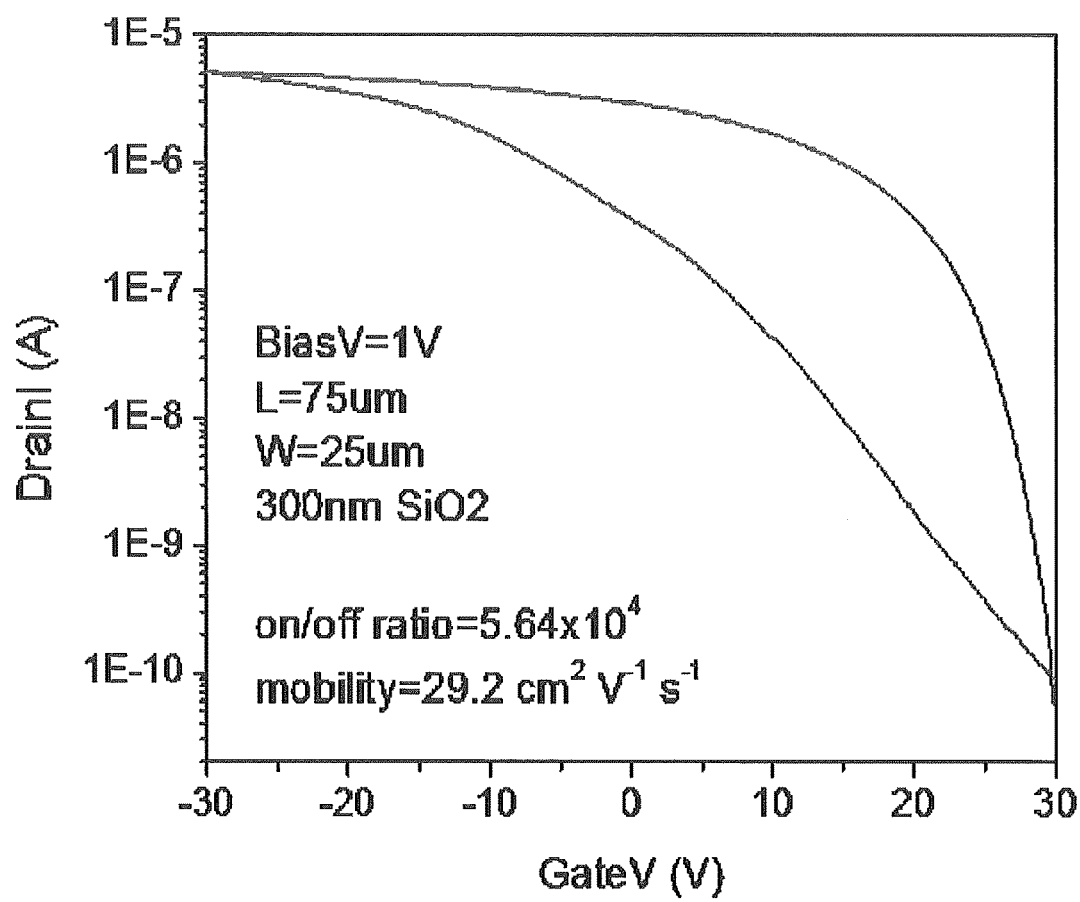
FIG. 20B is a graph of drain current (I, in amperes or A) against gate voltage (V, in volts or V) illustrating performance of a first device.
Figure 20C:
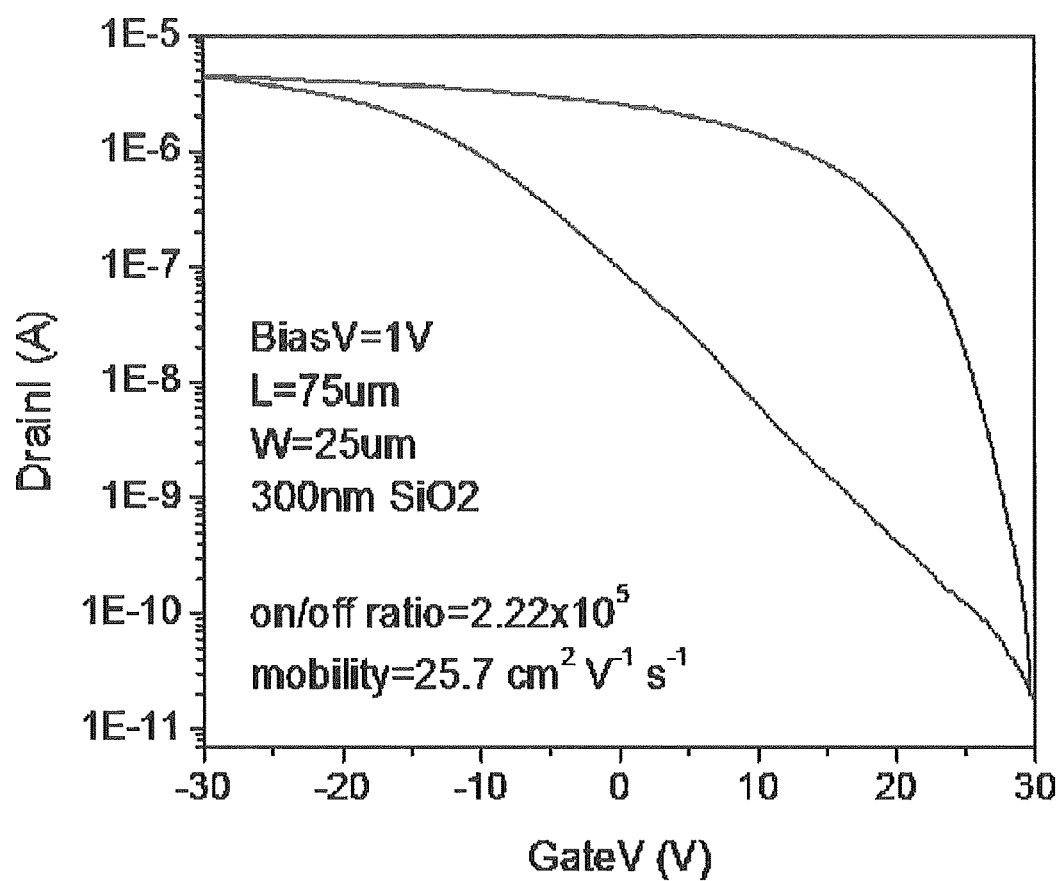
FIG. 20C is a graph of drain current (I, in amperes or A) against gate voltage (V, in volts or V) illustrating performance of a second device.

FIG. 20A is a schematic 2000*a* of a network field effect transistor according to various embodiments. The transistor may include a silicon substrate 2002, a silicon oxide layer 2004 on the silicon substrate, source 2006*a* and drain 2006*b* electrodes on the silicon oxide layer 2004 and a network 2008 including interconnected semi-SWNTs connecting electrodes 2006*a*, 2006*b*. 2010 shows an atomic force microscopy (AFM) image of the semi-SWNTs network 2008 between source electrode 2006*a* and drain electrode 2006*b*.

FIG. 20B is a graph 2000b of drain current (I) against gate voltage (V) illustrating performance of a first device. FIG. 20C is a graph 2000c of drain current (I) against gate voltage (V) illustrating performance of a second device.

Figure 21:
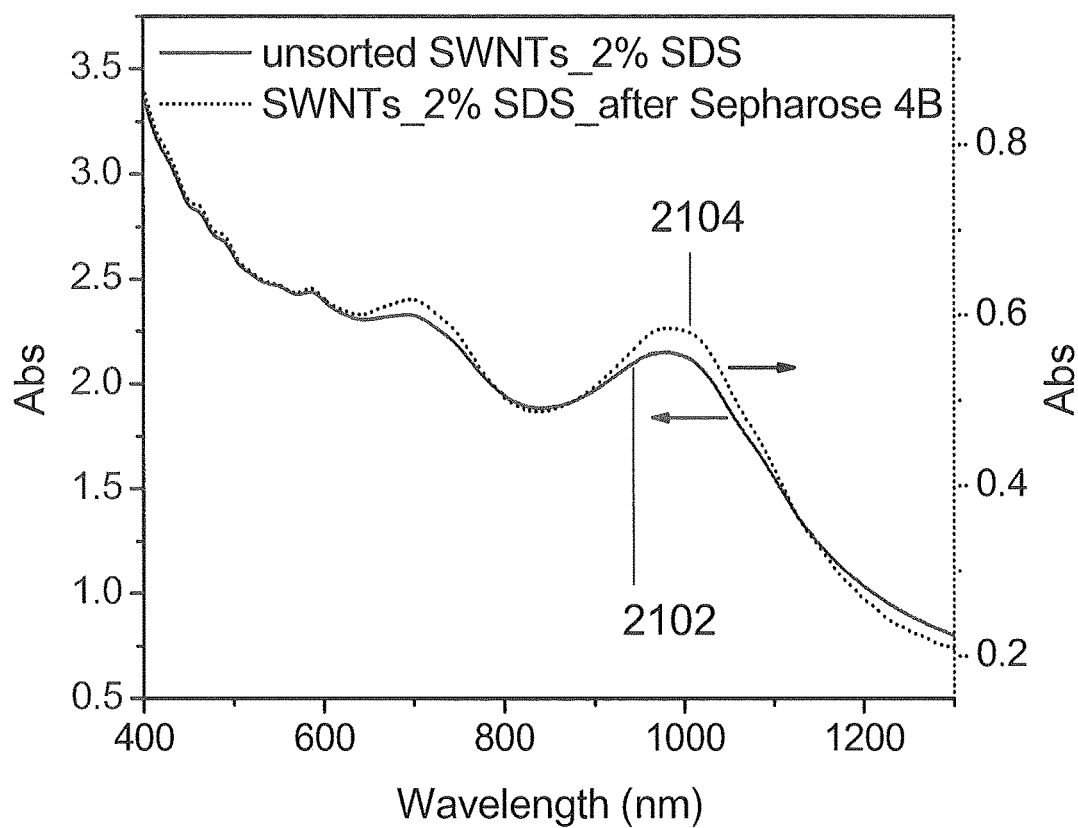
FIG. 21 is a graph of normalized absorbance (in arbitrary units or a.u.) as a function of wavelength (nanometers or nm) showing the ultraviolet-visible-near infrared (UV-vis-NIR)

FIG. 21 is a graph 2100 showing the ultraviolet-visible-near infrared (UV-vis-NIR) spectra of unsorted SWNTs dispersed in 2% sodium dodecyl sulphate (SDS) before (solid line 2102) and after (short dot 2104) passing through Sepharose 4B column.

FIG. 22 is a graph 2200 showing the ultraviolet-visible-near infrared (UV-vis-NIR) spectra of unsorted SWNTs dispersed in 2% sodium dodecyl sulphate SDS (short dash dot 2202), 2.8% Triton X-405 (short dash 2204), 1% sodium cholate SC (short dot 2206) and 1% cetyltrimethylammonium bromide CTAB (solid line 2208).

FIG. 23A is a graph 2300a showing the ultraviolet-visible-near infrared (UV-vis-NIR) spectra of unsorted single-walled nanotubes (SWNTs) dispersed in 1% sodium cholate SC before (solid line 2302) and after (short dot 2304) passing through Sepharose 4B column. The unsorted SWNTs dispersion was diluted by 3 times before UV-vis-NIR measurement. FIG. 23B is a graph 2300b showing the ultraviolet-visible-near infrared (UV-vis-NIR) spectra of unsorted single-walled nanotubes (SWNTs) dispersed in 1% CTAB before (solid line 2306) and after (short dot 2308) passing through Sepharose 4B column.

FIG. 24 is a graph 2400 showing the ultraviolet-visible-near infrared (UV-vis-NIR) spectra of unsorted (short dot 2402), sorted semiconducting (short dash 2404) and metallic (solid line 2406) SWNTs with 5% Brij S100 as surfactant (Sepharose 4B column).

Since the separation of arc-discharge SWNTs in agarose gel has never been reported, while there are many such reports for HiPco and CoMoCat SWNTs, we deduced that the agarose-based chromatography method with SDS might not work on the larger diameter SWNTs. To verify the assumption, arc-discharge SWNTs (P2-SWNTs, Carbon Solutions) were dispersed in 2% SDS aqueous solution in a concentration of 1 mg/mL using a probe sonicator. The solution was then centrifuged at 122000 g for 1 h to remove the larger bundles. The supernatant was then loaded into a column packed with 10 mL Sepharose 4B (4% agarose content) beads. The column was pre-flushed with 2% SDS solution before sample loading. Unsurprisingly, the column showed no separation of the SWNTs. The SWNTs solution simply passed through the column without any color change and the UV-vis-NIR spectra also showed that the curves of SWNTs solution before and after column were nearly identical, except for the intensity of absorbance (FIG. 21). We believe that the lack of separation is due to the poor dispersibility of arc-discharge SWNTs when using SDS as surfactant. After probe-sonication and centrifugation, the SWNTs are still bundled. Since one of the key issues for separation is that the SWNTs must be individually dispersed, the predominantly (small-) bundled state of the SWNTs in these experiments prevents significant separation.

We tested several other surfactants which have been reported as good dispersants for large diameter SWNTs, including sodium cholate (SC), cetyl trimethylammonium bromide (CTAB) and Triton X-405. SWNTs were dispersed in aqueous solution of different surfactants (1% SC, 1% CTAB, and 2.8% Triton X-405) at the concentration of 1 mg/mL under the same sonication and centrifuge conditions as in the above SDS solution experiments, and the supernatant was carefully extracted for the chromatography sorting. The UV-vis-NIR spectra with SC, CTAB and Triton X-405 show better resolution of the SWNT peaks, compared to that with SDS (FIG. 22), which indicates the excellent individual dispersion of SWNTs in the above mentioned solutions. New columns were packed with 10 mL Sepharose 4B beads, and the SWNTs supernatant with different surfactants was loaded into the fresh columns. The columns were pre-flushed by 2 column volumes of the surfactant solution before sample loading. When the SWNTs solution fully entered into the column, more surfactant solution was added into the column to elute the SWNTs. For SC- and CTAB-dispersed SWNTs, the phenomena observed are similar to those with SDS. The SWNTs solution simply passed through the columns without any visible color change. UV-vis-NIR spectra also shows no separation (FIGS. 23A-B). However, for the Triton X-405 dispersed SWNTs, when the black band of SWNTs solution permeated into the column, almost immediately, the black band split into a red band which kept moving down and a dark band which stayed on the top part of the column. After several minutes, as the red band moved progressing further down the column, several bands could be observed: a first red band (semiconducting fraction) which moved fastest, a second light grey band (mixture of semiconducting and metallic SWNTs), a third green band (metallic fraction) which moved slowly, and a final green band (metallic fraction) which remained at the top of the column and couldn't be eluted by Triton X-405 solution (FIG. 16A). The red band was collected and the purity was characterized by UV-vis-NIR spectroscopy (FIG. 16A). The spectrum of unsorted SWNTs show two optical transition peaks of semi-SWNTs—S33 (400-600 nm) and S22 (850-1200 nm)—and one optical transition peak for met-SWNTs—M11 (600-800 nm). The purity of the SWNTs is indicated by relative areas of the M11 and S22 peaks. For the red band fraction, the M11 peak was dramatically reduced, and the semiconducting SWNT purity was calculated to be ~99.2%. However, the third band (green, presumed to be a metallic-dominated fraction) disappeared gradually as it moved down the column and we were not able to collect this band by visual observation. And the top, stationary, green band was not elutable by 2.8% Triton X-405 solution even when flushed with a large volume of solution. Then 2% SDBS aqueous solution (pH=3.9) was added into the column. The top green band was brought down by the SDBS solution. Unfortunately, again the band dissipated during the elution process and became un-observable (FIG. 16A, top).

We performed the separation process again with the same procedure but the 2.8% Triton X-405 solution was adjusted to acidic pH with 0.1 M HCl. The SWNTs were first dispersed in acidic 2.8% Triton X-405 solution (pH=3.9), followed by 122000 g centrifugation for 1 h. The supernatant was added into the Sepharose 4B column pre-flushed with acidic Triton X-405 solution. In acidic condition, three bands were observed as the SWNTs passed through the column: a first red band (semiconducting fraction), a middle light grey band (mixture of semi- and met-SWNTs), and the last green band (metallic fraction) which stayed in the top part of the column (FIG. 16A, bottom). We noticed that the top green band was much thicker in acidic condition than in neutral condition. And when flushed with 2% SDBS (pH 3.9) solution, the green band was eluted with the band shape maintained. The UV-vis-NIR spectra of the red semiconducting fraction shows that the M11 peak has almost totally disappeared while the S22 and S22 peaks are clear and strong (FIG. 16B). Due to the difficulty of measuring an accurate area for the almost absent M11 peak, a precise measure of the purity of the semi-SWNTs is hard to quantify; we can, however infer a definite lower bound to the purity of >99.2%. For the green metallic fraction, the S22 and S33 peaks weakened substantially relative to the strong M11 peak (FIG. 16B). The purity the green metallic fraction was calculated to be 47.2%.

It is interesting that the fraction adsorbed on the beads in our experiments is the metallic fraction, while it is semi-SWNTs that are trapped in the column in all the previous studies with SDS as surfactant. It seems that the non-ionic surfactant is the key point to reverse the interaction of semiconducting and metallic SWNTs with the agarose beads. To verify this assumption, another non-ionic surfactant, Brij S100, which has also been reported to be a good surfactant for arc-discharge SWNTs was used for the chromatography separation. As expected, color bands showed as the SWNTs solution passed through the column. The red SWNTs band passed through the column while the green band remained in it. Fractions of semi-SWNTs with >98% purity and metallic ~40% were obtained; the UV-vis-NIR spectra are shown in FIG. 24.

Other types of gel-based beads were also tested, including Sepharose 2B (2% agarose content), Sepharose 4B-CL (cross-linked agarose), and Sephacryl S-200 (allyl dextran and N, N'-methylenebisacrylamide). The results show that all these gel-based beads have separation effect with Triton X-405 (FIG. 17), while Sepharose 4B gives the best purity. This could be attributed to the higher agarose content in Separose 4B compared to Sepharose 2B, which results in stronger interaction between the SWNTs and the gel. For Sepharose 4B-CL, the flow rate of the SWNTs solution is faster because the cross-linked beads are more rigid. Therefore the separation is also not as good as with Sepharose 4B due to the reduced interaction between SWNTs and the beads entailed by the higher flow rate. Sephacryl S-200HR has been reported to work very well for arc-discharge SWNTs sorting with SDS as surfactant. Here we show that it also works well with Triton X-405, only the resolution is not as high as Sepharose 4B under our experimental conditions.

Figure 15B:
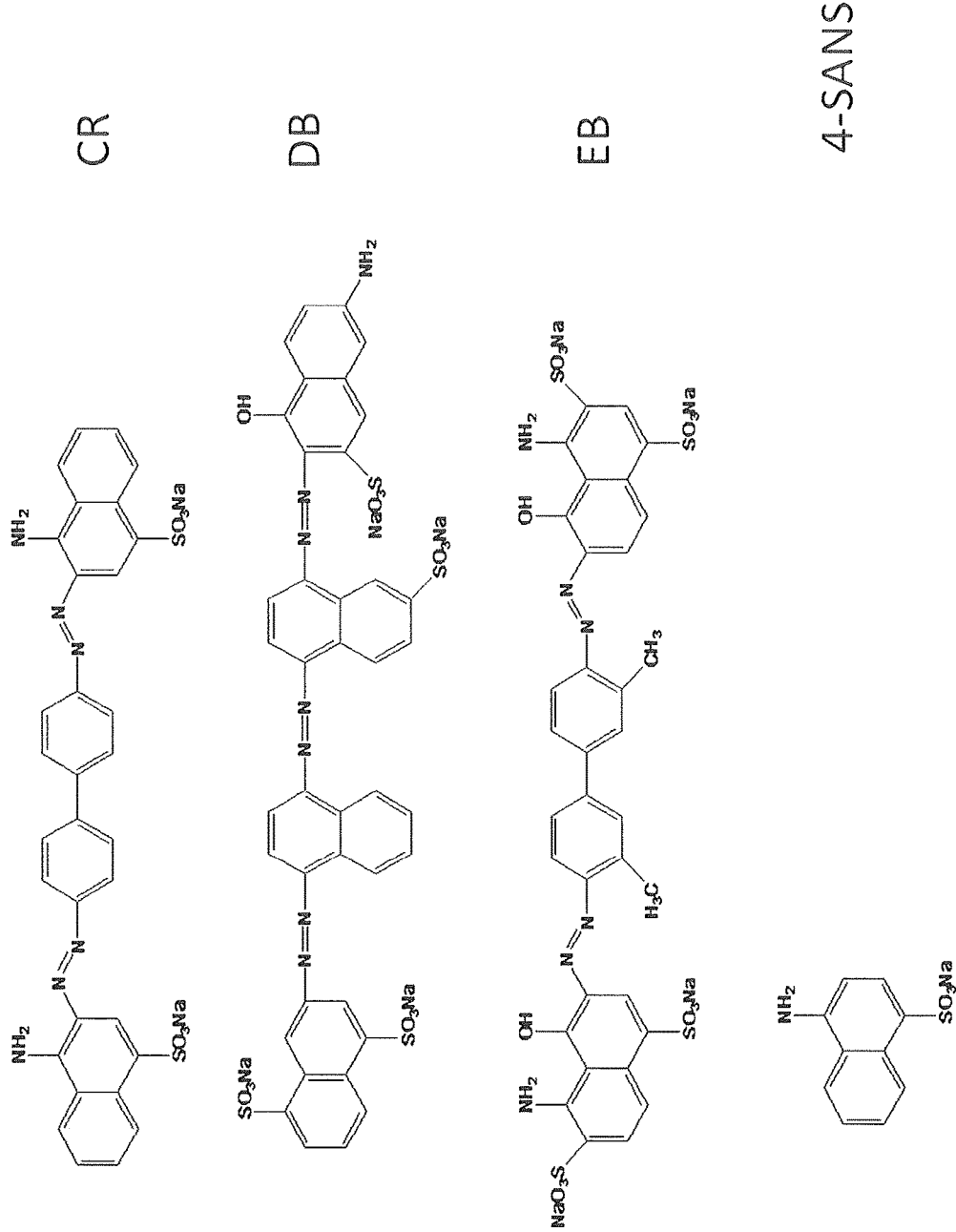
FIG. 15B is a table represents the different chemicals containing the functional groups (direct blue 71 (DB), congo red (CR), evans blue (EB), sodium 4-amino-1-naphthalenesulfonate (4-SANS).
Figure 15C:
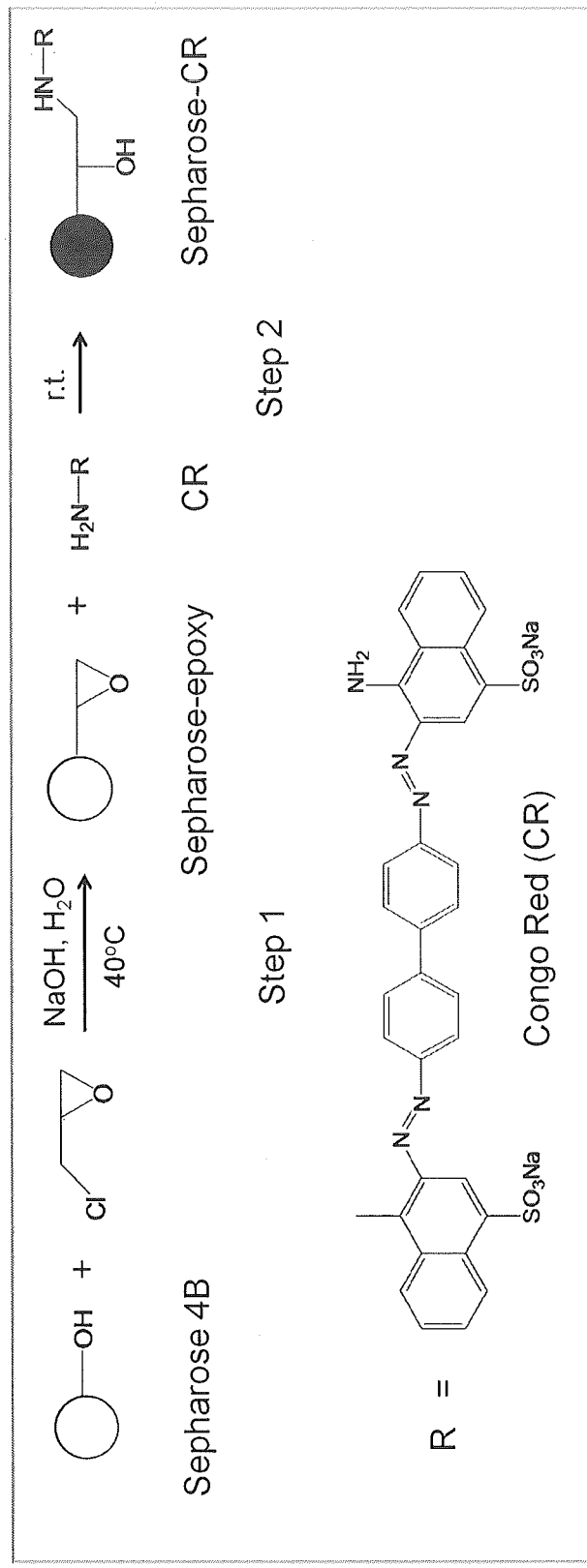
FIG. 15C is a schematic illustrating the functionalization of Sepharose 4B beads by activating with epoxy (in step 1) and functionalization with Congo Red (in step 2).

FIG. 15A is a schematic 1500a illustrating the functionalization of Sepharose 4B beads by activating with epoxy (in step 1) and functionalization of negatively-charged chemicals (in step 2). FIG. 15B is a table 1500b represents the different chemicals containing the functional groups (direct blue 71 (DB), congo red (CR), evans blue (EB), sodium 4-amino-1-napthalenesulfonate (SANS). The sulfonate-functionalized Sephrose 4B beads were prepared by activating Sepharose with epichlorohydrin under basic condition (FIG. 15A, step 1), followed by a ring-opening reaction of the epoxide groups with amine groups of the aminonaphthalene-containing chemicals (FIG. 15A, step 2). Before step 1, the pH of the beads suspension was ~13. After the first step, the pH reduced to ~8 due to the neutralization of NaOH by the HCl released during the epoxy-activating reaction. In the cases of azo-dyes, the color of the beads turned to the same color as the dyes after step 2. The functionalized beads were washed thoroughly with 20% ethanol and D.I. water after reaction to remove the excess chemicals. FIG. 15C is a schematic 1500c illustrating the functionalization of Sepharose 4B beads by activating with epoxy (in step 1) and functionalization with Congo Red (in step 2).

The results of chromatography sorting with CR-functionalized (Sepharose-CR) beads are shown in FIG. 25A. UV-vis-NIR spectra show that the M11 peaks become almost undetectably weak in the semiconducting fraction after one-pass sorting, and the absorption curve is flat in this region because of the near-zero metallic absorption. Meanwhile, the semiconducting peaks (both S33 and S22) are dramatically reduced relative to M11 in the metallic fraction after one-pass sorting (FIG. 25A). And the SWNTs dispersions show better pink (semiconducting) and green (metallic) colors compare to those sorted via the un-functionalized beads, which implies improvement in purity Another indication of the purity improvement is that the absorption baseline in the metallic region is lower in the CR-functionalized semi-SWNTs sample than in the un-functionalized sample (both curves were normalized by setting the highest absorption of S22 to be 1).

Raman spectroscopy was also used to further evaluate the purity of sorted semiconducting and metallic SWNTs. A red laser with 1.96 eV excitation energy (633 nm) was used as it can probe both semiconducting and metallic arc-discharge SWNTs. The Raman spectra of unsorted and sorted SWNTs with un-functionalized Sepharose 4B are shown in FIG. 18F. The spectrum of unsorted SWNTs shows both semiconducting (~155 $cm^{-1}$) and metallic (~171 $cm^{-1}$ and ~196 $cm^{-1}$) peaks in RBM region. After sorting at pH=7, the metallic peaks at ~196 $cm^{-1}$ becomes much smaller, while it almost disappears in sorted semi-SWNTs samples at pH=3.9. Meanwhile, the semiconducting peak (~155 $cm^{-1}$) also decreases in the sorted met-SWNTs samples (pH=3.9). Moreover, $G^-$ band (~1569 $cm^{-1}$) of the sorted semi-SWNTs become much narrower because of the greatly reduced metallic SWNTs content, while the $G^-$ peak of sorted met-SWNTs is much broader and even higher than the $G^+$ peak, which implies the dominant content of metallic tubes. The $G^+$ peak of sorted semi-SWNTs at acidic pH is even narrower than that at neutral pH, which agrees well with the changes in RBM region and the purity. In addition, we note that the intensity of the 2D band (~2634 $cm^{-1}$) increases dramatically for sorted met-SWNTs, becoming much higher than the G band, while it decreased greatly for the sorted semi-SWNTs. The purer the semi-SWNTs, the lower the 2D peak, vice versa. Although the intensity of 2D peak has not previously been used as a criterion to for enrichment of semiconducting or metallic SWNTs, the Raman spectra shows that the 2D peak intensity obviously changes between highly purified metallic and semiconducting SWNTs. Similar results have been found in previously reported study of NanoIntegris 99% purity semiconducting and metallic SWNTs. With the corresponding of the ultra-high purity of semi-SWNTs (>99.2%) and higher purity of met-SWNTs (90%), the metallic peaks totally disappear in the RBM region, and the semiconducting peak vanishes as well. For the 90% met-SWNTs sample, the $G^-$ peak is much higher than $G^+$ peak, which strongly supports the high proportion of metallic SWNTs.

Sepharose 4B beads were functionalized with 4-aminobutyric acid (ABA) as well. FIG. 19B shows that the purity of semi-SWNTs sorted with 4-aminobutyric acid functionalized beads is much lower than that with Sepharose-SANS. 1902 indicates the results for SANS functionalized beads and 1904 indicates the results for ABA functionalized beads. We have found that arc-discharge SWNTs cannot be separated by electronic type in Sepharose columns using SDS surfactant. However, separation in Sepharose gel can be achieved by using non-ionic surfactants, e.g., Triton X-405, Brij L23 and Brij S100, and further improved by adjusting the pH to acidic. We have demonstrated a simple, fast, cost-effective and scalable solution-based process to sort semiconducting and metallic SWNTs in massive scale via column chromatography. FIG. 25A is a graph illustrating the ultraviolet-visible-near infrared (UV-vis-NIR) spectra of unsorted SWNTs (2502), semiconducting SWNTs (2504), and metallic SWNTs (2506) sorted by Sepharose-CR beads. FIG. 25B is a graph illustrating the Raman spectra (633 nm, red laser) of unsorted arc-discharge SWNTs (2508), semiconducting SWNTs (2510) and metallic SWNTs (2512) sorted by Sepharose-CR beads.

Methods described herein may further contain analogous features of any structure or conductive paper described herein. Correspondingly, structures or conductive papers described herein may further contain analogous features of any methods described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for separating semiconducting carbon nanotubes from metallic carbon nanotubes, the method comprising the steps of:
   (a) dispersing a mixture of the semiconducting carbon nanotubes and the metallic carbon nanotubes in a starting dispersing agent having a pH of 7 or less to form a carbon nanotube dispersion;
   (b) passing the carbon nanotube dispersion over a negatively charged material, wherein the carbon nanotube dispersion comprises a mixture of the semiconducting carbon nanotubes and the metallic carbon nanotubes;
   (c) passing an eluent solution through the negatively charged material after (b), wherein the eluent solution comprises a first dispersing agent without a net charge; and
   (d) collecting an eluate enriched with semiconducting carbon nanotubes.

2. The method according to claim 1, wherein the first dispersing agent has a pH of 7 or less.

3. The method of claim 1, wherein the negatively charged material is modified with congo red, direct blue 71, or amino naphthalene sulfonate salts.

4. The method according to claim 1, wherein the starting dispersing agent is a solution of a surfactant without a net charge or a polymer without a net charge.

5. The method according to claim 4, wherein the solution of the surfactant without the net charge is a non-ionic surfactant solution or a zwitterionic solution.

6. The method according to claim 1, wherein the first dispersing agent is a solution of a surfactant without a net charge or a polymer without a net charge.

7. The method according to claim 6, wherein the solution of the surfactant without the net charge is a non-ionic surfactant solution or a zwitterionic solution.

8. The method of claim 1, wherein the negatively charged material comprises chromatography beads.

9. The method of claim 8, wherein the chromatography beads comprise agarose gel beads, functionalized agarose gel beads, functionalized polymeric beads, functionalized silica beads, or other hydrogel beads.

10. The method of claim 8, wherein the chromatography beads are agarose gel beads.

11. The method of claim 10, wherein the agarose gel beads are Sepharose 2B beads, Sepharose 4B beads, Sepharose 6B beads, Sepharose 2B-CL beads, Sepharose 4B-CL beads, Sepharose 2B beads, or Sepharose 6B-CL beads.

12. The method according to claim 1, further comprising the steps of:
    passing a further eluent solution through the negatively charged material after collecting the eluate enriched with semiconducting carbon nanotubes, wherein the further eluent solution comprises a second dispersing agent; and
    collecting a further eluate enriched with metallic carbon nanotubes.

13. The method according to claim 12, wherein the second dispersing agent comprises a solution of a surfactant without a net charge, or an ionic surfactant or a polymer.

14. The method of claim 13, wherein the ionic surfactant is sodium dodecyl sulfate (SDS), sodium cholate (SC), sodium deoxycholate (DOC) or sodium dodecylbenzenesulfone (SDBS).

15. The method according to claim 13, wherein the solution of the surfactant without the net charge is a non-ionic surfactant solution or a zwitterionic solution.

16. The method according to claim 15, wherein the solution of the surfactant without the net charge has a pH above 7.

17. The method of claim 15, wherein the non-ionic surfactant solution is selected from a group consisting of Triton X-405, Brij L23, and Brij S100.

* * * * *